(12) United States Patent  (10) Patent No.: US 9,756,151 B2
Goel  (45) Date of Patent: *Sep. 5, 2017

(54) SYSTEMS AND METHODS FOR RETAINING SOURCE IP IN A LOAD BALANCING MUTLI-CORE ENVIRONMENT

(71) Applicant: Citrix Systems, Inc., Fort Lauderdale, FL (US)

(72) Inventor: Deepak Goel, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/330,391

(22) Filed: Jul. 14, 2014

(65) Prior Publication Data

US 2014/0321469 A1   Oct. 30, 2014

Related U.S. Application Data

(63) Continuation of application No. 12/489,165, filed on Jun. 22, 2009, now Pat. No. 8,788,570.

(51) Int. Cl.
*H04L 12/28* (2006.01)
*H04L 29/06* (2006.01)
*G06F 9/50* (2006.01)
*H04L 12/741* (2013.01)

(52) U.S. Cl.
CPC .............. *H04L 69/22* (2013.01); *G06F 9/505* (2013.01); *H04L 45/745* (2013.01)

(58) Field of Classification Search
CPC ........ H04L 69/22; H04L 45/745; G06F 9/505
(Continued)

(56) References Cited

U.S. PATENT DOCUMENTS 7,102,996 B1   9/2006  Amdahl et al.
8,291,487 B1 * 10/2012  Chen ................................ 726/12
(Continued)

FOREIGN PATENT DOCUMENTS

WO    WO-2009/061973 A1   5/2009

OTHER PUBLICATIONS

Israeli Office Action for Application No. 217123 dated Nov. 6, 2014.
(Continued)

*Primary Examiner* — Thuong Nguyen
(74) *Attorney, Agent, or Firm* — Foley & Lardner LLP; Christopher J. McKenna; Shabbi S. Khan

(57) ABSTRACT

Described herein is a method and system for distributing requests and responses across a multi-core system. Each core executes a packet engine that further processes data packets allocated to that core. A flow distributor executing within the multi-core system forwards client requests to a packet engine on a core that is selected based on a value generated when a hash is applied to a tuple comprising a client IP address, a client port, a server IP address and a server port identified in the request. The packet engine maintains the client IP address, selects a first port of the core, and determines whether a hash of a tuple comprising those values identifies the selected core. A modification is then made to the client request so that the client request includes a tuple comprising the client IP address, the server IP address, the first port and the server port.

18 Claims, 29 Drawing Sheets

(58) Field of Classification Search
USPC ......... 370/392, 230, 235, 236; 709/202, 220
See application file for complete search history.

(56) References Cited

U.S. PATENT DOCUMENTS

| | | | | |
|---|---|---|---|---|
| 8,788,570 | B2* | 7/2014 | Goel | H04L 29/1258 709/202 |
| 2007/0230477 | A1* | 10/2007 | Worley | G06F 9/5016 370/395.3 |
| 2008/0077792 | A1 | 3/2008 | Mann | |
| 2008/0288614 | A1* | 11/2008 | Gil | H04L 41/04 709/220 |
| 2010/0265824 | A1* | 10/2010 | Chao | H04L 12/66 370/235 |
| 2010/0287227 | A1* | 11/2010 | Goel | H04L 67/1002 709/202 |

OTHER PUBLICATIONS

Second Office Action issued Jul. 2, 2014 in Chinese patent application No. 201080036985.3.
Third Chinese Office Action for CN Application No. 201080036985.3 dated Nov. 21, 2014.
Declaration of Non-Establishment of International Search Report on PCT/US2010/037221 dated Aug. 26, 2010.
EPO Communication on 10725937.6 dated Feb. 1, 2012.
First Office Action issued Nov. 27, 2013 in Chinese Patent Application No. 201080036985.3 (5 pages).
International Preliminary Report on Patentability on PCT/US2010/037221 dated Jan. 12, 2012.
Office Action issued Oct. 26, 2012 in European Patent Application No. 10725937.6 (7 pages).
US Notice of Allowance for U.S. Appl. No. 12/489,165 dated Mar. 13, 2014.
US Office Action for U.S. Appl. No. 12/489,165 dated Apr. 3, 2012.
US Office Action for U.S. Appl. No. 12/489,165 dated Jul. 20, 2012.
Written Opinion on PCT/US2010/037221 dated Aug. 26, 2010.
Canadian Office Action issued Jun. 15, 2016 in Application No. 2,766,286.
Summons to attend oral proceeding pursuant to rule 115(1) epc in connection with EP application No. 10725937.6 mailed Jul. 18, 2016.
U.S. Appl. No. 12/489,165, filed Jun. 22, 2009.

* cited by examiner

SYSTEMS AND METHODS FOR RETAINING SOURCE IP IN A LOAD BALANCING MUTLI-CORE ENVIRONMENT

RELATED APPLICATION

This application is a continuation of and claims priority to, and the benefit of, U.S. No-provisional application Ser. No. 12/489,165, entitled "Systems and Methods For Retaining Source IP In A Load Balancing Multi-Core Environment" and filed on Jun. 22, 2009, which is incorporated herein by reference in its entirety for all purposes.

FIELD OF THE DISCLOSURE

The present application generally relates to data communication networks. In particular, the present application relates to systems and methods for distributing data packets received by a multi-core system to cores within the multi-core system.

BACKGROUND OF THE DISCLOSURE

In a multi-core system, any one of the cores may be performing the same functionality or different functionality. The multi-core system may deploy a Receive Side Scaler, such as Microsoft's receive side scaling technology to distribute packets received from a network interface card to any core for processing. The Receive Side Scaler may be agnostic to the functionality being performed on any of the cores. As the Receive Side Scaler receives network packets from a network interface card, it forwards the network packet to a core based on a predetermined function. The network packet may be part of a transaction or series of multiple network packets in some context. Some of these network packets may go to different cores because of the distribution function of the Receive Side Scaler. As such, this may cause challenges in the balance of processing and performing of functionality in the multi-core system.

BRIEF SUMMARY OF THE DISCLOSURE

There exist multi-core systems that can balance network traffic across one or more cores in the multi-core system. These multi-core systems can be included within an appliance or a computing system and can comprise any number of cores, or processors. In some embodiments, multi-core systems distribute network traffic according to flow distribution models such as functional parallelism, where each core in a multi-core system is assigned to a different function, or data parallelism where each core in a multi-core system is assigned to a different device or module. These distribution schemes do not take into account the amount of network traffic, therefore the distribution of network traffic is often not even or symmetrical. Thus, there exists a need for a distribution scheme that substantially symmetrically and evenly distributes network traffic amongst one or more cores in a multi-core system.

In some instances, distribution of network traffic across one or more cores requires changing an attribute of the network traffic to ensure that return traffic is routed to the originating core. Ensuring symmetry with regard to the core where a request is transmitted from and the core where the response is received, reduces unnecessary copying and caching of packet data, and provides an even flow of requests and responses to and from the multi-core system. Some systems achieve symmetrical distribution by changing tuples associated with data packets in the network traffic. The change made to the tuple can be a modification of a source IP address and/or a source port. In some instances, a backend system may require that the source IP address and/or source port remain un-modified. In those instances, systems are needed that both maintain these data packet attributes, and ensure that requests and responses are handled by substantially the same core in the multi-core system.

Data packets included within network traffic distributed amongst the cores in a multi-core system are sometimes fragmented. In these instances, the multi-core system receives data packet fragments rather than a whole data packet. Systems are therefore needed that both handle data packet fragments and evenly and symmetrically distribute network traffic across the cores of a multi-core system.

In one aspect, described herein is an embodiment of a method for providing symmetrical request and response processing across a packet engine of a plurality of packet engines. Each of the plurality of packet engines executes on a respective core of a plurality of cores in a multi-core system intermediary to a client and a server. A packet engine executing on a first core of the multi-core system intermediary to a client and a server, receives from a flow distributor a request of the client to the server. The first core is selected by the flow distributor based on a hash of a first tuple comprising a client internet protocol address, a client port, a server internet protocol address and a server port identified in the client request. The packet engine selects a first internet protocol address from the one or more internet protocol addresses of the first core and a first port from a plurality of ports of the first core. The packet engine then determines that a hash of a second tuple comprising at least the first internet protocol address and the first port identifies the first core. The packet engine then identifies that the first port is available, and modifies the request of the client to identify the first internet protocol address as the client internet protocol address and the first port as the client port.

In some embodiments, the packet engine transmits the modified request of the client to the server.

The flow distributor, in some embodiments, receives a response from the server to the request of the client, and distributes the response to the first core of the packet engine based on the hash of a third tuple comprising a client internet protocol address, a client port, a server internet protocol address and a server port identified in the response.

In some embodiments, the packet engine determines that the hash of the first tuple identifies the first core on which the packet engine executes. In other embodiments, the packet engine determines that the hash of the second tuple identifies the first core on which the packet engine executes.

The packet engine, in some embodiments, determines that the first port is not available, selects a second port from the plurality of ports of the first core, determines that the second port is available, and determines that a hash of a fourth tuple comprising at least the first internet protocol address and the second port identifies the first core. The packet engine then modifies the request of the client to identify the first internet protocol address as the client internet protocol address and the second port as the client port.

In one embodiment, the packet engine determines that the first port is not available, selects a second internet protocol address from the one or more internet protocol addresses of the first core, selects a second port from the plurality of ports of the first core, and determines that a hash of a fifth tuple comprising at least the second internet protocol address and the second port, identifies the first core. The packet engine then modifies the request of the client to identify the second internet protocol address as the client internet protocol address and the second port as the client port.

The packet engine, in some embodiments, selects a first internet protocol address from a group of predetermined internet protocol addresses of the first core. In other embodiments, the packet engine selects a first port from a port table comprising available ports. Each port, in some embodiments, is selected for inclusion in the port table based in part on one or more hashes of local internet protocol addresses of a first core and local ports associated with each local internet protocol address.

The flow distributor, in many embodiments, executes within the multi-core system. The multi-core system, in some embodiments, comprises at least two cores, each core storing a port table comprising available ports on that core.

In one embodiment, the first core is selected by the flow distributor based in part on the hash of the first tuple. In other embodiments, the packet engine updates a port allocation table to indicate the assignment of the first port to the data packet.

In some aspects, described herein is a system for providing symmetrical request and response processing across a packet engine of a plurality of packet engines, each of the plurality of packet engines executing on a respective core of a plurality of cores in a multi-core system intermediary to a client and a server. The system can comprise a multi-core system intermediary to a client and a server, the multi-core system comprising a plurality of cores. Executing within the multi-core system can be a flow distributor receiving a request of a client to a server, and selecting a first core based on a hash of a first tuple comprising a client internet protocol address, a client port, a server internet protocol address and a server port identified in the client request. A packet engine executing on a first core of the multi-core system can receive, from the flow distributor, the client request. The packet engine can then select a first internet protocol address of one or more internet protocol addresses of the first core and a first port from a plurality of ports of the first core, determine that a hash of a second tuple comprising at least the first internet protocol address and the first port, identifies the first core, identify that the first port is available, and modify the client request to identify the first internet protocol address as the client internet protocol address and the first port as the client port.

In another aspect, describe herein is an embodiment of a method for directing by a flow distributor network packets to a packet engine of a plurality of packet engines while maintaining a client internet protocol address and a client port, each of the plurality of packet engines executing on a core of a plurality of cores in a multi-core system intermediary to the client and a server. A packet engine executing on a first core of the multi-core system intermediary to a client and a server, receives from a flow distributor a client request identifying a first tuple comprising a client internet protocol address, a client port, a server internet protocol address and a server port. The flow distributor selects the first core to receive the client request based on a hash of the first tuple. The flow distributor further receives a response to the client request forwarded to the server by the packet engine, the response generated by the server and comprising a second tuple identifying, via a hash of the second tuple, a second core different than the first core of the packet engine receiving the request. The flow distributor forwards the received response to a second packet engine of the second core. The flow distributor then directs, responsive to a rule of the flow distributor executing on the second core, the response received by the second core to the first core.

In some embodiments forwarding the received response to the second packet engine further comprises storing, by the second packet engine of the second core, one or more network packets of the response to a memory location accessible by the first core. The one or more network packets can be stored in a shared buffer accessible by each core in the multi-core system.

In another embodiment, a message identifying that the response is to be processed by the packet engine of the first core, is sent by a second core to the first core.

The second packet engine of the second core, in some embodiments, determines the response corresponds to a request not processed by the second packet engine. This determination can further comprise calculating a hash of a tuple of the response, the hash identifying the first core. This determination can also comprise looking up a port in a port allocation table to identify the first core.

In some embodiments, the packet engine on the first core forwards the client request to a server. When the client request is forwarded, the client internet protocol address and the client port in the first tuple can be maintained.

The response, in some embodiments, comprises a second tuple comprising at least the client internet protocol address and the client port of the first tuple. The hash applied to the first tuple, in some embodiments, is substantially the same as the hash applied to the second tuple.

In one embodiment, the flow distributor selects the first core based in part on a hash of the first tuple.

In some embodiments, the client internet protocol address is maintained responsive to a packet engine configured to maintain client internet protocol addresses. The packet engine, in these embodiments, can be configured to maintain client internet protocol addresses responsive to a security policy requiring maintenance of client internet protocol addresses. In other embodiments, the client port is maintained responsive to a packet engine configured to maintain client ports. The packet engine, in these embodiments, can be configured to maintain the client port responsive to a security policy requiring maintenance of client ports.

In other aspects, described herein is a method for directing by a flow distributor fragmented network packets to a packet engine of a plurality of packet engines, each of the plurality of packet engines executing on a respective core of a plurality of cores in a multi-core system intermediary to the client and a server. A packet engine executing on a first core of multi-core system intermediary to a client and a server, receives from a flow distributor a client request identifying a first tuple comprising a client internet protocol address, a client port, a server internet protocol address and a server port. The flow distributor can select the first core to receive the client request based on a hash of the first tuple. The flow distributor can receive a plurality of fragments of a response from the server to the request of client forwarded to the server by the packet engine on the first core. The flow distributor can then distribute the plurality of fragments of the response to a second core responsive to a second hash computed by the flow distributor on the source internet protocol address and destination internet protocol address identified by the plurality of fragments. The second packet engine of the second core can then store the plurality of fragments and performing one or more fragmentation actions on the plurality of fragments. A determination is then made by a rule of the flow distributor operating on the second core to direct the plurality of fragments received by the second core to the first core.

In some embodiments storing the plurality of fragments further comprises assembling, by the second packet engine, the plurality of fragments.

In other embodiments, determining to direct the plurality of fragments to the first core further comprises storing, by the second packet engine, the assembled plurality of fragments in a memory location accessible by the first core. In some embodiments the method further comprises sending by the second core to the first core a message to direct the first core to process the assembled plurality of fragments.

In some embodiments, determining to direct the plurality of fragments to the first core further comprises determining by the second core that the first core established the connection. In one embodiment, performing a fragmentation action further comprises performing an assembly action, while in still other embodiments performing a fragmentation action further comprises performing a bridging action.

The plurality of fragments, in some embodiments, can be steered to the first core.

The flow distributor, can in some embodiments, assemble a portion of the plurality of fragments. The flow distributor can then extract the source internet protocol address and the destination internet protocol address of the second tuple from the portion of the assembled plurality of fragments. In other embodiments, the flow distributor assembles the portion of the plurality of fragments until a header of the response is assembled. The flow distributor can then extract the source internet protocol address and the destination internet protocol address of the second tuple from the assembled response header.

In yet another aspect, described herein is an embodiment of a method for providing symmetrical request and response processing across a packet engine of a plurality of packet engines while maintaining a client's internet protocol address and proxying a port for the client, each of the plurality of packet engines executing on a core of a plurality of cores in a multi-core system intermediary to the client and a server. A packet engine executing on a first core of the multi-core system, intermediary to the client and the server, receives from a flow distributor a client request identifying a first tuple comprising a client internet protocol address, a client port, a server internet protocol address and a server port. The flow distributor forwards the request to the first core responsive to a first hash of the first tuple. The packet engine can determine to proxy the client port of the request and maintain the client internet protocol address. The packet engine can also compute a second hash of the client internet protocol address and the destination internet protocol address to select a port allocation table of a plurality of port allocation tables. After selecting the port allocation table, the packet engine can determine that a hash of a second tuple comprising at least an available first port from the selected port allocation table and the client internet protocol address identifies the first core. The packet engine can then modify the client port of the client request to identify the first port.

In some embodiments, the packet engine transmits the modified client request to the server. The packet engine, in some embodiments, transmits the modified client request to a server located at the destination internet protocol address. In other embodiments, the packet engine determines that the first port of the selected port allocation table is unavailable. Upon making this determination, the packet engine selects a second port of the selected port allocation table, and determines the second port is available. Still further, the packet engine can determine the first port is unavailable by determining the first port is in use.

In one embodiment, the method further comprises storing a plurality of port allocation tables on each core in the multi-core system. Each port allocation table can be located at a proxy internet protocol address of a core on which the port allocation table is stored. The packet engine can select a port allocation table based in part on a hash of a client internet protocol address and a destination address of a first data packet.

The flow distributor, in some embodiments, receives a first data packet and a second data packet and forwards the first data packet to a first core in the multi-core system based in part on a hash of a first tuple comprising at least a first client internet protocol address and a first destination address of the first data packet. The flow distributor then forwards the second data packet to a second core in the multi-core system based in part on a hash of a second tuple comprising at least a second client internet protocol address and a second destination address of the second data packet.

In one embodiment, the method further comprises updating the selected port allocation table to list the first port as unavailable.

In some aspects, described herein is a system for providing symmetrical request and response processing across a packet engine of a plurality of packet engines while maintaining a client's internet protocol address and proxying a port for the client, each of the plurality of packet engines executing on a core of a plurality of cores in a multi-core system intermediary to the client and a server. The system can comprise a multi-core system intermediary to a client and a server. The system can further comprise a flow distributor receiving a request of a client to a server, and selecting a first core based on a hash of a first tuple comprising a client internet protocol address, a client port, a server internet protocol address and a server port identified in the client request. A packet engine executing on a first core of the multi-core system can receive the client request from the flow distributor, and determine whether to proxy the client port of the request and maintain the client internet protocol address. The packet engine then computes a second hash of the client internet protocol address and the destination internet protocol address to select a port allocation table of a plurality of port allocation tables, and determines that a hash of a second tuple comprising at least an available first port from the selected port allocation table and the client internet protocol address, identifies the first core. The packet engine then modifies the client port of the client request to identify the first port.

The details of various embodiments of the methods and systems described herein are set forth in the accompanying drawings and the description below.

BRIEF DESCRIPTION OF THE FIGURES

The foregoing and other objects, aspects, features, and advantages of the methods and systems described herein will become more apparent and better understood by referring to the following description taken in conjunction with the accompanying drawings, in which.

Figure 1A:
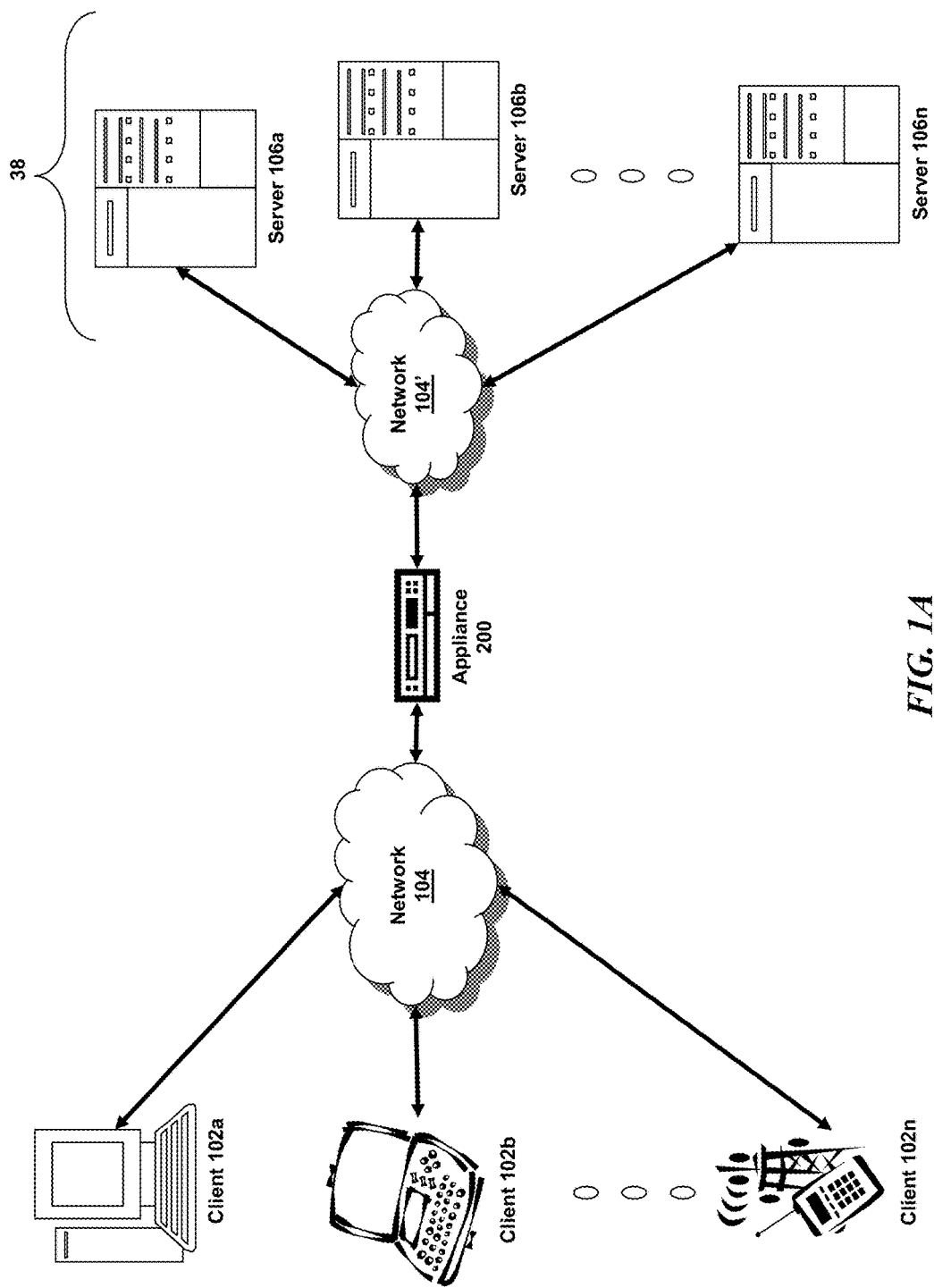
FIG. 1A is a block diagram of an embodiment of a network environment for a client to access a server via an appliance.

The features and advantages of the methods and systems described herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE DISCLOSURE

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment; and Section F describes embodiments of systems and methods for distributing data packets across a multi-core architecture and environment.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n. In some embodiments, a client 102 communicates with a server 106. In one embodiment, the client 102 communicates directly with one of the servers 106 in a farm 38.

In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
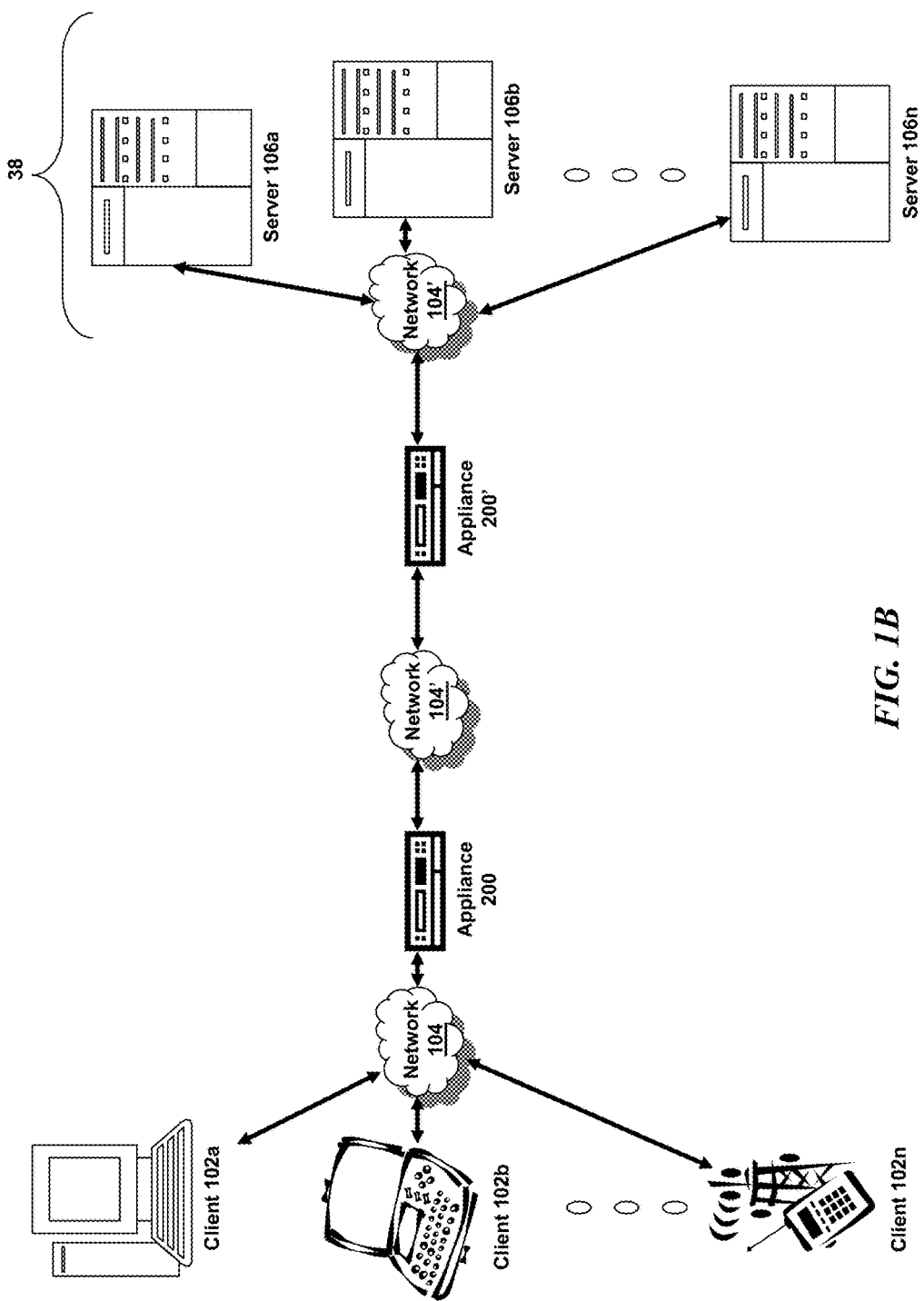
FIG. 1B is a block diagram of an embodiment of an environment for delivering a computing environment from a server to a client via an appliance.
Figure 1C:
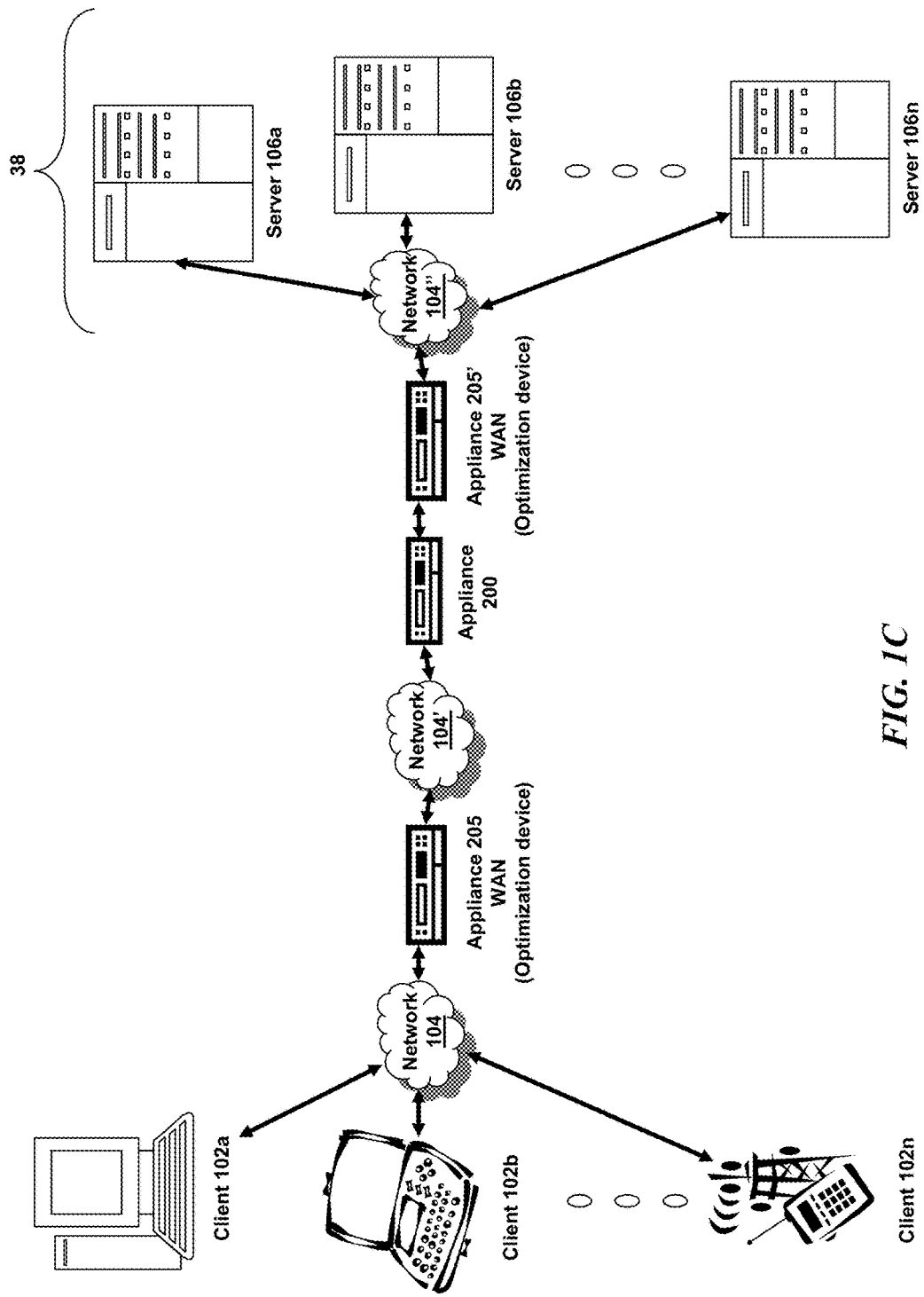
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
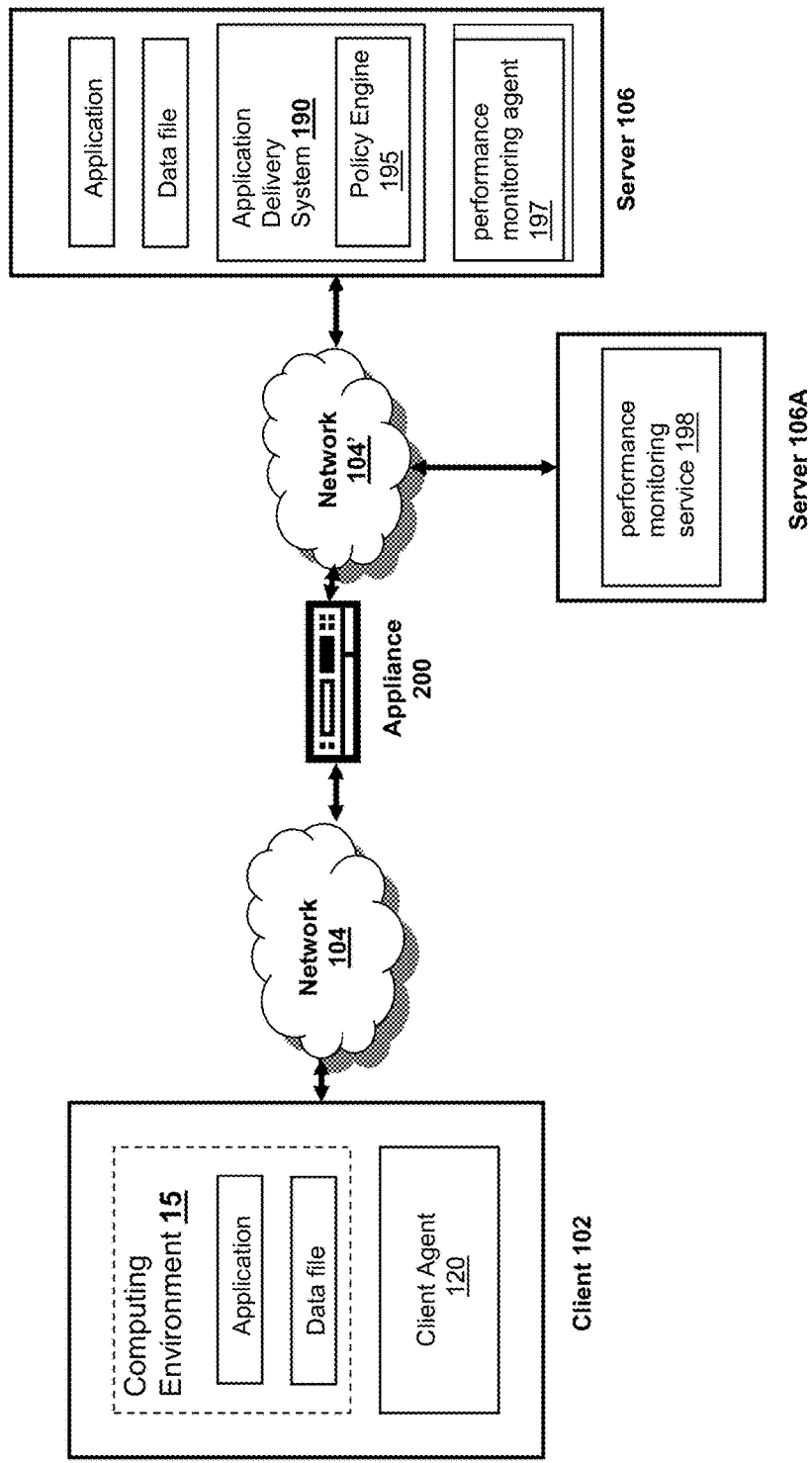
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
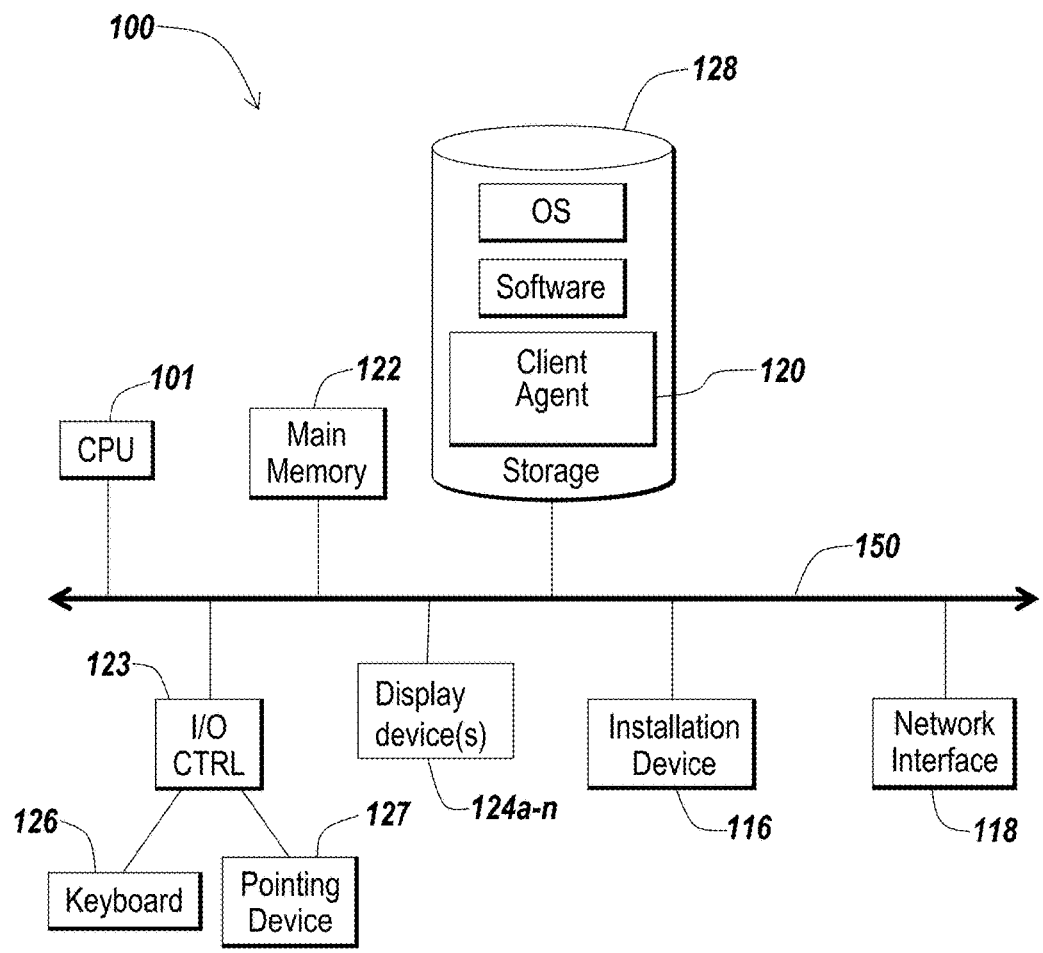
FIGS. 1E-1H are block diagrams of embodiments of a computing device.
Figure 1F:
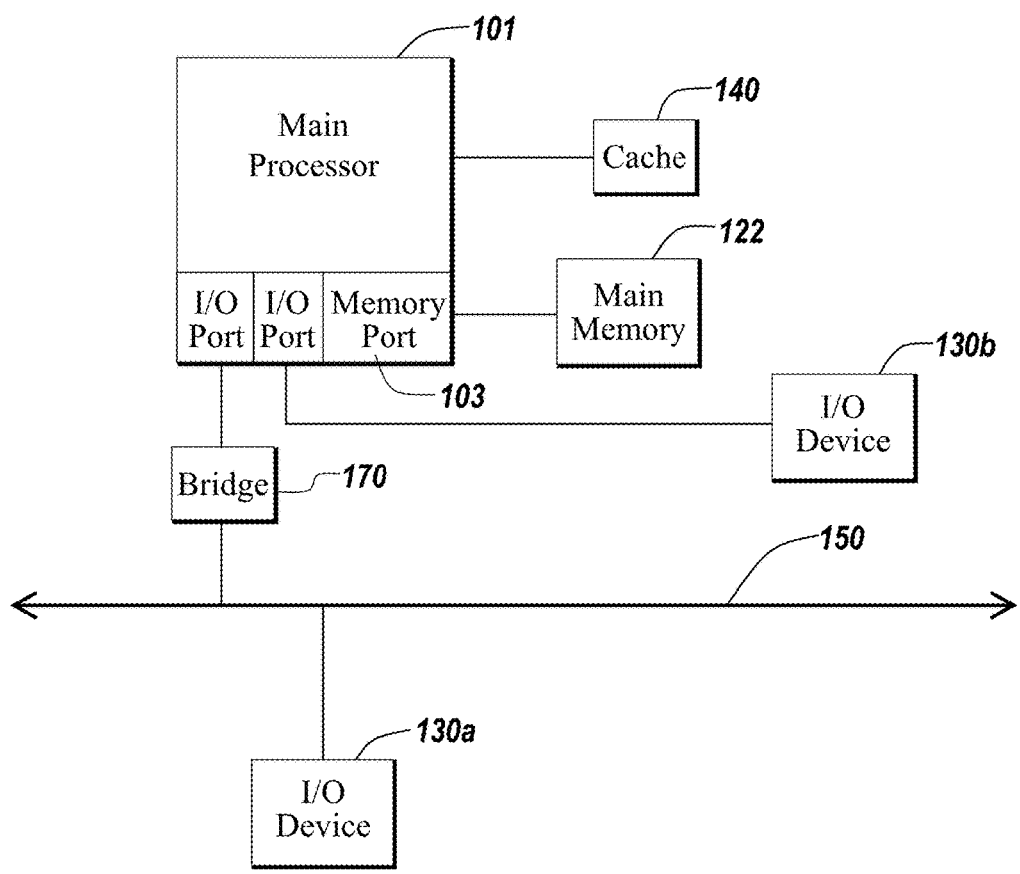

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
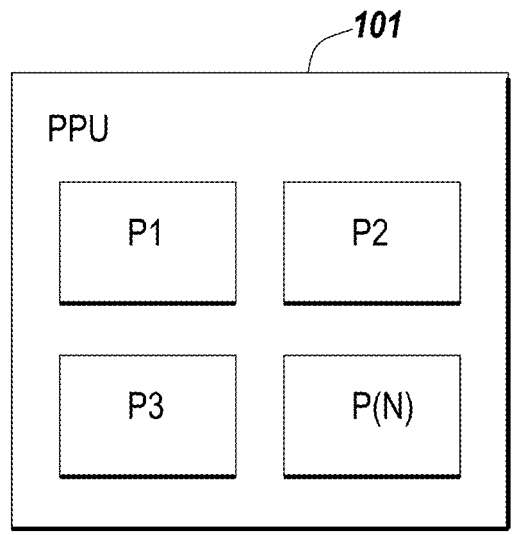

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
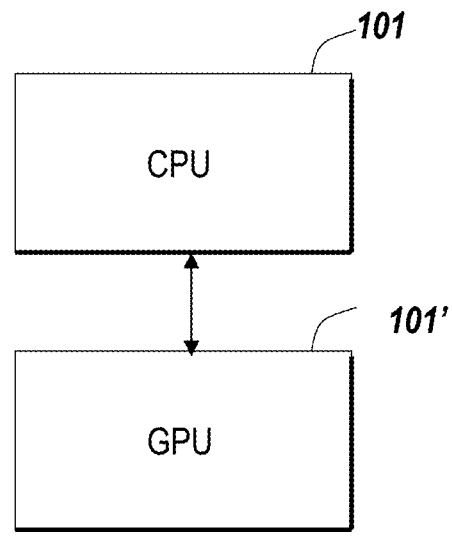

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
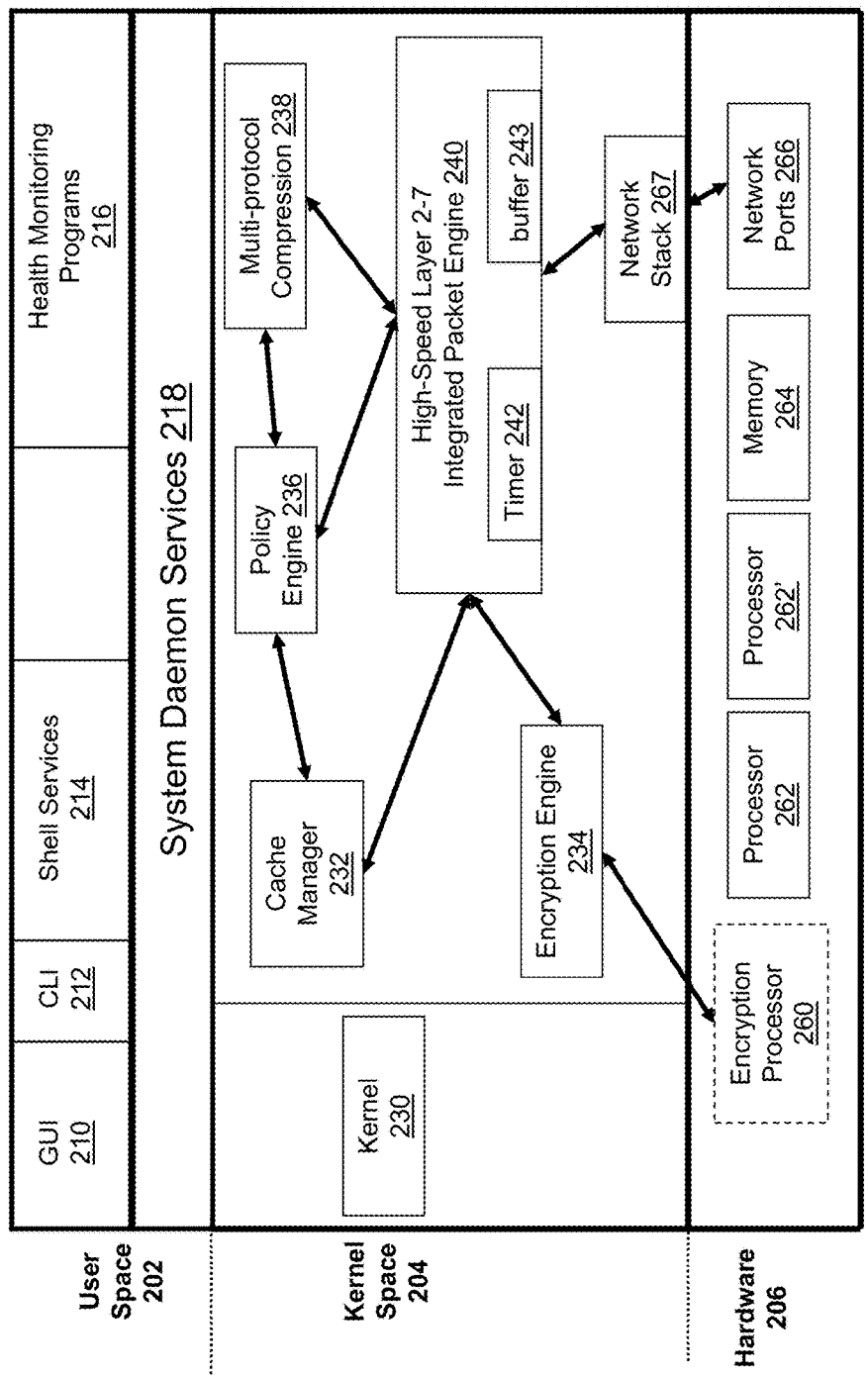
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol. Although the hardware layer 206 of appliance 200 is illustrated with certain elements in FIG. 2, the hardware portions or components of appliance 200 may comprise any type or form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the methods and systems described herein are not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/ or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), Hyper-Text Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
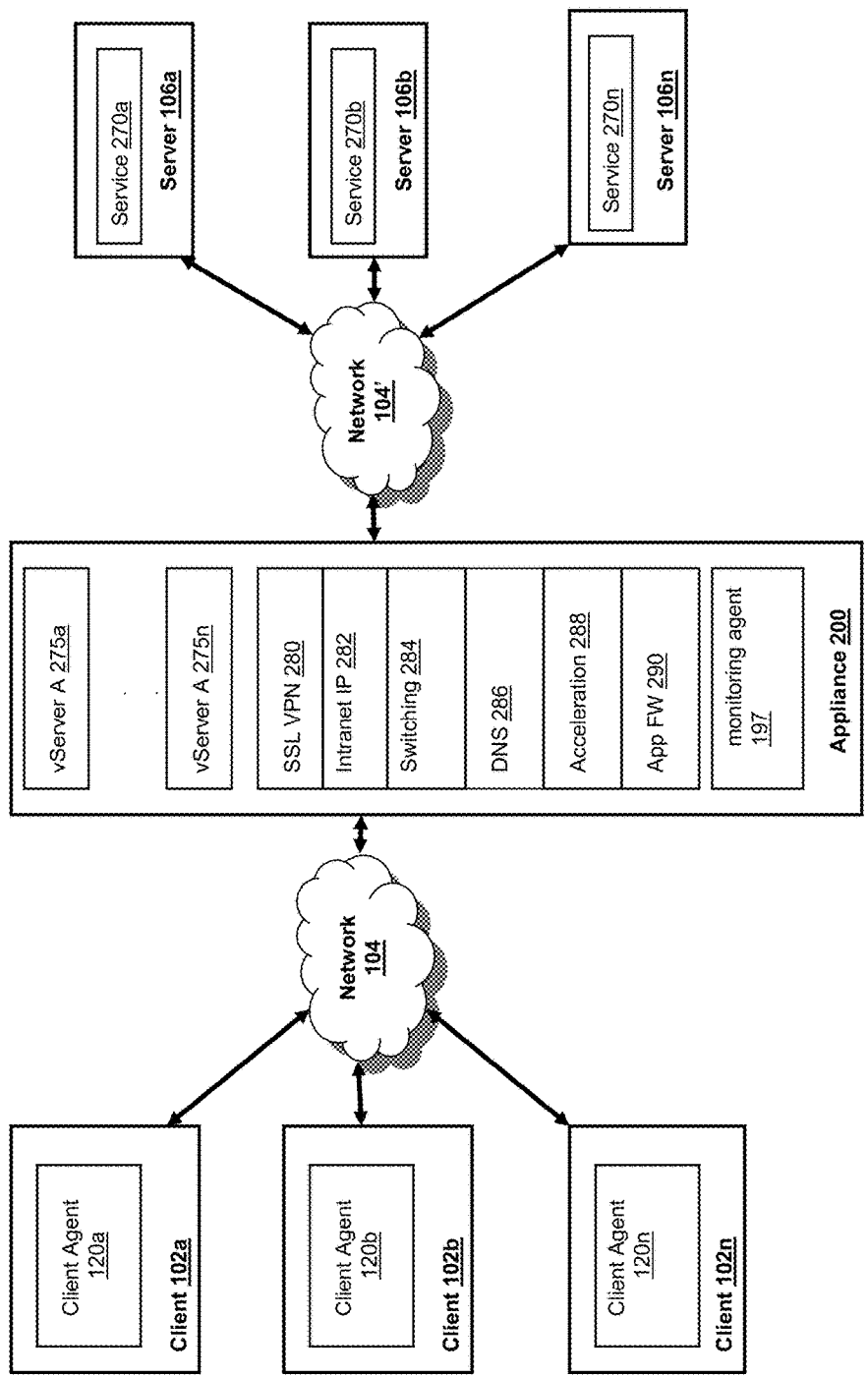
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102. In one embodiment, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
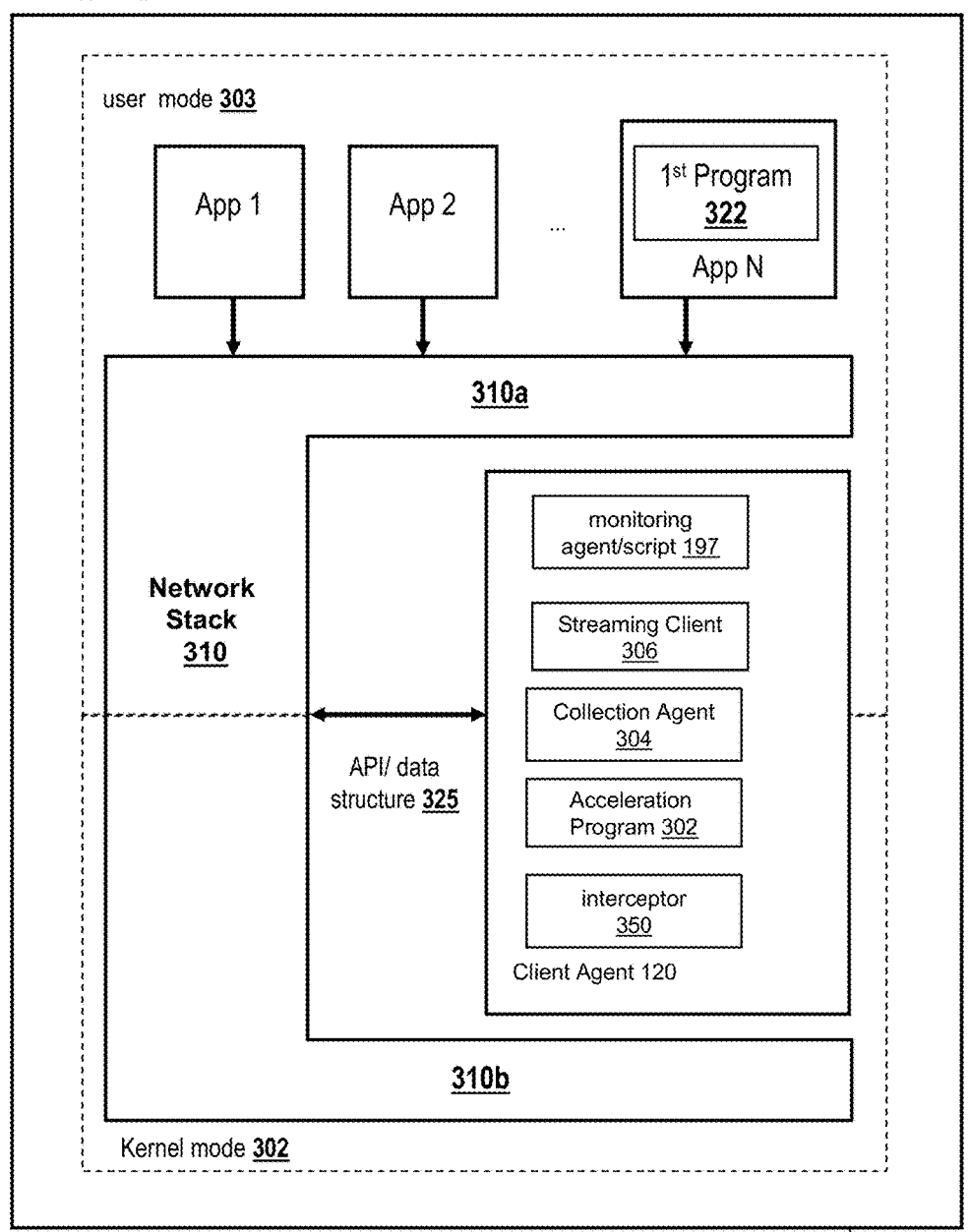
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120.

For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4A:
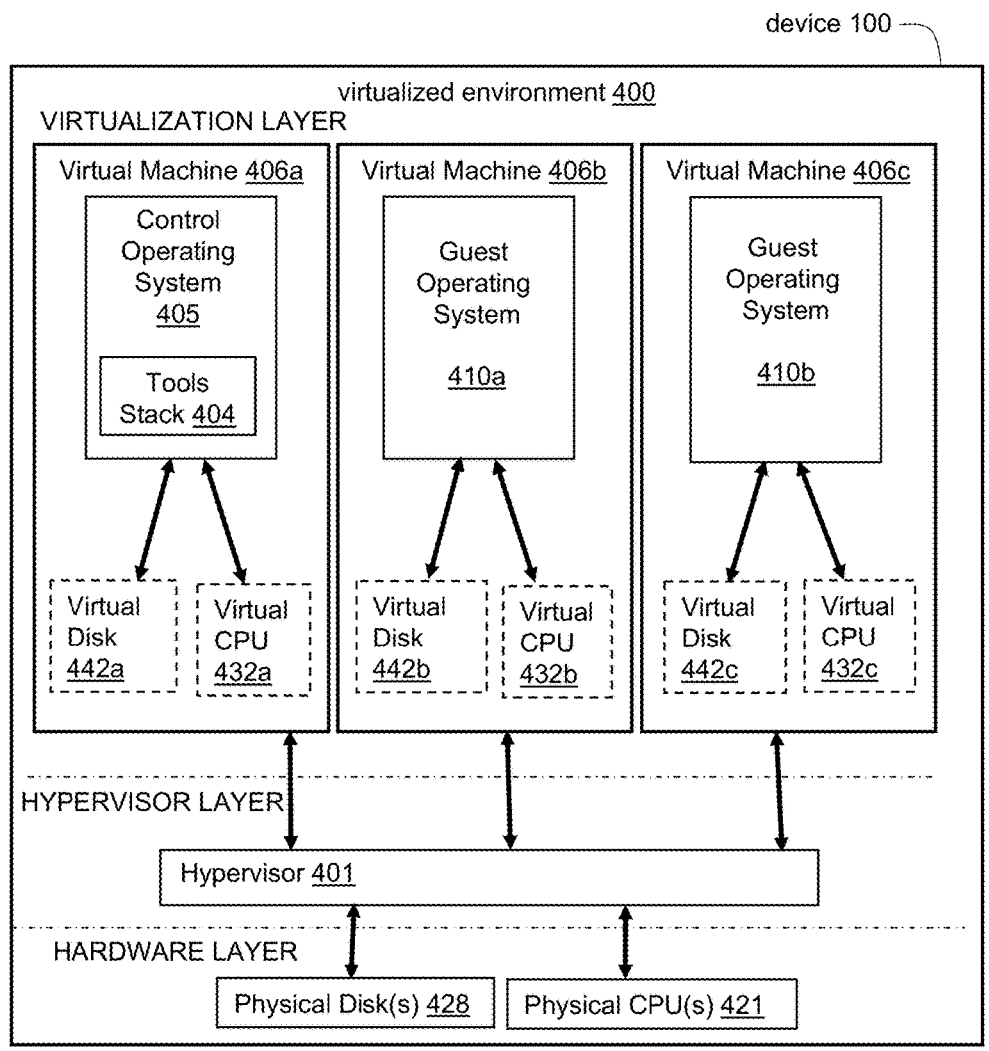
FIG. 4A is a block diagram of an embodiment of a virtualization environment.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 104.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4B:
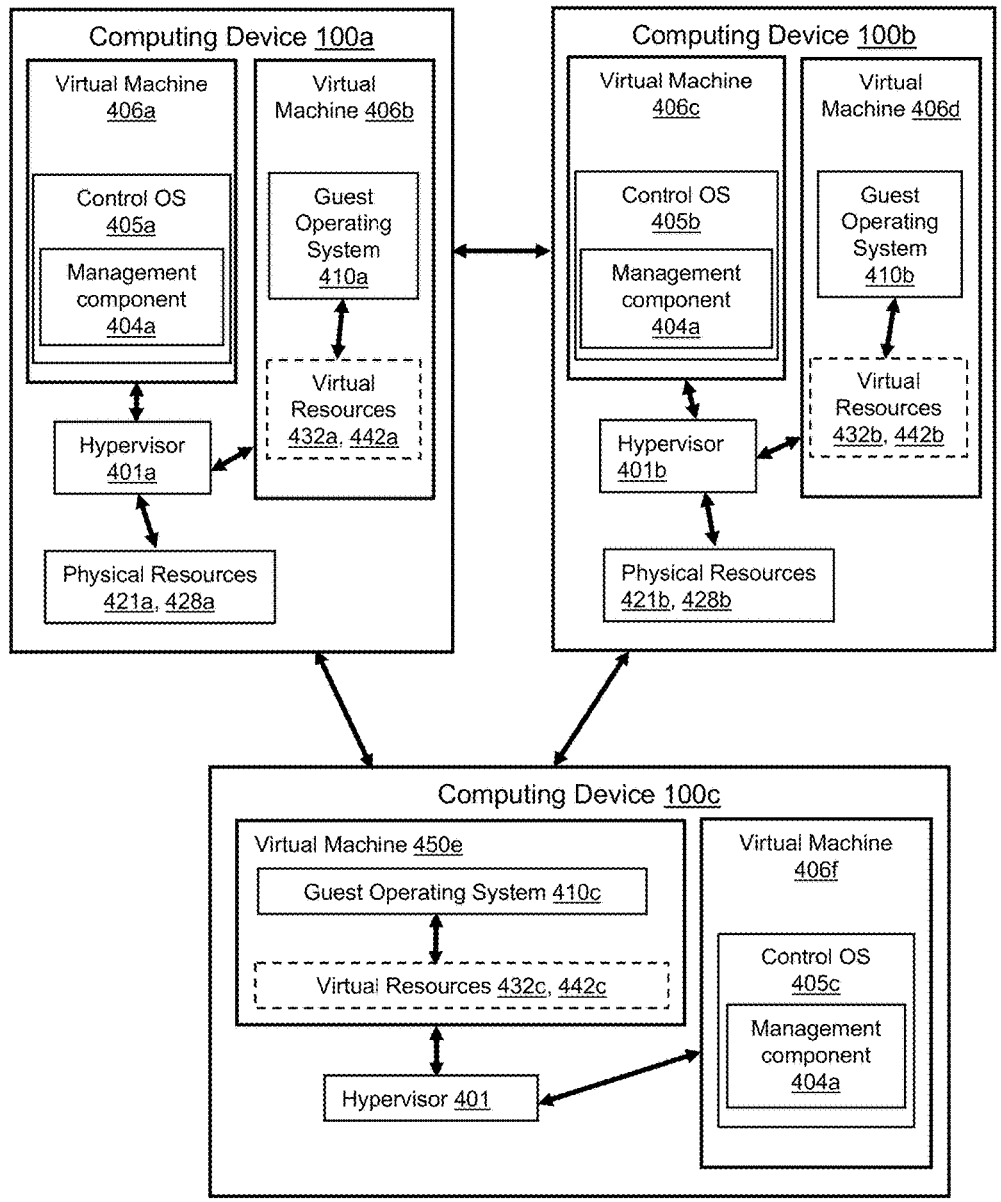
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to as tools stacks 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
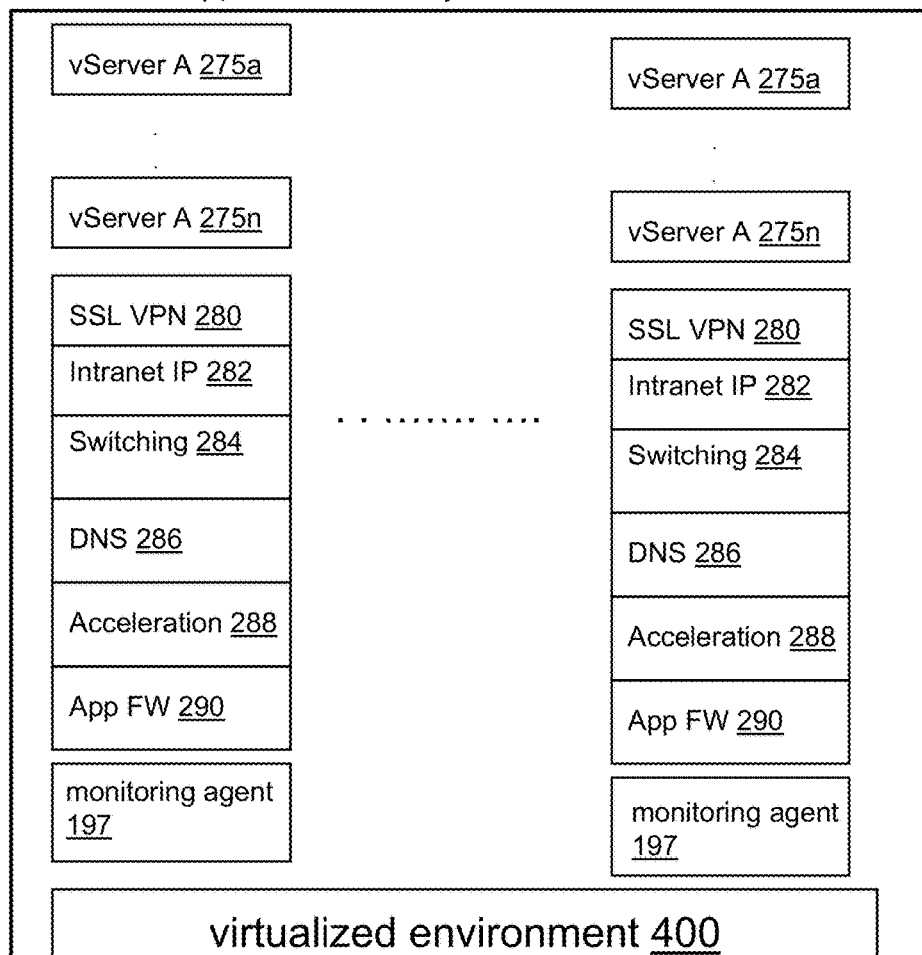
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing a Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
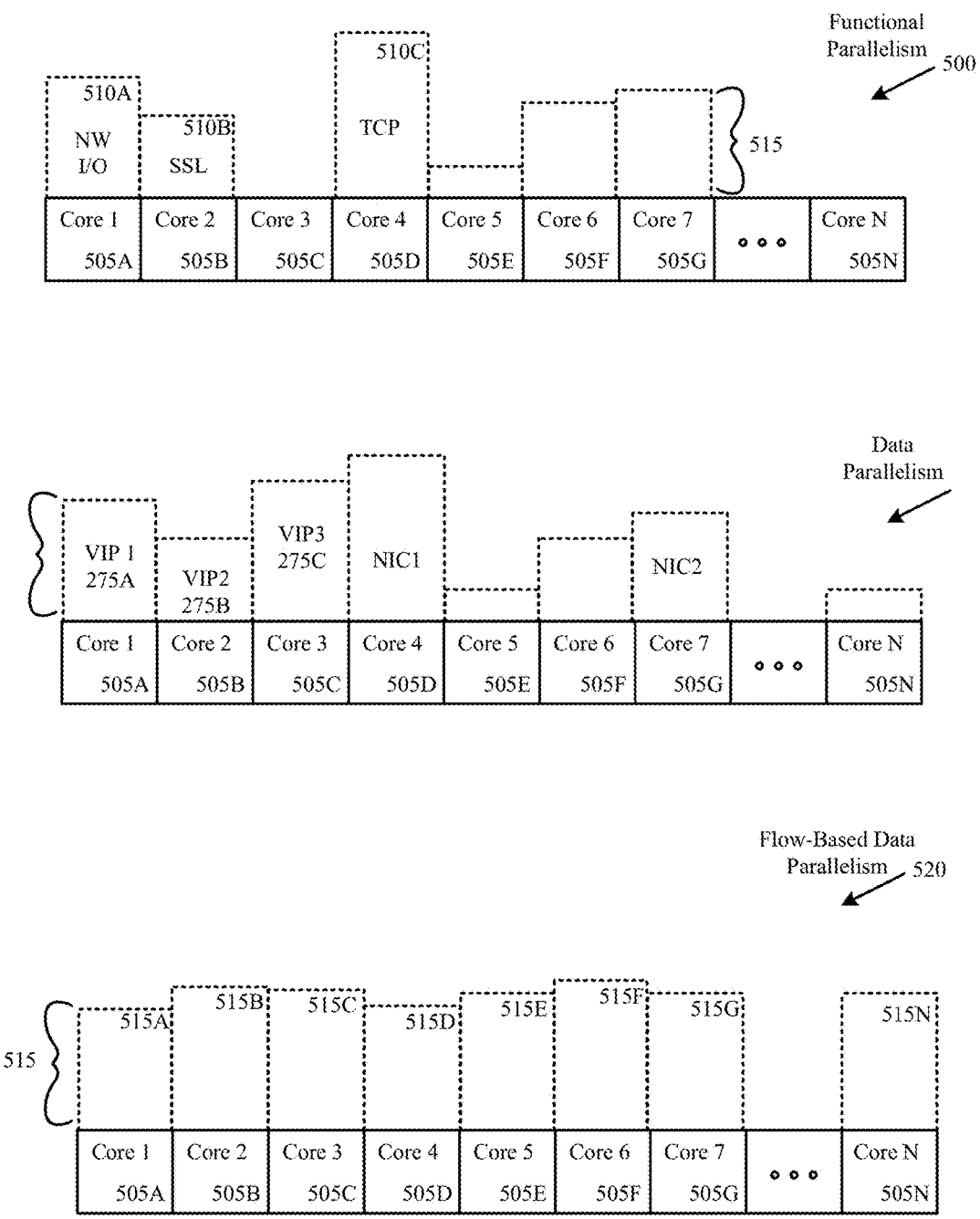
FIG. 5A are block diagrams of embodiments of approaches to implementing parallelism in a multi-core system.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In one embodiment, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
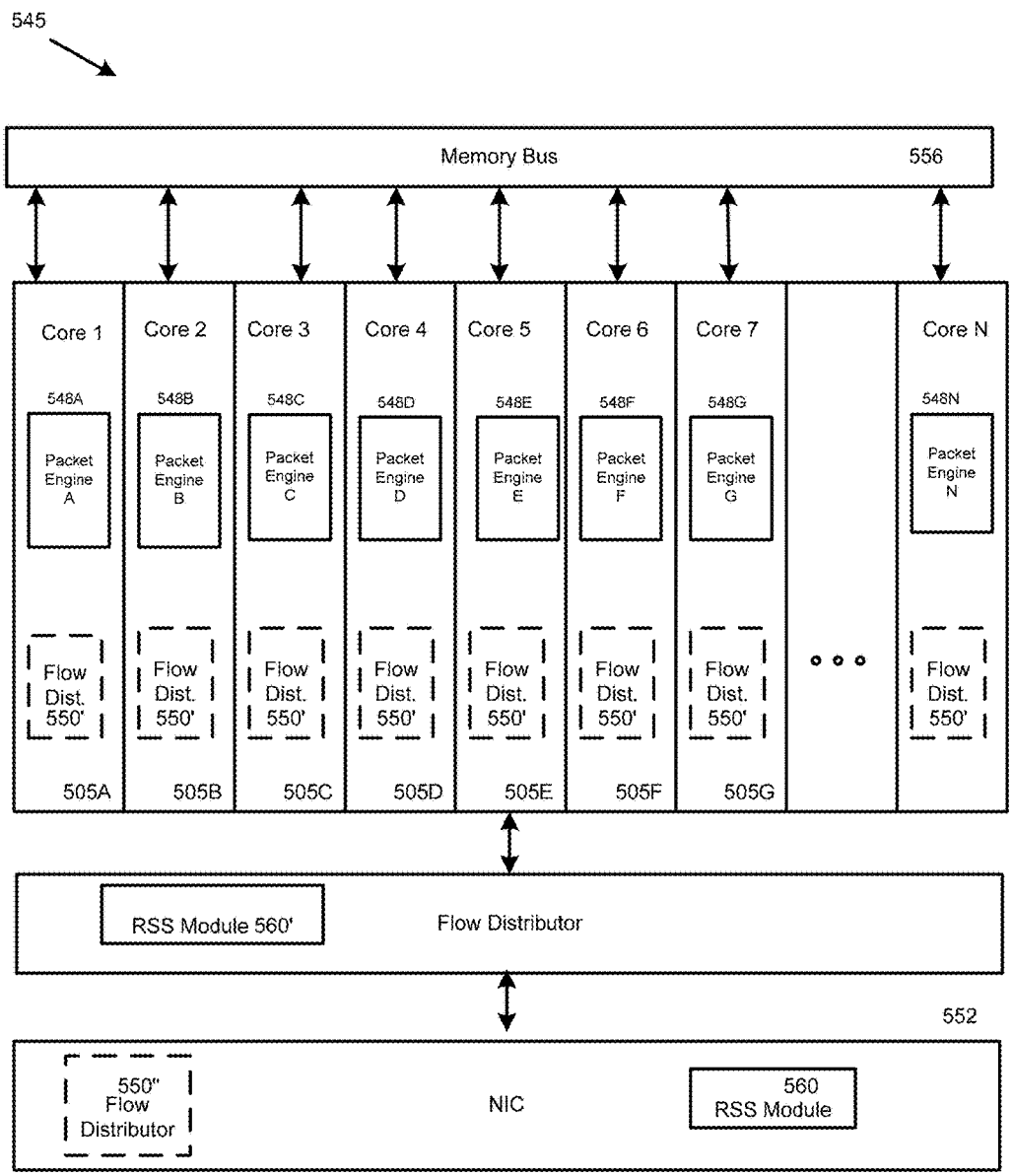
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In one embodiment, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In one embodiment, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 536A on Core 1 505A may be comprised of the network traffic associated with the transactions between the particular client and server. Allocating the network traffic to Core 1 505A can be accomplished by routing all data packets originating from either the particular client or server to Core 1 505A. While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 536A on Core 1 is less than the load 536B-N on the rest of the cores 505B-N. Once the first data packet is allocated to Core 1 505A, the amount of load 536A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 536A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, in one embodiment, can be associated with a particular packet engine 505 such that load balancing can be carried out by the packet engine 505. Load balancing may in this embodiment, require that each packet engine 505 associated with a core 505 communicate with the other packet engines 505 associated with cores 505 so that the packet engines 505 can collectively determine where to distribute load. One embodiment of this process can include an arbiter that receives votes from each packet engine 505 for load. The arbiter can distribute load to each packet engine 505 based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In one embodiment, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505. The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In one embodiment, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (Not Shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In one embodiment, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In one embodiment, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In one embodiment, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In one embodiment, the flow distributor can distribute network traffic or; pad according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In one embodiment, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software. In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In one embodiment, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined bases on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

- 4-tuple of source TCP Port, source IP version 4 (IPv4) address, destination TCP Port, and destination IPv4 address. This is the only required hash type to support.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. Any portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (Not Shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, in one embodiment, receive data packets destined for the appliance 200, apply a distribution scheme to the received data packets and distribute the data packets to the one or more cores 505 of the multi-core system 575. In one embodiment, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
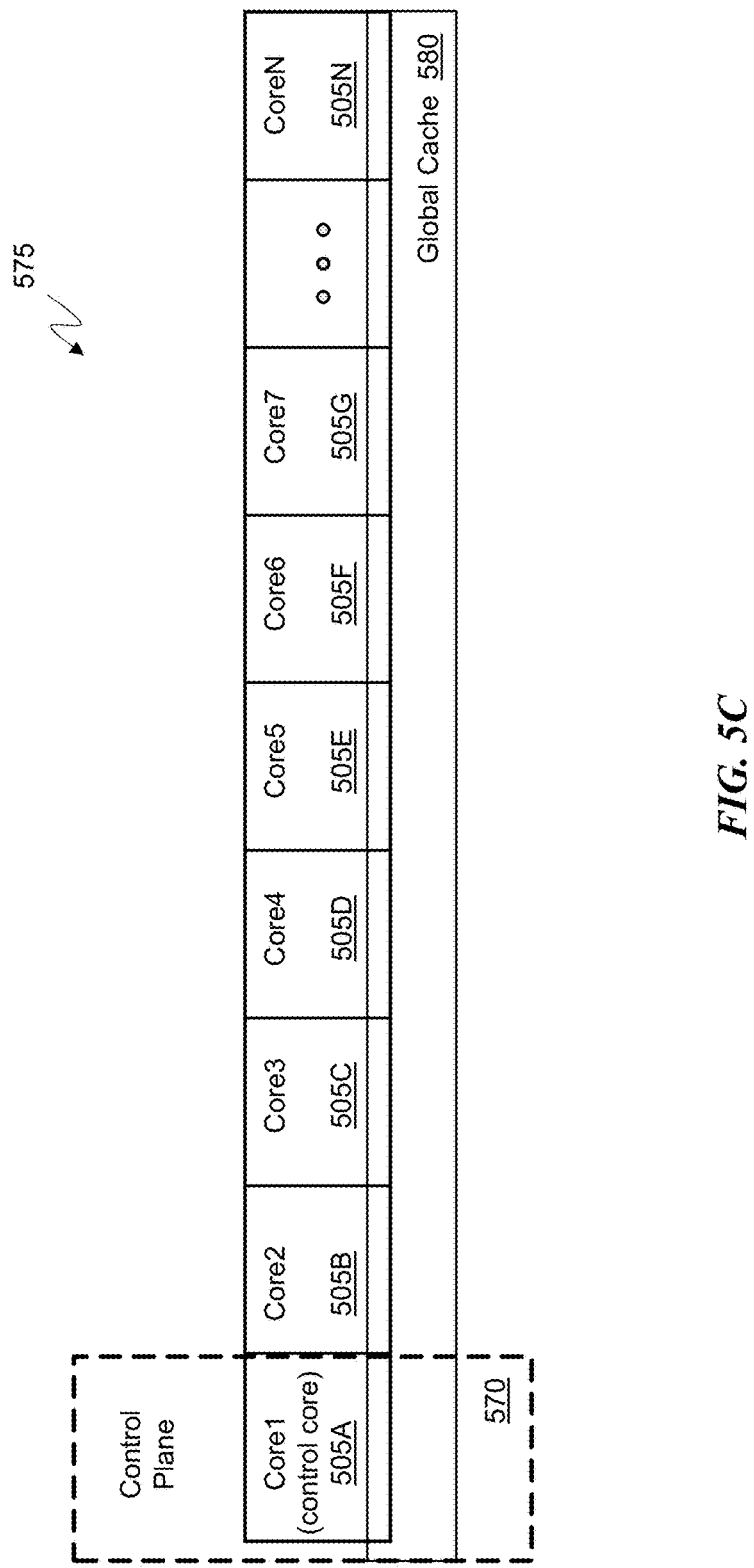
FIG. 5C is a block diagram of another embodiment of an aspect of a multi-core system.

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575.) The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In one embodiment, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Distributing Data Packets Across a Multi-Core Architecture and System 1. Multi-Core System and Architecture for Distributing Data Packets Across a Multi-Core Architecture and System The system and architecture described in FIG. 5B is a general overview of one possible multi-core system 545 that can accomplish the symmetrical distribution of requests and responses across packet engines executing on multiple cores in a multi-core system 545. There exist a number of additional system aspects that can, in some embodiments, facilitate the symmetrical distribution of requests and responses and that can further implement security policies and other system configurations that require the maintenance of a client IP address or a client port number. In systems where the multi-core architecture 545 processes fragmented requests and/or responses, additional objects and structures are needed to process and track fragmented data packets.

Figure 6A:
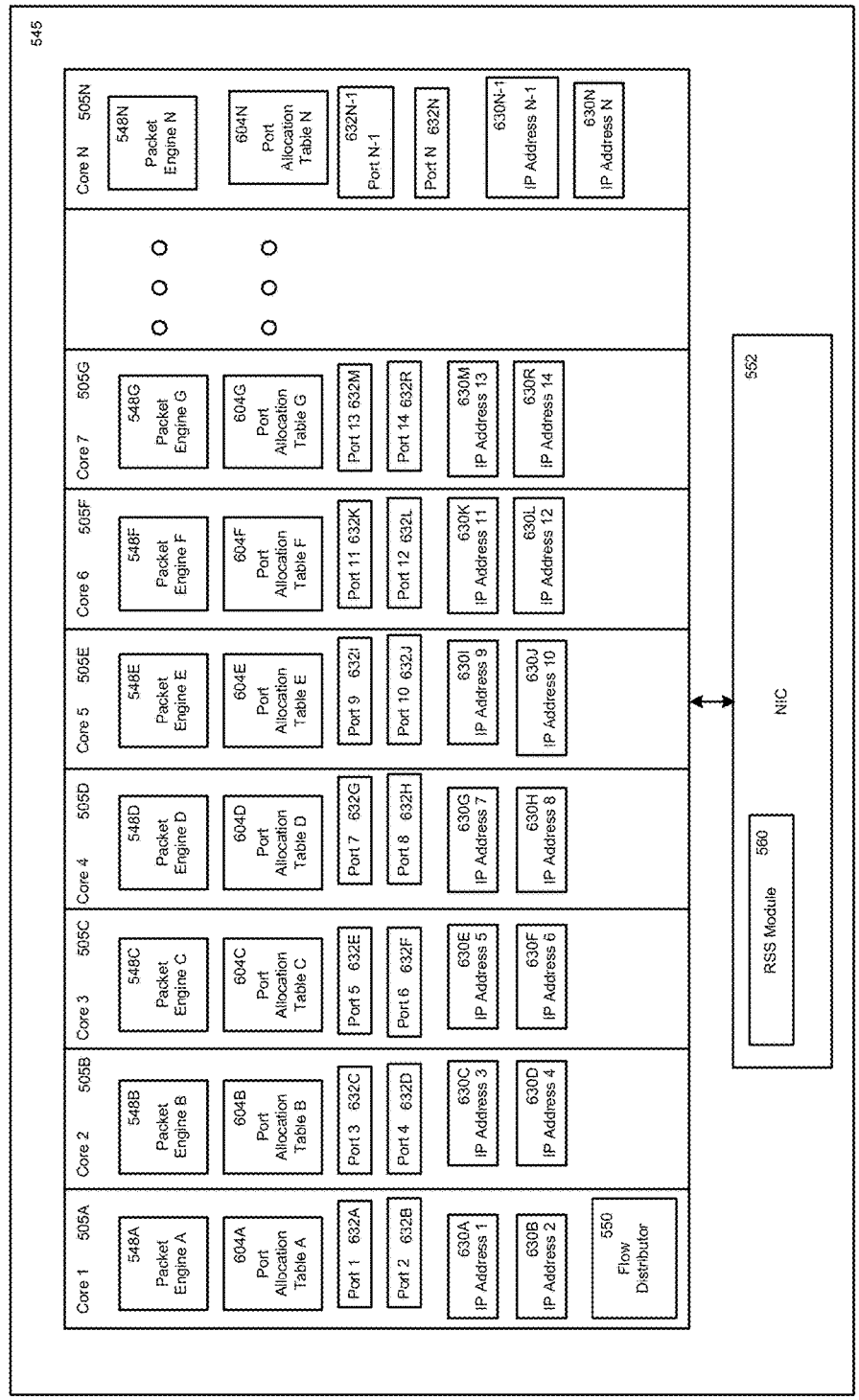
FIG. 6A is a block diagram of an embodiment of a multi-core system.

Illustrated in FIG. 6A is an embodiment of a multi-core system 545. This system 545 can include, in most embodiments, one or more network interface cards (NIC) 552 which can execute or include a RSS module 560. The NIC 552 can communicate with one or more cores 505 where each core can execute a packet engine 548 and/or a flow distributor 550. In some embodiments, each core 505 can store one or more port allocation tables 604 and can comprise one or more ports 632 and one or more internet protocol (IP) addresses 630.

Further referring to FIG. 6A and in more detail, in one embodiment, the multi-core system 545 can be any of the multi-core systems 545 described herein. In particular, the multi-core system 545 can be any of the multi-core systems 545 described in FIGS. 5B-5C. The multi-core system 545 can execute on an appliance 200, a client, a server or any other computing machine that executes the multi-core system 545 described herein. While the multi-core system 545 illustrated in FIG. 6A includes a plurality of cores 505 and a NIC 552, in some embodiments the multi-core system 545 can comprise additional devices and can execute additional programs, clients and modules.

In one embodiment, the multi-core system 545 can comprise a NIC 552 such as any of the NICs described herein. Although the multi-core system 545 illustrated in FIG. 6A depicts a multi-core system 545 having a single NIC 552, in some embodiments, the multi-core system 545 can have a plurality of NICs 552. These NICs 552 can be the same type of NIC 552, and in other embodiments can be different types of NICs 552. The NIC(s) 552 can communicate with one or more of the processing cores 505 in the multi-core system 545. For example, the NIC 552 can communicate with each of a first core 505A, a second core 505B, a third core 505C, a fourth core 505D, a fifth core 505E, a sixth core 505F, a seventh core 505G, and any "N" number of cores 505N, where "N" is a whole number greater than zero. In other embodiments, the NIC 552 can communicate with a single core 505 or a subset of cores 505. For example, the NIC 552 may communicate with a first core 505A, or cores one through 4 505A-505D. In embodiments where multiple NICs 552 are included within the multi-core system 545, each NIC 552 can communicate with one or more cores 505. For example, a first NIC 552 can communicate with cores one through 4 505A-505D, while a second NIC 552 can communicate with cores five through seven 505E-505G. In other embodiments where multiple NICs 552 are included within the multi-core system 545, one or more NICs 552 can communicate with the cores 505 while the other NICs 552 can perform an alternative function, communication with other systems or devices within the multi-core system 545, or can function as redundant NICs 552 that are used as backup when a primary NIC 552 fails. The NICs 552, in some embodiments, can interface with a network and with the multi-core system 545 via transmit and receive queues without having specific knowledge of the cores 505 or of the multi-core system 545 architecture. In these embodiments, the NICs 552 can simply transmit data packets stored in a NIC transmit queue, and receive network packets transmitted over a network.

In some embodiments, the NIC 552 executes a RSS module 560 such as any of the RSS module 560 described herein. The RSS module 560 applies a hash function to a tuple or sequence of values comprising any combination of the following: a client IP address; a client port; a destination IP address; a destination port; or any other value associated with the source or destination of a data packet. In some embodiments, the value that results from the application of the hash function to the tuple, identifies a core 505 within the multi-core system 545. The RSS module 560 can use this property of the hash function to distribute packets across cores 505 in a multi-core system 545. By distributing packets across the cores 505 of the multi-core system 545, the RSS module 560 can symmetrically distribute network traffic across the cores 505 in a manner substantially similar to flow-based data parallelism.

The cores 505 within the multi-core system 545 can be any of the cores 505 described herein. In one embodiment, the multi-core system 545 can include any "N" number of cores where "N" is a whole number greater than zero. In other embodiments, the multi-core system 545 can include eight cores. Cores 505 can be dedicated to process programs or services performing certain functions, and in some embodiments, can be dedicated to process data packets received or transmitted by certain devices or program modules. In some embodiments, each core 505 can execute any of the following: a packet engine 548 such as any of the packet engines 548 described herein or a flow distributor 550 such as any of the flow distributors 550 described herein. In other embodiments, each core 505 stores, in an associated storage repository, any of the following: a port allocation table; a listing of ports of the core 505; or a listing of IP addresses of the core 505.

In one embodiment, each core 505 executes a packet engine 548A-N and may include any of the vServers 275 described herein. A packet engine 548A-N can be included in each core 505, and collectively the packet engines 548A-N can be referred to as a packet engine 548. Packet engines 548, in some embodiments, alter or modify tuples of data packets according to flow distribution rules executed by each packet engine 548. In one embodiment, a packet engine 548 replaces a client IP address in a tuple of a data packet received by the packet engine 548, with an IP address 630A-B of the core 505 on which the packet engine 548 executes. The packet engine 548, in another embodiment, replaces a client port in a tuple of a data packet received by the packet engine 548, with a port 632A-B selected from a plurality of ports 632A-B of the core 505 on which the packet engine 548 executes. In still other embodiments, the packet engine 548 maintains all aspects of a data packet including the contents of a tuple of the data packet. The packet engine 548, in some embodiments, communicates with one or more servers 106 to forward servers 106 received data packets that are destined for those servers 106. Similarly, the packet engine 548, in some embodiments, communicates with one or more clients 102 to forward clients 102 received data packets that are destined for those clients 102.

Each core 505, in some embodiments, accesses a storage repository allocated to each core 505 or a shared storage repository available to all cores 505 in a multi-core system 545 via a packet engine 548 or any other module or object executing on the core 505. Thus, each module, program, client and/or object executing on the core 505 can access any storage repository accessible to the core 505. In one embodiment, a port allocation 604A-N is stored in a storage repository either shared or allocated to a specific core 505. A single core 505 can have one or more port allocation tables 604A-N (referred to generally as port allocation table 604) where each port allocation table 604 lists both available and un-available ports on a particular core 505A. In one embodiment, a core 505 can have one port allocation table 604, while in other embodiments a core 505 can have 64 or 256 port allocation tables 604. For example, Port Allocation Table A 604A on Core 1 505A can store entries indicating the status of each port 632A-B on Core 1 505A. The status of each port 632A-B can include any of the following characteristics: whether the port is open or closed; whether the port has been assigned, i.e. whether the port is available or un-available; whether the port is within a pre-assigned range; and any other pertinent characteristic of the port. Thus, if Packet Engine A 548A on Core 1 505A wants to determine whether a particular port is open and/or available, Packet Engine A 548A can query Port Allocation Table A 604A to determine whether the desired port is open and/or available.

In instances where a core 505 has multiple port allocation tables 604, each port allocation table can be associated with a value or other unique identifier. Each port allocation table 604, in one embodiment, has an identifying value that can be determined by applying a hash function to a portion of a tuple of a data packet. Therefore any of the hashes described herein can be applied by a packet engine 548 or flow distributor 550 to any combination of a client IP address, a client port, a destination IP address and/or a destination port to determine a unique value for that data packet. This unique value further identifies a port allocation table 604 on the core 505. For example, if a packet engine 548B on Core 2 505B wants to assign a port to a received data packet, the packet engine 548B first applies a hash to a client IP address and a destination IP address identified in the data packet. Based on the result of the hash, the packet engine 548B selects a port allocation table 604 from amongst one or more port allocation tables 604 on Core 2 505B, and selects a port 632C-D based on a review of the selected port allocation table 604.

Port allocation tables 604, in some embodiments, can be dynamically altered by a packet engine 548, flow distributor 550 or other program, service or device based on changes made to ports 632 of a core 505, or based on allocation of ports 632 to a data packet or transaction. In one embodiment, when a section of ports is assigned to a particular port allocation table 604 in a core 505 or to a particular core 505, the port allocation table 604 is updated to reflect the assignment. The update can either be an update to the entries of the affected ports 632 to reflect the assignment, or an update of the affected ports 632 to list the ports 632 within the section of ports 632 as open and all other ports 632 as closed. In other embodiments, once a port is assigned to a data packet or transaction between two computing machines, the port allocation table 604 is updated to reflect the assignment by listing a state or status of the assigned port, such as closed or unavailable and in some cases by identifying the data packet or transaction.

In some embodiments, each packet engine 548 or core 505 can be assigned, allocated or otherwise associated with one or more port numbers 632 (referred to generally as ports 632.) A port number can be a logical data structure for an endpoint in a network, and in some embodiments can be referred to as a port. In some embodiments, a port number can be included in the header of a data packet and can refer to a process that the data packet is to be forwarded to. While FIG. 6A illustrates each core 505 as having two ports 632, each core 505 has multiple ports 632, i.e. hundreds and in some cases thousands or millions of ports 632. Ports 632, in most embodiments, are identified by unique values or numbers. Assigning a data packet or transaction to a port 632 can comprise updating a header of the data packet or data packets of the transaction to reflect the unique value or number associated with the assigned port 632. Ports 632, in many embodiments, are tracked within port allocation tables 604 on each core 505. While each core 505 has its own set of ports 632, the values or number associated with each port 632 can repeat on each core 505. For example, Core 3 505C can have ports one through three-thousand, while Core 5 505E can also have ports one through three-thousand. The uniqueness of each port in Core 3 505C and Core 5 505 E comes from the fact that Core 3 505C ports are associated with one or more IP addresses specific to Core 3 505C, and Core 5 505E ports are associated with one or more IP addresses specific to Core 5 505E.

Similarly, each packet engine 548 or core 505 can be assigned, allocated, associated with or host one or more IP addresses 630A-B. While FIG. 6A illustrates each core 505 as having two IP addresses 630 (referred to generally as IP addresses 630) each core 505 can have any "N" number of IP addresses 630 where "N" is a whole number greater than zero. In some embodiments, the IP addresses 630 of a core 505 are pre-assigned by an administrator, application or other service or program executing in the multi-core system 545. In other embodiments, a group or range of IP addresses 630 are assigned to each core 505. In still other embodiments, the same IP address 630 is assigned to each core 505. This IP address 630, in most embodiments, is an IP address of the multi-core system 545.

In one embodiment, a first core 505 can execute a flow distributor 550. The flow distributor 550 can be any of the flow distributors 550 described herein. While FIG. 6A illustrates a multi-core system 545 where the flow distributor 550 executes on a first core 505, each core 505 can execute an instance of the flow distributor 550 specific to that core 505. In instances where the flow distributor 550 executes on a single core 505, that core can be considered the control or master core. In still other embodiments, the flow distributor 550 can executed on at least one NIC 552 in the multi-core system 545. In embodiments where a RSS module 560 is included in the multi-core system 545, the system 545 may not include a flow distributor 550.

Figure 6B:
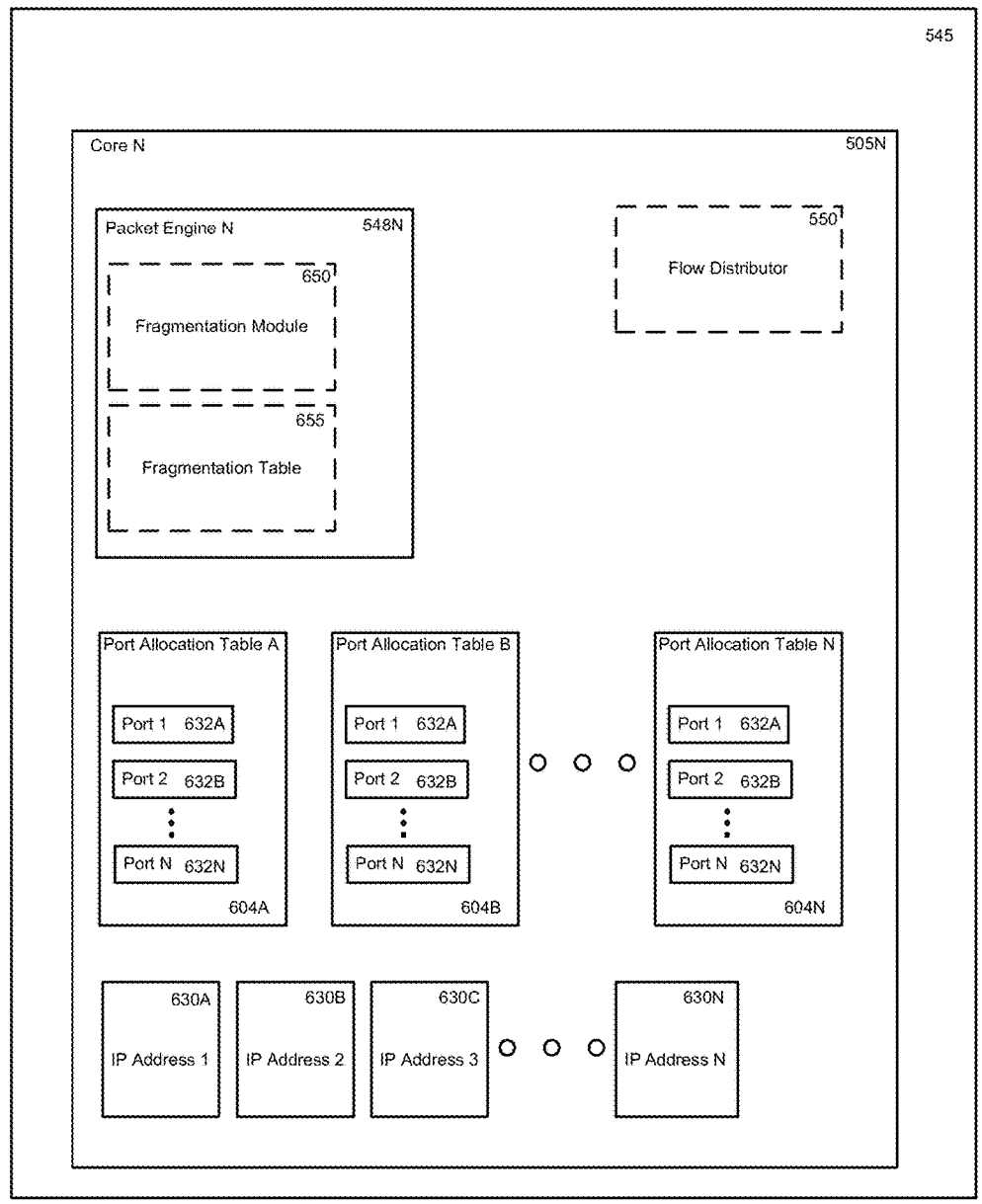
FIG. 6B is a block diagram of an embodiment of a core within a multi-core system.

Illustrate in FIG. 6B is a detailed description of at least one of the cores 505 in a multi-core system 545. The core 505N can be any of the "N" cores in the multi-core system 545 where "N" is a whole number greater than zero. The core 505N can comprise a flow distributor 550, a packet engine 548N, one or more port allocation tables 604, and one or more IP addresses 630. The packet engine 548N can execute a fragmentation module 650 that can further access a fragmentation table 655 accessible by both the packet engine 548N and the fragmentation module 650. Each port allocation table 604 can store or track one or more ports 632.

Further referring to FIG. 6B, and in more detail, in one embodiment the multi-core system 545 can be any of the above-described multi-core systems 545. Similarly, the core 505 can be any of the above-described cores 505. In one embodiment, each of the cores 505 in the multi-core system 545 comprises the elements of the core 505 described in FIG. 6B. In other embodiments, the cores 505 of the multi-core system 545 comprise combinations of the elements of the core 505 described in FIG. 6B.

In one embodiment, the core 505 can execute a flow distributor 550 or an instance of a flow distributor 550. In some embodiments, the core 505 can execute multiple instances of a flow distributor 550. The flow distributor 550 can be any of the flow distributors 550 described herein. In other embodiments, the core 505 does not execute or otherwise comprise a flow distributor 550 or an instance of a flow distributor 550. The core 505, in these embodiments, can communicate with a flow distributor 550 executing on another core 505 or on another device in the multi-core system 545 via the packet engine 548N or another program or module executing on the core 505.

The core 505 or a packet engine 548 executing on the core 505 can access or otherwise be associated with multiple port allocation tables 604, supra. In one embodiment, the core 505 can access a single port allocation table, while in other embodiments the core 505 can access an "N" number of port allocation tables where "N" is a whole number greater than zero. The port allocation table 604 can be any of the port allocation tables 604 described herein. While FIGS. 6A-6B describe a port allocation table, in other embodiments each core 505 can access a port list of available and un-available ports. In still other embodiments, each core 505 can access a storage repository storing information about the availability of each port 632 of a core 505.

Port allocation tables 604, in most embodiments, track characteristics or the status of ports 632 of or used by a core 505. A port allocation table 604 can track which ports are available, open or free on all local IP addresses of a core 505 or of the multi-core system 545. The ports 632, in many embodiments, can be any of the ports described herein, and can be any port. In some embodiments, ports 632 are associated with a particular port allocation table 604. For example, Port Allocation Table A 604A tracks ports 1-N 632A-N, while Port Allocation Table B 604B tracks ports 1-N 632A-N. In each case, the ports 632 tracked by the port allocation table are specific to that port allocation table. Therefore, although the ports 632 may be the same number, the ports 632 tracked by Port Allocation Table A 604A are specific to Port Allocation Table A 604A, and the ports 632 tracked by Port Allocation Table B 604B are specific to Port Allocation Table B 604B. The specificity of each port is determined by the characteristics of the tuple of the data packet to which a port is allocated. For example, a first data packet has a first tuple with a first client IP address and a first destination address. A second data packet has a second tuple different than the first tuple and containing either or both of a different client IP address and destination address, i.e. a second client IP address and a second destination address. Although each of first data packet and the second data packet may be assigned the same port number; the first data packet can be associated with a port allocation table 604 corresponding to the first client IP address and/or the first destination address. Similarly, the second data packet can be associated with a port allocation table 604 corresponding to the second client IP address and/or the second destination address.

In some embodiments, the port allocation table 604 or a portion of the port allocation tables can be stored on a computing device or in a storage repository remotely located from the multi-core system 545. The port allocation table(s) 604 can be stored on an appliance, computing machine, or in a storage repository located outside of the multi-core system 545. When the port allocation table(s) 604 are located outside of the multi-core system 545, the computing machine, device or a program or agent executing on the computing machine, device or within the storage repository can communicate with the multi-core system 545. Once communication between the remote port allocation table(s) 604 and the multi-core system 545 is established, packet engine(s) 548 in the multi-core system 545 can query and update the remote port allocation table(s) 604 in a manner substantially similar to the manner in which the packet engine(s) 548 queries and updates local port allocation table(s) 604.

Each core 505 in the multi-core system 545, in some embodiments, includes one or more IP addresses 630A-N (generally referred to as IP address 630.) The IP addresses 630 can be any IP address or address, and can be any IP address 630 described herein. In one embodiment, each port allocation table 604 can be associated with a particular IP address 630. This IP address 630, in some embodiments, can be a proxy or dummy IP address such as 0.0.0.1. Similarly, in some embodiments, the cores 505 of the multi-core system 545 can be associated with a particular IP address 630 or range of IP addresses.

In some embodiments, the packet engine 548N executes or comprises a fragmentation module 650. The fragmentation module 650, in some embodiments, can be a hardware element included in the multi-core system 545. In other embodiments, the fragmentation module 650 is a software module executing on the core 505. In still other embodiments, the packet engine 548 executes the fragmentation module 650 which can comprise any combination of hardware and software. The fragmentation module 650 can be, in some embodiments, included in the packet engine 548 such that the packet engine 548 executes instructions that are otherwise executed by the fragmentation module 650. Additionally, in some embodiments, the packet engine 548N can access a fragmentation table 655 stored in memory within the multi-core system 545. The fragmentation module 650, in some embodiments, inputs data packet fragments and applies a fragmentation action. In embodiments where the fragmentation action is "Assemble," the fragmentation module 650 assembles the data packet fragments to re-generate or recreate the data packet. In other embodiments where the fragmentation action is "Bridge," the fragmentation module 650 transmits each data packet fragment to a different core 505 for re-assembly into the original data packet. In some embodiments, the fragmentation module 650 assembles the data packet fragments to re-generate or recreate the data packet regardless of whether the fragmentation action is "Assemble" or "Bridge." The fragmentation action, in some embodiments, can dictate any of the following: assemble a port of the data packet fragments and bridge the remaining fragments; mark the data packet fragments prior to bridging them; assemble only those data packet fragments having a pre-determined set of characteristics; assemble only the header of the data packet and transmit the rest of the data packet fragments to a different core 505 for re-assembly.

In one embodiment, the fragmentation module 650 determines a fragmentation action based in part on whether a protocol control block (PCB) or network address translation protocol control block (NATPCB) is created. When either of a PCB or NATPCB is present, the packet engine 548 or the flow distributor 550 that receives a fragmented data packet first determines a destination core for the data packet fragments. The fragmentation action to be applied to the data packet fragments can be determined based in part on the type of connection between the multi-core system 545 and the computing machine that originated the data packet fragments. In some embodiments, determining the fragmentation action comprises doing PCB, NATPCB, fragmentation rule, Reverse NAT (RNAT) and service lookups. The packet engine or flow distributor that receives the data packet fragments, in one embodiment, forwards the determined fragmentation action to a packet engine or flow distributor executing on the destination core. Thus, when the data packet fragments are transmitted to the destination core, the fragmentation action can be applied to the data packet fragments.

In other embodiments, when either of a PCB or NATPCB is present, the packet engine 548 or the flow distributor 550 that receives a fragmented data packet first assembles the data packet fragments into a reassembled data packet until a complete packet header is available. A destination core for the data packet fragments is then determined. If the core that received the data packet fragments is not the destination core, then a packet engine or flow distributor on the receiving core does NATPCB/PCB lookups until a fragmentation action is determined. In embodiments where the receiving core is the destination core, a packet engine on the receiving core does service and RNAT lookups to determine the fragmentation action.

In many embodiments, when a receiving core is not the destination core, the receiving core can determine the fragmentation action and transmit a message to the destination core indicating the correct fragmentation action. In one embodiment, a packet engine on the receiving core transmits the fragmentation action along with the following values: a source IP address; a destination IP address; a source port and a destination port. The fragmentation action when determined can be stored in a fragmentation table 655. In some embodiments, when a destination core receives a fragmentation action a packet engine or flow distributor on the destination core can store the fragmentation action in a fragmentation table 655. The fragmentation action can be stored along with any of the following identifying information: a client IP address; a source IP address; a destination IP address; a source port; a client port; or a destination port.

In some embodiments, when the received data packet fragments are UDP fragments, each data packet is hashed based on a two tuple. This two tuple can comprise any of the following values: a client IP address; a source IP address; a destination IP address; a source port; a client port; or a destination port. A determination about the fragmentation action and a determination as to what the destination core is can be made according to any of the above-described methods.

Distribution of data packets, network traffic or requests and responses can be accomplished by any of the parallel computing schemes described herein. In one embodiment, the distribution of network traffic can be based on a symmetric flow distribution. Symmetric flow distribution can be accomplished using the Toeplitz hash or any comparable hash to determine a destination core for each data packet received by the multi-core system 545. In some embodiments, the symmetric flow distribution hash, or the symmetric hash distribution (SHD) has is substantially the same as the hash used by the RSS module 560. The hash operates by inputting a byte stream, such as a tuple or sequence of values, and supplying the RSS driver within the RSS module 560 with a key that can be used within the hash calculation. Thus, when an array of "N" bytes is inputted into the hash function, the byte stream can be identified as input[0] input[1] input[2] input[N−1]; where the leftmost byte is input[0] and the leftmost bit is the most significant bit of input [0], and where the rightmost byte is input [N−1] and the rightmost bit is the least significant bit of input [N−1]. The hash can, in some embodiments, operate according to the following relationship:

For all inputs up to the value "N", calculate the following: for each bit "B" in input[ ] from left to right, if "B" is equal to one then ("Result"^=(leftmost 32 bits of K)) and shift K left 1 bit position, then return "Result."
The hash, in some embodiments, is distributed over a XOR operation according to the following equation or relationship, Hash(A xor B)=Hash(A) xor Hash(B). In other embodiments, the hash can be distributed over any logical operation such as: NAND; NOR, OR, AND or any other logical operation functional in the methods and systems described herein.

The tuple or sequence of values inputted into the hash can be a concatenation of any of the following values: client IP address; source IP address; destination IP address; local IP address; dummy IP address; assigned IP address; appliance IP address; client port; source port; destination port; local port; dummy port; assigned port; appliance port; or any other IP address or port. In some embodiments, the order of the tuple is maintained such that the tuple is a concatenation of client IP address, client port, destination IP address and destination port. The tuple can comprise two, four, six or any number of values. Additionally, the tuple can comprise any type of value, i.e. numeric, binary, trinary, alphabetic, or alpha-numeric.

Included below are examples of how the hash is applied in different versions of the internet protocol and when TCP or UDP is used. These examples are meant to be illustrative of applying the hash and are not meant to limit the scope of the Example 1—IPV4: TCP/UDP In this example, the tuple comprises a concatenation of the following values: source address; destination address; source port; and destination port. The tuple, or input string, can therefore be characterized by the following relationship: INPUT[12]=@12-15, @16-19, @20-21, @22-23. The entries @n-m identify a byte range, i.e. n=12, m=15, @12-15. The application of the hash to this input string is characterized by following equation:

Hash Result=ComputeHash(Input,12)

Example 2—IPV4: Others

In this example, the tuple comprises a concatenation of the following values: source address; and destination address. The tuple, or input string, can therefore be characterized by the following relationship: INPUT[8]=@12-15, @16-19. The entries @n-m identify a byte range, i.e. n=12, m=15, @12-15. The application of the hash to this input string is characterized by following equation:

Hash Result=ComputeHash(Input,8)

Example 3—IPV6: TCP/UDP

In this example, the tuple comprises a concatenation of the following values: source address; destination address; source port; and destination port. The tuple, or input string, can therefore be characterized by the following relationship: INPUT[36]=@8-23, @24-39, @40-41, @42-43. The entries @n-m identify a byte range, i.e. n=8, m=23, @8-23. The application of the hash to this input string is characterized by following equation:

Hash Result=ComputeHash(Input,36)

Example 4—IPV6: Others

In this example, the tuple comprises a concatenation of the following values: source address; and destination address. The tuple, or input string, can therefore be characterized by the following relationship: INPUT[32]=@8-23, @24-39. The entries @n-m identify a byte range, i.e. n=8, m=23, @8-23. The application of the hash to this input string is characterized by following equation:

Hash Result=ComputeHash(Input,32)

In some embodiments, when the multi-core system 545 intercepts or otherwise processes data packets and/or network traffic that does not use the internet protocol, no hash is calculated. In this embodiment, the non-IP packets or traffic can be routed to a default core 505. This core 505 can be dedicated to handling non-IP packets or can allocate a certain amount of resources to the handling and processing of non-IP network traffic.

2. A Method and System for Providing Symmetrical Request and Response Processing Distributing network traffic amongst one or more cores in a multi-core system, can include obtaining a data packet or request, identifying a tuple of the data packet, applying a hash to the tuple, a forwarding the data packet to a core identified by the hash result. The hash can be any of the above mentioned hashes, or can be any hash having the characteristics of the above-described hash. In particular, the hash can be any hash that, when applied to a tuple, generates a result that identifies at least one core in a multi-core system. The tuple can be comprised of any number of characteristics of the data packet. In some embodiments, the tuple can comprise a source IP address, a destination IP address, a source port and a destination port.

To ensure that a response or other data packet associated with the previously processed data packet is forwarded or otherwise distributed to the same core, the packet engine selects an IP address of the packet engine or core, and a port number of the packet engine or core that together with the destination IP address and destination port can comprise a second tuple. The result of applying the above-described hash to the second tuple is a hash result that identifies the first core. By modifying the request with the second tuple, the packet engine can ensure that any response to the request will include the second tuple. Accordingly, when a flow distributor applies the above-described hash to a tuple of the response, the result will identify the first core. Thus, the flow distributor distributes the response to the same first core that the request was distributed to.

Each tuple is sufficiently unique such that the hash result is also sufficiently unique for the purposes of symmetrically distributing requests and responses across one or more packet engines executing on cores within the multi-core system 545. The hash is symmetric because there can exist another tuple that will cause the hash to generate exactly the same result as the result of applying the hash to a first tuple. To verify that the second tuple will cause a response packet to return to the same core, the packet engine chooses the elements of the second tuple to ensure that they will generate a hash result substantially the same as a first hash resulting from the application of the hash to the first tuple.

Figure 7A:
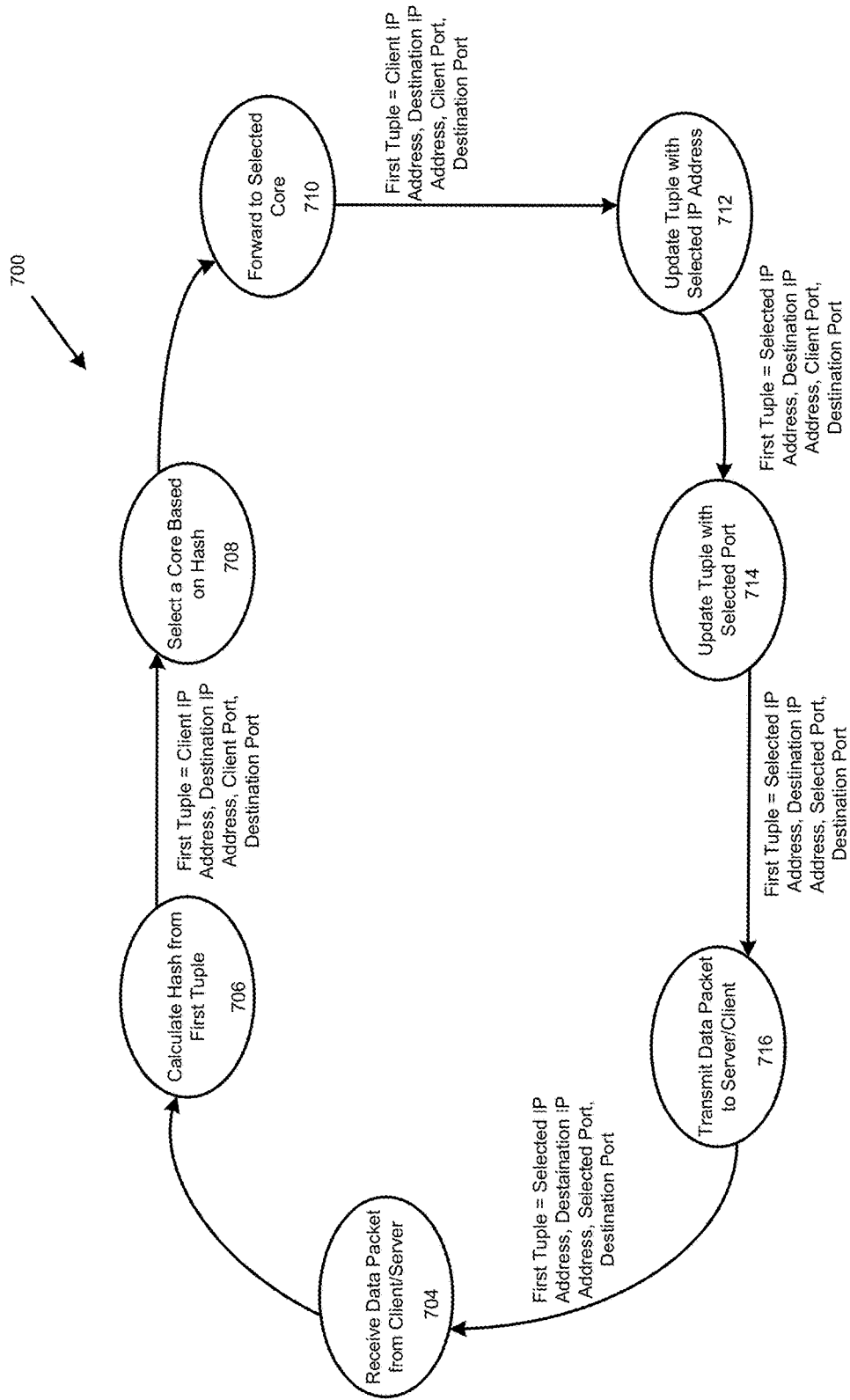
FIGS. 7A-7C are flow diagrams of embodiments of a method for distributing data packets across a multi-core system.

Illustrated in FIG. 7A is a flow diagram depicting one embodiment of a method 700 for using the above-discussed hash to distribute network traffic amongst one or more cores 505 in a multi-core system 545. First, a flow distributor 550 or RSS module 560 of the multi-core system 545, receives data packets from a client, server or other computing machine (Step 704), and calculates a hash value by applying the hash to a first tuple of the received data packet (Step 706). The first tuple can comprise a client IP address, a destination IP address, a client port, and a destination port. Applying the hash to the first tuple can, in some embodiments, result in a value sometimes referred to as the hash. A core 505 in the multi-core system 545 is selected based on the hash result value (Step 708) and the received data packet is forwarded to the selected core (Step 710). At this point the first tuple still comprises the following values: client IP address; destination IP address; client port; and destination port. A packet engine 548 on the selected core 505 receives the data packet and updates the tuple with a selected IP address of either the multi-core system 545, appliance 200, or selected core 505 (Step 712). The first tuple now comprises the following values: the selected IP address; the destination address; the client port; and the destination port. The packet engine 548 can then identify a port that, when included in the first tuple in lieu of the client port, will cause the data packet the return to the selected core 505. Upon identifying this port, the packet engine 548 updates the first tuple with the selected port (Step 714). The elements of the first tuple now comprise: the selected IP address; the destination address; the selected port; and the destination port. The data packet and its modified tuple are then transmitted to a server, client or other computing machine (Step 716). Any responses to this data packet are forwarded to and received by the multi-core system 545 (Step 704). The method 700 then repeats itself.

Further referring to FIG. 7A, in one embodiment the client IP address and the client port can refer to a source IP address and a source port. The source IP address identifies the computing machine or appliance from which the data packet originated. In some embodiments, the source computing machine or appliance generated the data packet. In one embodiment the client IP address can refer to a client, while in other embodiments the client IP address can refer to a server or other computing machine or appliance. Similarly, the destination IP address identifies a destination computing machine or appliance to which the data packet is being transmitted. In some embodiments the destination computing machine or appliance is a server, while in other embodiments the destination computing machine or appliance is a client or other computing machine or appliance.

In some embodiments steps of the method 700 are carried out by a flow distributor 550. In other embodiments, these steps can be carried out by a RSS module 560. In still other embodiments, these steps can be carried out by a combination of a RSS module 560 and flow distributor 550. In other embodiments, the flow distributor 550 is used when the NIC 552 is a RSS-unaware NIC 552, i.e. the NIC 552 does not include a RSS module 560. In still other embodiments, another distribution module or client executing within the multi-core system 545 can carry out any of the actions or steps carried out by the flow distributor.

Data packets received from a client, in some embodiments, are requests. In other embodiments, data packets received from a client are information, responses, updates, or any other type of information or communication. Data packets received from a server, in some embodiments, are responses. In other embodiments, data packets received from a server are information, requests updates or any other type of information or communication.

In many embodiments, the multi-core system 545 receives data packets from clients and/or servers on a network 104 (Step 704). The multi-core system 545, in most embodiments, is installed in front of one or more servers, clients and other computing machines and appliances such that any data packets transmitted to or by these servers, clients and other computing machines and appliances, must pass through the multi-core system 545. Thus, in some embodiments a NIC 552 in the multi-core system 545 receives all data packets. In other embodiments, one or more NICs 552 in the multi-core system 545 receive each data packet transmitted to or by the servers, clients and computing machines. The flow distributor 550 of the multi-core system 545 drains or otherwise obtains the received data packets from a NIC 552 receive queue in the NIC 552. Upon obtaining a data packet from the NIC 552 receive queue, the flow distributor 550 determines to which core 505 in the multi-core system 545 the data packet should be sent.

At the time the flow distributor 550 obtains a data packet from the NIC 552 receive queue, the data packet has a series of values that together comprise a tuple. In some embodiments, this tuple, or series of values, comprises a client IP address, a destination IP address, a client port and a destination port. The client IP address is the IP address of the source of the data packet, which in some instances can be a client and in other instances can be a server or other computing machine. The destination IP address is the IP address of the computing machine or appliance to which the data packet is being sent. Thus, in some instances the destination IP address is an address of a server and in other embodiments the destination IP address is an address of a client. The client port and the destination port are ports associated with either the source machine or the destination machine. These ports are typically configured prior to sending the data packet, however in some embodiments, the client port and/or the destination port is a dummy or proxy port, while in other embodiments the client port and/or the destination port is a default port.

Once the multi-core system 545 receives the data packet, the flow distributor 550 or any other module or program executing within the multi-core system 545 can apply the above-described hash to the first tuple (Step 706). In some embodiments, the first tuple is created prior to applying the hash. The first tuple can be created by concatenating the client IP address, the destination IP address, a client port and a source port. These values, in some embodiments, are stored in a header in the data packet. In other embodiments, these values are stored in metadata associated with the data packet. In still other embodiments, these values are stored in the load portion of the data packet and must be extracted from the data packet prior to creating the tuple. In some embodiments, concatenating these values can be done by any one of the RSS module 560, the flow distributor 550, or a concatenation program or module executing in the multi-core system 545. In other embodiments, concatenating these values can occur as part of the hash. In some embodiments, the hash can be applied according to any of the above-described methods. Applying the hash, in many cases, results in output such as a result value, a hash value or any other value representative of the outcome of applying the hash to the first tuple.

While the hash can, in some embodiments, be calculated by the flow distributor 550 or another module executing within the multi-core system 545, in other embodiments the hash can be calculated by a computing machine or appliance outside of the multi-core system 545. In one embodiment, a router remotely located outside of the multi-core system 545 can intercept data packets before they are received by the multi-core system 545. In this embodiment, the router can apply the hash to the data packets to determine which core 505 in the multi-core system 545 should receive each data packet. After determining to which core 505 a particular data packet should be transmitted, the router can transmit the data packet to the multi-core system 545 addresses in such a manner that the multi-core system 545 forwards the data packet to the proper core 505. In other embodiments, the hash can be applied by a computing machine or different appliance.

The flow distributor 550 or RSS module 560 can, in some embodiments, select a core 505 from the multi-core system 545 (Step 708) based on a value resulting from the application of the hash to the first tuple. In some embodiments, the value generated by the hash points to or identifies a core 505 in the multi-core system 545. This property of the hash can be exploited to substantially evenly distribute network traffic amongst the cores 505 in the multi-core system 545. In one embodiment, a table storing a listing of possible hash values and their corresponding cores is stored in a memory element or storage repository within the multi-core system 545. The flow distributor 550 or RSS module 560, upon applying the hash to obtain a resultant value, can query the table for a core corresponding to the resultant hash value. Entries in the table can be designed to ensure even distribution of network traffic amongst the cores 505.

Upon selecting a core 505, the data packet is forwarded to the selected core 505 (Step 710). The data packet can be forwarded by any one of the flow distributor 550, the RSS module 560 or an intra-core communicator (Not Shown.) In some embodiments, forwarding the data packet can include copying the data packet into a memory element, storage repository or cache that is accessible by each of the cores 505 in the multi-core system 545; and forwarding the core 505 selected to receive the data packet, a message indicating that the data packet is stored in memory and available for download by or to the selected core 505. A packet engine 548 or other module executing on the selected core 505 could then access the shared memory element to download the data packet. In other embodiments, the data packet can be forwarded to the selected core 505 via a core-to-core messaging system that uses an internal network comprising each of the cores 505 in the multi-core system 545. This core-to-core messaging system can utilize a network internal to the multi-core system 545 and addresses specific to each core 505 or packet engine 548 within the multi-core system 545. In some embodiments, data packets can be transmitted to a destination address of the core-to-core messaging system that corresponds to the selected core 505.

When a data packet is forwarded or transmitted to a selected core 505 (Step 710), the data packet can be received by a packet engine 548 executing on the selected core 505. Packet engines 548, in some embodiments, manage the receipt and transmission of data packets forwarded to cores 505. Once the packet engine 548 receives the data packet, the packet engine 548 can make any number of determinations about the data packet and can perform any number of operations on the data packet. In one embodiment, the packet engine 548 can determine that the source IP address and the source port of the first tuple does not have to be maintained. Based on this determination, the packet engine 548 can modify the first tuple to include a different source IP address and/or a different source port.

When a determination is made that packet engine 548 can modify either or both the client IP address and the client port, the packet engine 548 can then replace the client IP address with an IP address of the selected core 505 (Step 712). In some embodiments, the IP address can be an IP address of the multi-core system 545. In other embodiments, the IP address can be an IP address of the appliance 200. In still other embodiments, the IP address can be any one of the IP addresses of the selected core 505. The selected core 505, in some embodiments, can have one or more IP addresses 630. In one embodiment, the packet engine 548 can select one of the IP addresses 630 and replace the client IP address with the selected IP address 630. Upon modifying the tuple with the selected IP address 630, the first tuple is modified to comprise a selected IP address 630, the client port, the destination IP address and the destination port.

In some embodiments, the packet engine 548 selects a port from amongst the ports 632 of the selected core 505. In one embodiment, the packet engine 548 selects a port by iteratively applying the above-described hash to each possible IP address 630 and port 632 combination. The packet engine 548 selects a port 630 which, when included in the first tuple, identifies the selected core 505 when the above-described hash is applied to the first tuple. For example, the packet engine 548 can select an IP address 630 and then modify the first tuple with each available port 632 of the selected core 505 until the output of the hash identifies the selected core 505. In some embodiments, the packet engine 548 modifies the tuple with the selected port. Modifying the tuple can comprise inputting the selected port (Step 714) into the tuple or replacing the client port with the selected port. Once the tuple has been modified with the selected port, the tuple then comprises the following values: the selected IP address; the destination IP address; the selected port; and the destination port.

The packet engine 548, in most embodiments, transmits the data packet with the modified tuple to the client or server (Step 716). If the data packet originated at a server, then in many embodiments, the packet engine 548 transmits the data packet to a client and vice versa. In some embodiments, the data packet transmits the data packet to a computing machine or appliance corresponding to the destination IP address. In other embodiments, the packet engine 548 transmits the data packet to an intermediary or proxy server or appliance prior to transmitting the data packet to a destination computing machine or appliance.

Once the data packet is transmitted to a destination computing machine or appliance, the multi-core system 545 can receive another data packet (Step 704). In some embodiments, the method 700 can occur on a continual basis so long as the multi-core system 545 receives and transmits data packets and network traffic. While FIG. 7A illustrates a single instance of the method 700 where each step occurs individually, in other embodiments, multiple steps of the method 700 can occur simultaneously. For example, the packet engine 548 can receive a forwarded data packet (Step 710) at substantially the same time as the multi-core system 545 receives a data packet from a client or a server (Step 704). In another example, a packet engine 548A on a first core 505A receives a forwarded data packet (Step 710) at substantially the same time as a packet engine 548B on a second core 505B receives a forwarded data packet (Step 710). Therefore, any number of steps can occur at substantially the same time, including the same step.

Figure 8:
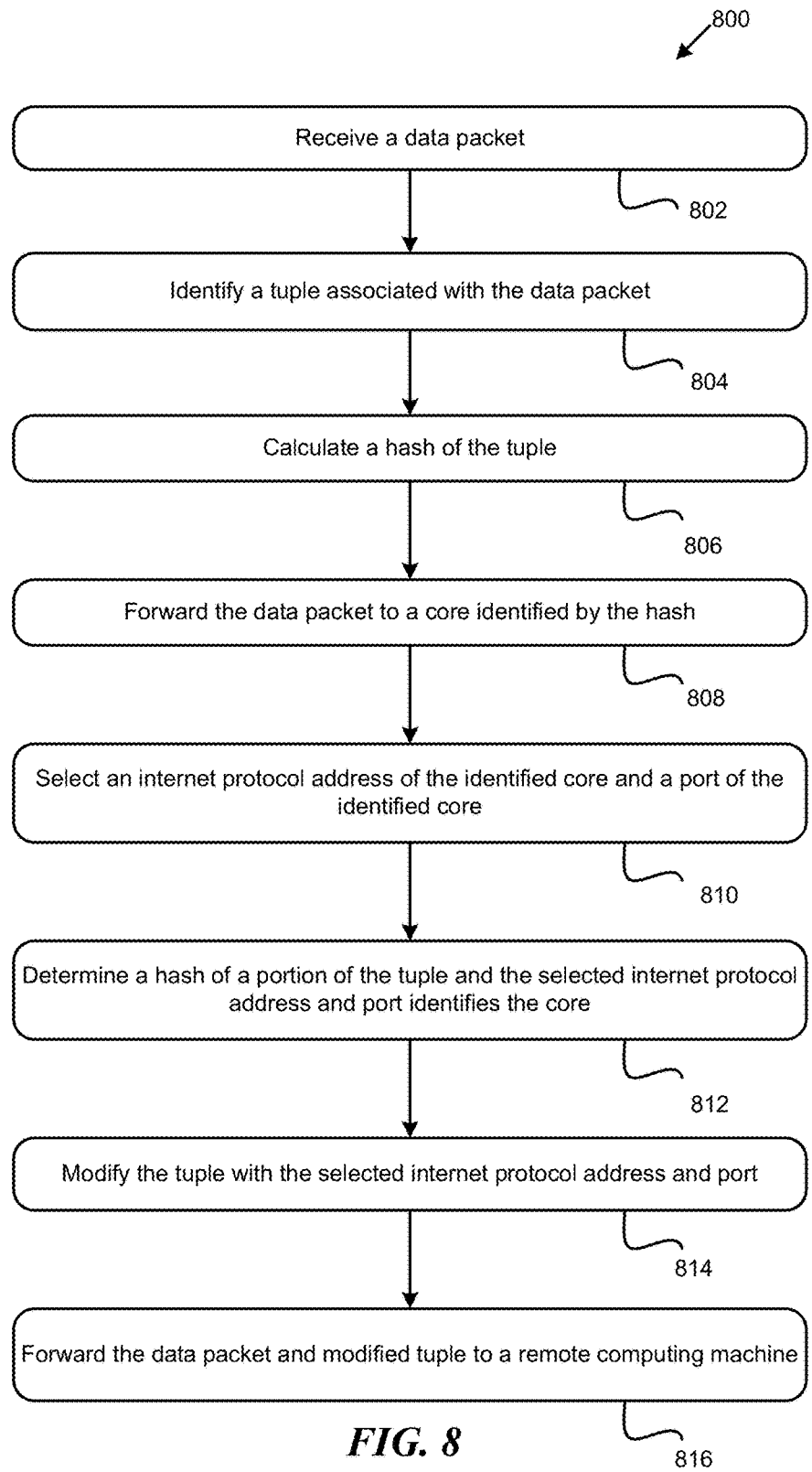
FIG. 8 is a flow diagram of an embodiment of a method for distributing data packets across a multi-core system based on a hash.

Illustrated in FIG. 8 is an embodiment of a method 800 for distributing data packets amongst cores 505 in a multi-core system 545. In one embodiment, the multi-core system 545 receives a data packet (Step 802) and a flow distributor 550 or RSS module 560 identifies a tuple of the data packet (Step 804). After identifying the tuple, the above-described hash is applied to the identified tuple (Step 806) to generate a resultant value. The resultant value, in most embodiments, identifies a core 505 in the multi-core system 545. The RSS module 560 or the flow distributor 550 transmits the data packet to the core 505 identified by the resultant hash value (Step 808). In some embodiments, a packet engine 548 on the selected core 505 receives the data packet and selects an IP address and port of the selected core 505 (Step 810). The packet engine 548 can then determine whether a hash of the selected IP address, the selected port and a portion of the tuple generates a value that identifies the selected core 505. When it is determined that the value generated by the hash applied to the above-mentioned tuple identifies the selected core 505, the packet engine 548 modifies the tuple with the selected IP address and port (Step 814). Upon modifying the tuple, the packet engine 548 or another module executing on the selected core 505 forwards the modified data packet to a remote computing machine (Step 816).

Further referring to FIG. 8, and in more detail, in one embodiment a NIC 552 in the multi-core system 545 receives one or more data packets transmitted to the multi-core system 545 over a network 104 (Step 802). In one embodiment, a flow distributor obtains data packets from the NIC 552. In other embodiments, a RSS module 560, packet engine 548 or other distribution module or program drains or otherwise obtains data packets from the NIC 552. The flow distributor can drain or obtain data packets from a receive queue on the NIC 552.

In some embodiments, the data packets received are a client request, while in other embodiments the data packets received are a server response. To ensure that a server response is handled by the same core 505 that handled the client request, the packet engine 548 that executes on the first core 505, selects an IP address and a port number that will cause a server response to be distributed to the first core 505. This IP address and port number are selected so that, when they are combined with the destination IP address and the destination port number, the resulting tuple identifies the first core 505. This resulting tuple, i.e. a second tuple, identifies the first core 505 in that when the above-described hash function is applied to the second tuple, the hash result identifies the first core 505. When the server generates a response, the response includes the selected IP address, the selected port number, the destination IP address and the destination port number. Thus, when the flow distributor 550 applies the above-described hash to the tuple within the server response, the hash result will identify the first core 505 and the server response is forwarded or allocated to the first core 505.

Once the flow distributor 550 receives the data packets, the flow distributor or a distribution module can identify a tuple of the data packet (Step 804). The tuple, in some embodiments, can comprise any combination of the following values: a client IP address; a destination IP address; a client port; a destination port; or any other IP address, port or other source or destination identifying value. The client IP address, in some embodiments, can be a source IP address. Similarly, the client port, in some embodiments, can be a source port. Identifying a tuple of the data packet can, in some embodiments, comprise generating the tuple by concatenating any of the above-mentioned values to create a string. The tuple, in some embodiments, is a string or array of values.

A hash or hash value is, in some embodiments, calculated by applying the above-described hash to the identified tuple (Step 806). The hash value can be referred to by any of the following designations: hash; hash value; result value; result; or value. The hash can be applied by the flow distributor 550 or by any other distribution module executing within the multi-core system 545.

After applying the hash, a determination can be made as to whether the resultant value identifies a core 505 in the multi-core system 545. When the hash result identifies a particular core 505, the data packet is forwarded to the identified core 505 by the flow distributor 550 or by any other flow distribution module (Step 808). In one embodiment, the flow distributor 550 forwards the data packet to a packet engine 548 executing on the identified core 505. The identified core 505 can be referred to as a first core 505. In some embodiments, the hash result may not identify a core 505 within the multi-core system 545. In these embodiments, the data packet can be forwarded to a default core 505 in the multi-core system 545. In still other embodiments, the data packet may not have an associated tuple. In those embodiments, the data packet can be forwarded to a default core 505 in the multi-core system 545.

Upon forwarding the data packet to the identified core 505, a packet engine 548 or other module or engine executing on the identified core 505 can receive the forwarded data packet. In some embodiments, a communication module executing on the identified core 505 receives the data packet and forwards the data packet to a packet engine 548 on the identified core 505. Once the packet engine 548 receives the forwarded packet, the packet engine 548 can select an IP address of the core 505 and a port of the core (Step 810). This IP address, in some embodiments, can be an IP address of the multi-core system 545 or an IP address of the appliance 200. In other embodiments, the IP address can be an IP address of the core 505. The core 505 can have one or more IP addresses, therefore in some embodiments the packet engine 548 can select an IP address based on a determination as to whether the IP address combined with a selected port and a portion of the first tuple identifies the identified core 505.

Selecting a port of the core 505 can include searching through ports associated with the selected core 505 to identify a port that when included in the first tuple, identifies the selected core 505. In some embodiments, the packet engine 548 can iterate through each IP address of the core 505 and each port of the core 505 to identify an IP address/port combination that identifies the selected core 505. For example, the selected core 505 can be a first core 505 having a tuple comprising a client IP address, a client port, a destination IP address and a destination port. The packet engine 548 can modify the tuple to include a selected IP address, a selected port, the destination IP address and the destination port. Before permanently modifying the data packet, the packet engine 548 first applies the above-described hash to the modified tuple (Step 812). If the resultant hash value identifies the first core 505, then the packet engine 548 permanently modifies the data packet to replace or change the client IP address to the selected IP address, and replace or change the client port to the selected port. If the resultant hash value does not identify the first core 505, then the packet engine 548 changes either or both of the selected IP address and the selected port, and applies the hash again.

In some embodiments, selecting either the port number or the IP address can include selecting an IP address from amongst one or more IP addresses of the first core 505 or the packet engine 548 executing on the first core 505, and selecting a port number from a port table associated with the first core 505 or from amongst one or more port numbers associated with the first core 505 or the packet engine 548. The packet engine 548 can select an IP address and a first port number. Upon determining that the first port number is not available, the packet engine 548 can select a second port number and determine that the second port number is available. Upon determining that the second port number, the packet engine 548 can then apply the above-described hash to a fourth tuple comprising the selected IP address, the second port number, the destination IP address and the destination core. Upon determining that the resulting hash value identifies the first core 505, the packet engine 548 modifies the client request to include the selected IP address, the second port number, the destination IP address and the destination core. In other embodiments, the packet engine 548 can determine that the first port is not available, can select a second IP address from amongst the available IP addresses, and can select a second port number from the plurality of ports associated with the first core 505. The packet engine 548 can then apply the above-described hash to a fifth tuple comprising the second IP address, the second port number, the destination IP address and the destination port. Upon determining that the resulting hash identifies the first core 505, the packet engine 548 can update the client request with the fifth tuple so that the client request identifies the second IP address and the second port number.

After applying the above-described hash (Step 812) to verify that the selected IP address and the selected port, when combined with the destination IP address and the destination port, identify the selected core 505, the packet engine can then modify the data packet so that the tuple comprises: the selected IP address; the destination IP address; the selected port; and the destination port (Step 814). In this embodiment, the client IP address and the client port are no longer included within the tuple. Rather, these values have been replaced by the selected IP address and the selected port.

The packet engine 548, in many embodiments, transmits the updated data packet and tuple to a remote computing device (Step 816) after modifying the data packet and tuple. In some embodiments, the remote computing device can be a client, a server or another computing machine or appliance located remote from the multi-core system 545. In other embodiments, the packet engine 548 can transmit the modified data packet to an intermediary device which forwards the data packet to a destination location. The destination location, in some embodiments, is identified by the destination IP address and/or the destination port.

The method 800, in some embodiments, can further include the flow distributor 550 receiving a response to the client request allocated to the first core 505. The response can be generated by a server and can comprise a tuple, (i.e. a second tuple or third tuple) comprising the selected IP address, the selected port number, the destination IP address and the destination port. The flow distributor 550 applies a hash to the tuple of the response and the resulting hash value identifies the first core 505. Subsequent to this determination, the flow distributor allocates or distributes the server response to the first core 505 or to a packet engine 548 executing on the first core 505.

In still other embodiments, the method 800 can further include a packet engine 548 executing on the first core 505, the packet engine 548 updating a port allocation table associated with the first core 505 and/or the packet engine 548. This port allocation table can be updated by the packet engine 548 with an entry or with information indicating that the selected port number included in the second tuple of the server response and the modified client request has been assigned to a data packet. Thus, any subsequent data packets or requests handled by the first packet engine 548 on the first core 505 cannot receive the selected port number because the port allocation table identifies that port number as unavailable.

One example of the method 800, as applied to a client request and corresponding server response includes receiving, by a flow distributor 550, a client request generated by a client communicating with the multi-core system 545. The flow distributor 550 identifies a first tuple of the client request, the first tuple comprising a client IP address, a destination IP address, a client port and a destination port. After identifying the first tuple, the flow distributor 550 applies the above-described hash function to the first tuple to generate a hash result that identifies a first core 505 in the multi-core system 545. The flow distributor 550 then forwards the client request to the first core 505 where it is received by a first packet engine executing on the first core 505. The first packet engine 548 receives the client request 548 and selects an IP address of the first core 505 or first packet engine 548 and a port number of the first core 505 or the first packet engine 548. The IP address and port are selected so that a hash of a second tuple comprising the selected IP address, the destination IP address, the selected port and the destination port will generate a hash result that identifies the first core 505. This is done so that any response to the client request will be distributed to the first core 505 rather than to another core 505 in the multi-core system 545. Ensuring that the same core 505 processes both the request and response reduces the need to generate unnecessary data copies of data packets handled by the multi-core system 545 and ensures symmetric request/response processing. Once an IP address and port number is selected by the first packet engine 548, the first packet engine 548 transmits the client request to a server. The flow distributor 550 then receives a server response to the client request, where the server response has a second tuple comprising the selected IP address, the selected port number, the destination IP address and the destination port. The flow distributor 550 applies the above-described hash to the second tuple and the hash result identifies the first core 505. Accordingly, the flow distributor 550 forwards the server response to the first packet engine 548 on the first core 505 for processing.

Figure 9:
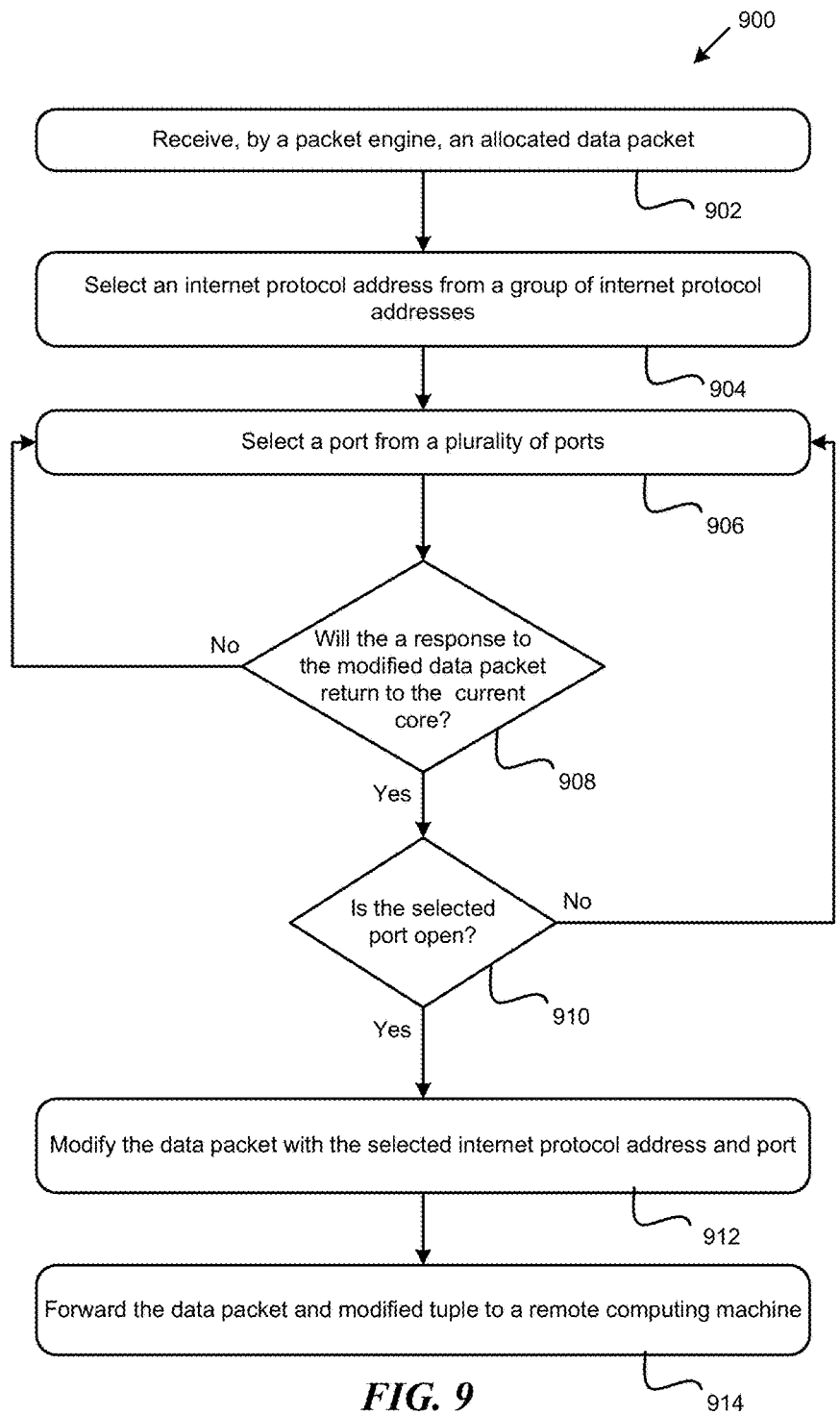
FIG. 9 is a flow diagram of an embodiment of a method for distributing data packets across a multi-core system via core-to-core messaging.

Illustrated in FIG. 9 is an embodiment of a method 900 for distributing network traffic amongst cores 505 in a multi-core system 545. The method 900 described in FIG. 9 illustrates how a packet engine 548 on a core 505 handles a received data packet. The packet engine 548 receives an allocated data packet (Step 902) and selects an IP address of the core 505 on which the packet engine 548 executes (Step 904). The packet engine 548 also selects a port number from a plurality of port numbers allocated or associated with the packet engine 548 or the core 505 (Step 906). Once an IP address and port number are selected, the packet engine 548 then determines whether a hash of the selected IP address and the selected port number together with a destination IP address and destination port number, will identify the current core 505. In particular, the packet engine 548 determines whether the selected port number will identify the current core 505 (Step 908). When it is determined that the selected port number will not identify the current core 505, the packet engine 548 selects the next port number from amongst the port numbers associated with the core 505 (Step 906). When it is determined that the selected port number will identify the current core 505, the packet engine 548 next determines whether the selected port number is open or otherwise available (Step 910). When it is determined that the selected port number is not open, the packet engine 548 selects the next port number from amongst the port numbers associated with the core 505 (Step 906). When it is determined that the selected port number is open or otherwise available, the packet engine 548 modifies the data packet with the selected IP address and the selected port number (Step 912) and forwards the data packet and its modified tuple to a remote computing machine (Step 914).

Further referring to FIG. 9, and in more detail, in one embodiment the method 900 can be carried out by a packet engine 548 executing on a core 505. In another embodiment, the method 900 can be carried out by a flow distributor 550 or instance of a flow distributor executing on the core 505. In still other embodiments, the method 900 can be carried out by any flow distribution module or agent that may execute on the core 505. While FIG. 9 contemplates processing a data packet that can be modified in part on a particular core 505, modification of the data packet can be handled, in some embodiments, by a control core in the multi-core system 545.

The packet engine 548 carrying out the steps of the method 900 described in FIG. 9 can execute on a particular core 505. The core 505, in most embodiments, is selected ahead of time by the method 800 illustrated in FIG. 8. Therefore in most instances, the data packet received by the packet engine 548 has been allocated to the core 505 based on the application of an above-described hash to a tuple of the data packet. This tuple, in most cases, comprises at least a client IP address, a destination IP address, a client port and a destination port. In some embodiments, the tuple can be any of the above described tuples and can comprise any number of source or destination identifying values. In still other embodiments, the client IP address can be a source IP address identifying the machine from which the data packet originated. Similarly, the client port can be a source port.

In one embodiment, a packet engine 548 executing on a particular core 505 in the multi-core system 545, receives data packets allocated to that particular core 505 (Step 902).

The packet engine 548 can directly receive data packets, or in some embodiments, a communication module executing on the core 505 can receive and transmit data packets. Receiving data packets, in some embodiments, can include receiving requests and responses such as client requests and server responses. In other embodiments, a virtual NIC (Not Shown) executing on the core 505 can receive and transmit data packets. Receiving data packets, in some embodiments, can further comprise draining data packets from a logical receive queue on the core 505. A logical receive queue can store data packets transmitted to a core 505. The packet engine 548 can access data packets in the logical receive queue by draining or otherwise obtaining the data packets from the receive queue according to a first-in-first-out method of access. Another possible method of access can be first-in-last-out.

When a packet engine 548 obtains a data packet, the packet engine 548 can in some embodiments determine whether the data packet can be modified. The packet engine 548, after determining what portions of the data packet can be modified, can modify the data packet. In some embodiments, the multi-core system 545 can be configured to instruct packet engines 548 executing within the multi-core system 545 to modify only certain portions of the data packet.

In some embodiments, the packet engine 548 can select an IP address of the core 505 from amongst one or more IP addresses associated with the core 505 (Step 904). The core 505 can have multiple IP addresses, and in some embodiments can have a range of IP addresses. In other embodiments, the core 505 can have a single IP address. While in some embodiments the packet engine 548 selects an IP address of the core 505, in other embodiments the packet engine 548 can select an IP address of the multi-core system 545 or an appliance 200 in the multi-core system 545.

Once the IP address is selected, the packet engine 548 can then select a port number from amongst a plurality of port numbers of the core 505 (Step 906). The core 505 can have one or more port numbers, and in some embodiments can store in a port allocation table a listing of each of the port numbers 505 of a multi-core system 545. Selecting a port can comprise cycling through the entries of a port allocation table listing each of the ports of a core 505 and selecting a port number. The port numbers can be cycled through numerically based on port number or based on the order in which the ports are listed in the port allocation table. In other embodiments, the packet engine 548 can select a port by cycling through a range of numbers or values corresponding to possible port numbers on the core 505.

In some embodiments, the packet engine 548 can select a first port number (step 906) and then determine whether that port is the correct port (Step 908) and whether that port is available or open (step 910). If the selected first port is either not the correct port number or not available or open, the packet engine 548 can select the a next port number, i.e. a second port number of the core 505, and again determine whether that port number is the correct port number (Step 908) and whether that port number is available or open (Step 910). In most embodiments, the packet engine 548 cycles through all possible port numbers until the packet engine 548 identifies a port number that is both the correct port number and an open port number.

Once the packet engine 548 selects a port number, the packet engine first determines whether the selected port number is the correct port number by determining whether the selected port number will cause a response packet to return to the selected core (Step 908). This determination can be made by applying the above-described hash to a tuple comprised of a concatenation of the following values: the selected IP address; the destination address; the selected port number; and the destination port number. Applying the above-described hash to this tuple generates a resultant hash value that either identifies or does not identify the core 505 on which the packet engine 548 is currently executing. Concatenating the tuple values to generate the tuple can be carried out by the packet engine 548 or by an instance of a flow distributor 550 executing on the core 505. Similarly, applying the hash to the tuple can be carried out by the packet engine 548 or by an instance of a flow distributor. When the resultant hash value identifies the current or selected core 505, the selected port number is the correct port number because it will cause a response packet to return to the current core 505. When the resultant hash value does not identify the current or selected core 505, the selected port number is not the correct port number because it will not cause a response packet to return to the current core 505. In this situation, the packet engine 548 will select another port number (Step 906) and reiterate the process of determining whether the port number is the correct port number (Step 910).

When it is determined that a selected port number is the correct port number (Step 908), a determination is then made as to whether the port number is available or open (Step 912). In most embodiments, a port number is open or available when any of the following is true: the port number is not being used; or the port number is available for use. In contrast, a port number is not open or available when any of the following is true: the port number has been assigned to another transaction, service or data packet; or the port number has been closed either by a network administrator or by the multi-core system 545. Whether a port number is available or open, is a characteristic that in many embodiments is tracked by a port number allocation table. The port allocation table can any of the above-mentioned port allocation tables and can be stored in any of the above-mentioned locations that a port table can be stored. In some embodiments, after the packet engine 548 determines that the port number is the correct port number, the packet engine 548 can determine that the port number is available by querying a port allocation table for the details, attributes or characteristics of a particular port number. When the response indicates both that the port number is open and that the port number has not been assigned to any other data packet, transaction, or server, then the packet engine 548 modifies the tuple with the selected IP address and the selected port number. However, when the response indicates that the port number is either not available or not open, the packet engine 548 selects another port number (Step 906) and repeats the process of determining whether the port number is the correct port number (Step 908) and whether the port number is open and available (Step 910).

When a correct, open and available port number is selected by the packet engine 548, the packet engine 548 then updates the data packet and therefore the tuple of the data packet to include the selected IP address and the selected port number (Step 912). Modifying or updating the tuple can comprise making any modification necessary to cause the tuple to comprise: the selected IP address; the destination IP address; the selected port number; and the destination port number. Thus, the client IP address and the client port number information can be replaced by the selected IP address and the selected port number.

After modifying the data packet, the packet engine 548 can transmit the modified data packet to a remote computing machine (Step 914). Transmitting the modified data packet to a remote computing machine can comprise transmitting the modified data packet to a client, server, appliance, or computing machine identified by the destination IP address and/or the destination port number. In some embodiments, the modified data packet is transmitted to a proxy server or appliance before the data packet is transmitted to its destination computing machine or appliance. In other embodiments, the modified data packet is stored in a memory element within the multi-core system 545 before the data packet is transmitted to its destination computing machine or appliance. The memory element, in some embodiments, can be a global cache or other memory element shared by all cores and devices in the multi-core system 545. In other embodiments, the memory element can be a cache or other storage repository accessible by the current core 505.

3. System and Method for Retaining Source IP in a Load Balancing Multi-Core Environment and Proxying the Source Port While FIGS. 7A, 8 and 9 describe methods where the client IP address and the client port are modified or replaced by an IP address and port selected by a packet engine 548 on a particular core 505, FIGS. 7B, 12A and 12B describe a system where the client IP address is maintained. The client port or source port, however, can be a proxy port that is selected by a packet engine and inserted into a tuple of a data packet in lieu of the client port. In some systems, the owner of a server farm or the administrator of a network within which the multi-core system 545 executes can desire that each data packet retain at least its original source IP address. An administrator may want to do this for any number of reasons, some of those reasons can include for security purposes, for marketing purposes, to track network access, to restrict network access, or for any other reason. By permitting each data packet to retain its source IP address, each data packet can be tracked and controlled. For example, knowing the source of a data packet can permit the system to prevent particular IP addresses or domains from accessing a network. Similarly, knowing the source of a data packet can permit the system to track the geographic location of users accessing the network or domain. In most cases, knowing the source IP address allows a system to identify the location of where a packet originates and to further control whether or not a particular data packet is processed by a system.

Given that only the client port number can be modified, the number of selected port numbers can that when combined with a maintained client IP address identify a current core can, in some embodiments, become scarce. Therefore each core 505 can be associated with multiple port allocation tables where each port allocation table stores a list of available port numbers. Permitting each core 505 to be associated with one or more port allocation tables in addition to one or more port numbers adds another layer of uniqueness in that each request can now be associated with a port number from a particular port allocation table. This additional layer of uniqueness can overcome port number scarcity caused by maintaining the client IP address.

Figure 7B:
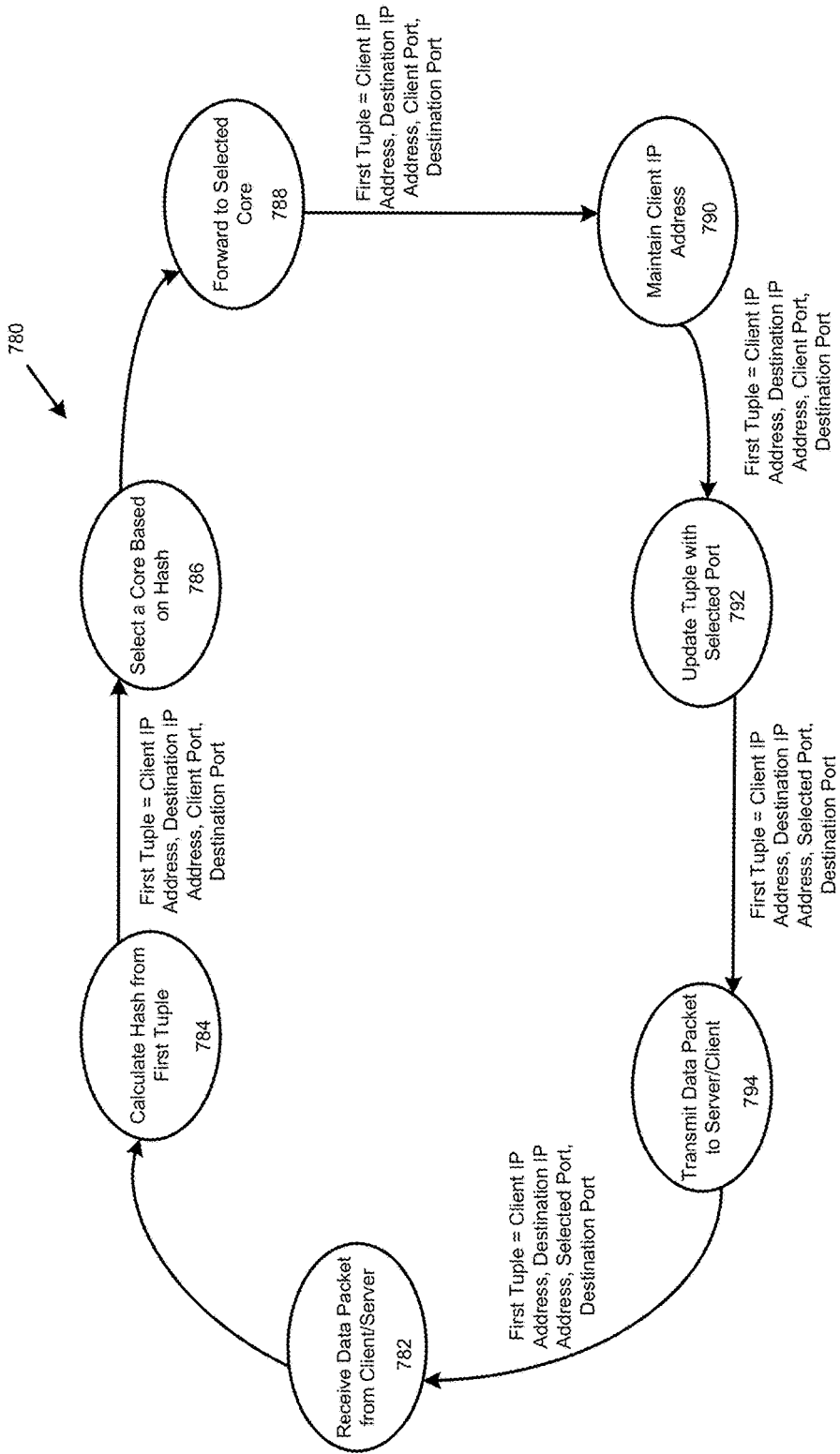

Illustrated in FIG. 7B is a flow diagram depicting one embodiment of a method 780 for using the above-discussed hash to distribute network traffic amongst one or more cores 505 in a multi-core system 545. This method 780 is similar to the method 700 illustrated in FIG. 7A. However in the method 780 illustrated in FIG. 7B, the packet engine 548 maintains the client IP address. Like the method 700 illustrated in FIG. 7A, a flow distributor 550 or RSS module 560 receives data packets from a client, server or other computing machine (Step 782), and calculates a hash value by applying the hash to a first tuple of the received data packet (Step 784). The first tuple can comprise a client IP address, a destination IP address, a client port, and a destination port. Applying the hash to the first tuple can, in some embodiments, result in a value sometimes referred to as the hash. A core 505 in the multi-core system 545 is selected based on the hash result value (Step 786) and the received data packet is forwarded to the selected core (Step 788). At this point the first tuple still comprises the following values: client IP address; destination IP address; client port; and destination port. A packet engine 548 on the selected core receives the data packet and maintains the client IP address (Step 709), but updates the first tuple with a selected port (Step 792). The first tuple, at this point, comprises the following values: the client IP address; the destination address; the selected port; and the destination port. The data packet and its modified tuple are then transmitted to a server, client or other computing machine (Step 794). Any responses to this data packet generated by the server, client or other computing machine are forwarded to the multi-core system 545 and received by the multi-core system 545 (Step 782). At this point, the method 700 repeats itself.

Further referring to FIG. 7B, and in more detail, in one embodiment the method 780 illustrated in FIG. 7B differs from the method 700 illustrated in FIG. 7A in that the method 780 illustrated in FIG. 7B maintains the client or source IP address. Thus, the additional steps are substantially the same as the steps described in the method 700 illustrated in FIG. 7A. For example, like the previously described method 700, the multi-core system 545 can receive data packets from a client, server or other computing machine (Step 782). Step 782 can, in some embodiments, be any of the embodiments of Step 704 described in FIG. 7A. Like the above-described method 700, a hash is applied to a first tuple of the data packet (Step 784), and a core is selected based on the result of the hash (Step 786). Step 784 can be any of the embodiments of Step 706 described in FIG. 7A, while Step 786 can be any of the embodiments of Step 708 described in FIG. 7A. Once a core 505 is selected, the data packet can be forwarded to the selected core 505 (Step 788). Step 788 can be any of the embodiments of Step 710. After the tuple associated with the data packet is modified, the modified data packet is then transmitted to a server, client or other computing machine (Step 794). Step 794 can be any of the embodiments of Step 716.

In some embodiments, once the data packet is forwarded to a selected core 505 (Step 788), a packet engine 548 or other engine or module executing on the selected core 505, can receive the packet and determine whether the packet can be modified. Determining whether a data packet can be modified can include making any of the following determinations: whether a portion of the data packet can be modified; whether a tuple of the data packet can be modified; whether any portion of a tuple of the data packet can be modified; what portions of the data packet and/or tuple can be modified; and any other determinations that may impact whether the packet engine 548 can modify the data packet or a tuple of the data packet. In one embodiment, the packet engine 548 determines that a portion of the data packet can be modified, and in particular that a portion of a tuple of the data packet can be modified. This determination can further include a determination that the client IP address, or source IP address, of the data packet should be maintained and therefore cannot be modified. Based on this determination, the packet engine 548 can adjust packet processing according to the determination. In some embodiments, the determination can be made by analyzing the data packet, a header of the data packet or any other attribute of the data packet. In other embodiments, the multi-core system 545 can be configured to maintain the client IP address and further proxy the client port. In these embodiments, a determination as to whether the data packet or a tuple of the data packet can be modified is not made because the operation of the system 545 is configured accordingly.

When either a determination is made that the client IP address should be maintained or when the system 545 dictates that the client IP address should be maintained, the packet engine 548 maintains the client IP address (Step 790) rather than modifying the tuple to include an IP address of the core 505 or system 545. After this step, the tuple comprises the following values: the client IP address; the destination IP address; the client port; and the destination port.

Maintaining the client IP address can cause any response to the data packet to be routed to a different core than the selected core 505. Therefore, the packet engine 548 should identify and select a port 632 from amongst the ports 632 of the selected core 505, that when included in the tuple in lieu of the client port, causes a hash of the tuple to identify the selected core 505. Thus, the packet engine 548 iterates through each of the ports 632 of the core 505 to identify such a port 632 and selects the port 632. After selecting the port 632, the packet engine 548 updates the tuple of the data packet to include the selected port 632 (Step 792). After this step, the tuple comprises the following values: the client IP address; the destination IP address; the selected port; and the destination port.

The updated data packet and tuple are then transmitted to a server, client or computing machine (Step 794). The data packet, when transmitted, comprises a tuple comprising the following values: the client IP address; the destination IP address; the selected port; and the destination port.

Figure 12A:
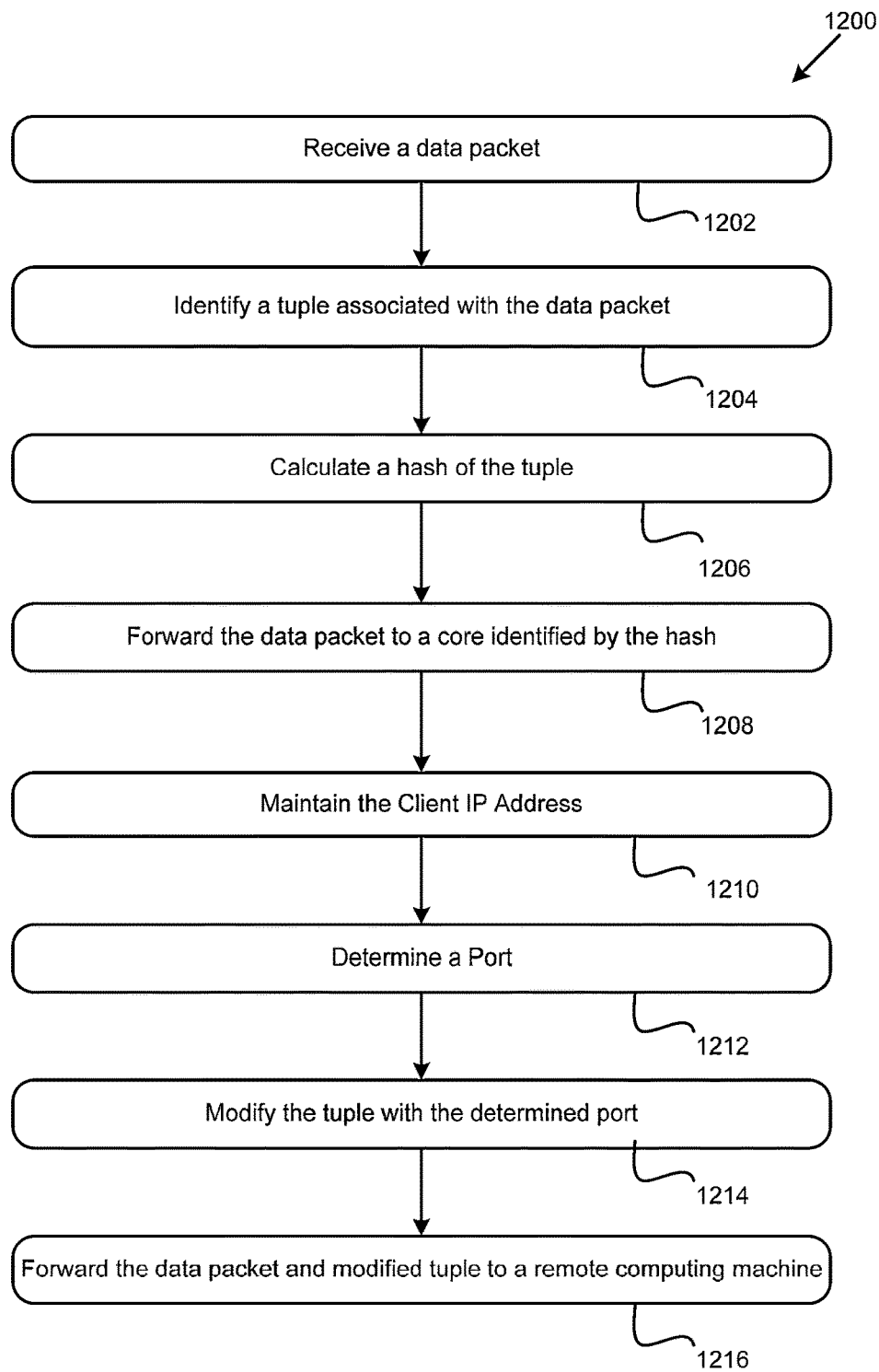
FIG. 12A is a flow diagram of an embodiment of a method for distributing data packets across a multi-core system while maintaining a client IP address.

Illustrated in FIG. 12A is one embodiment of a method 1200 for distributing packets across a multi-core system 545. In the method, a flow distributor 550 or RSS module 560 receives a data packet (Step 1202) and identifies a tuple of the data packet (Step 1204). After identifying the tuple, a hash is applied to the tuple to generate a result (Step 1206) and the data packet is transmitted to a core identified by the hash result (Step 1208). The data packet, in some embodiments, can be received by a packet engine 548 on the core. The packet engine 548 can maintain a client IP address included in the tuple (Step 1210), but can select a port from amongst the ports of the core (Step 1212) and can modify the tuple with the determined port (Step 1214). Once the tuple is modified, the data packet and the modified tuple is transmitted to a remote computing machine (Step 1216).

Further referring to FIG. 12A, and in more detail, in one embodiment the method 1200 is substantially the same as the method illustrated in FIG. 8. Therefore Step 1202 can be any embodiment of Step 802 illustrated in FIG. 8, similarly Step 1204 can be any embodiment of Step 804 illustrated in FIG. 8. Step 1206 can be any embodiment of Step 806 illustrated in FIG. 8, Step 1208 can be any embodiment of Step 808 illustrated in FIG. 8, and Step 1216 can be any embodiment of Step 816 illustrated in FIG. 8. In some embodiments, the method 1200 illustrated in FIG. 12A differs from the method 800 illustrated in FIG. 8 in that the method 1200 illustrated in FIG. 12A maintains the client IP address.

The packet engine 548 carrying out the steps of the method 1200 described in FIG. 12A can execute on a particular core 505. Therefore in most instances, the data packet received by the packet engine 548 has been allocated to the core 505 based on the application of an above-described hash to a tuple of the data packet. This tuple, in most cases, comprises at least a client IP address, a destination IP address, a client port and a destination port. In some embodiments, the tuple can be any of the above described tuples and can comprise any number of source or destination identifying values. In still other embodiments, the client IP address can be a source IP address identifying the machine from which the data packet originated. Similarly, the client port can be a source port.

In one embodiment, a packet engine 548 executing on a particular core 505 (i.e. a first core 505) in the multi-core system 545, receives data packet allocated to that particular core 505 (Step 1208). The packet engine 548 can directly receive data packets, or in some embodiments, a communication module executing on the core 505 can receive and transmit data packets. In other embodiments, a virtual NIC (Not Shown) executing on the core 505 can receive and transmit data packets. Receiving data packets, in some embodiments, can further comprise draining data packets from a logical receive queue on the core 505. A logical receive queue can store data packets transmitted to a core 505. The packet engine 548 can access data packets in the logical receive queue by draining or otherwise obtaining the data packets from the receive queue according to a first-in-first-out method of access. Another possible method of access can be first-in-last-out. The packet engine 548, in some embodiments, can receive a client request or a server response.

When a packet engine 548 obtains a data packet, the packet engine 548 can in some embodiments determine whether the data packet can be modified. The packet engine

548, after determining what portions of the data packet can be modified, can modify the data packet. In some embodiments, the multi-core system 545 can be configured to instruct packet engines 548 executing within the multi-core system 545 to modify only certain portions of the data packet.

In some embodiments, the packet engine 548 can determine that the data packet cannot be modified. In other embodiments, the multi-core system 545 can be configured such that the data packet is not modified, but rather each element of the tuple of the data packet is maintained except for the client port. Thus, when the packet engine 548 receives the data packet, the packet engine 548 maintains the client IP address, i.e. the source IP address (Step 1210).

In some embodiments, the packet engine 548 determines, prior to computing a second hash on the client IP address, the destination IP address, a selected port number and the destination port, to proxy the client port and maintain the client IP address. Determining to proxy the client port can, in some embodiments include determining to select a port from amongst the ports of the first core 505 and replace the client port with that selected port.

In one embodiment, the packet engine 548 selects a port from amongst the ports of the core 505 (Step 1212). The selected port, in some embodiments, is a proxy port that can be included in the first tuple in lieu of the client port. This proxy port can be determined so that a hash of the modified first tuple will identify the current core 505. This determination can be made by applying the above-described hash to a second tuple comprising the client IP address, the destination IP address, a selected port number and the destination port. When the result of this hash identifies the first core 505, then it can be determined that the selected port will cause a response to the data packet to be allocated to the current core 505. The determination can also include determining whether the port is available. When a port is not available or otherwise is assigned to a data packet, the packet engine 548 can select a second port and determine whether that port number will cause a response packet to be routed or distributed to the first core 505. Once the port is determined, the first tuple is modified with the identified port (Step 1214), and the modified data packet and tuple are forwarded to a remote computing machine (Step 1216). The data packet, when transmitted, retains a tuple comprising the following elements: client IP address; destination IP address; selected port; and destination port.

Selecting a port, in some embodiments, further comprises selecting a port number from a port allocation table associated with the first core 505. The port allocation table can be one of multiple port allocation tables associated with the first core 505, and can be located at a proxy IP address of the first core 505. In one embodiment, the packet engine 548 selects a first port number from amongst multiple port numbers, and determines that a hash of a second tuple comprising the client IP address, the destination IP address, the first port number and the destination port number, does not identify the first core 505. Upon making this determination, the packet engine 548 selects a second port number from the same port allocation table and determines that a third tuple comprising the client IP address, the destination IP address, the second port number and the destination port number, does not identify the first core 505. The packet engine 548, in some embodiments, selects the second port number based on a determination that the first port number is not available. In still another embodiment, the packet engine 548 selects a first port number from amongst multiple port numbers in a port allocation table selected based on the result of applying the above-described hash to a tuple comprising the client IP address and the destination IP address.

Transmitting the modified data packet to a remote computing machine can comprise transmitting the modified data packet to a client, server, appliance, or computing machine identified by the destination IP address and/or the destination port. In some embodiments, the modified data packet is transmitted to a proxy server or appliance before the data packet is transmitted to its destination computing machine or appliance. In other embodiments, the modified data packet is stored in a memory element within the multi-core system 545 before the data packet is transmitted to its destination computing machine or appliance. The memory element, in some embodiments, can be a global cache or other memory element shared by all cores and devices in the multi-core system 545. In other embodiments, the memory element can be a cache or other storage repository accessible by the current core 505.

Figure 12B:
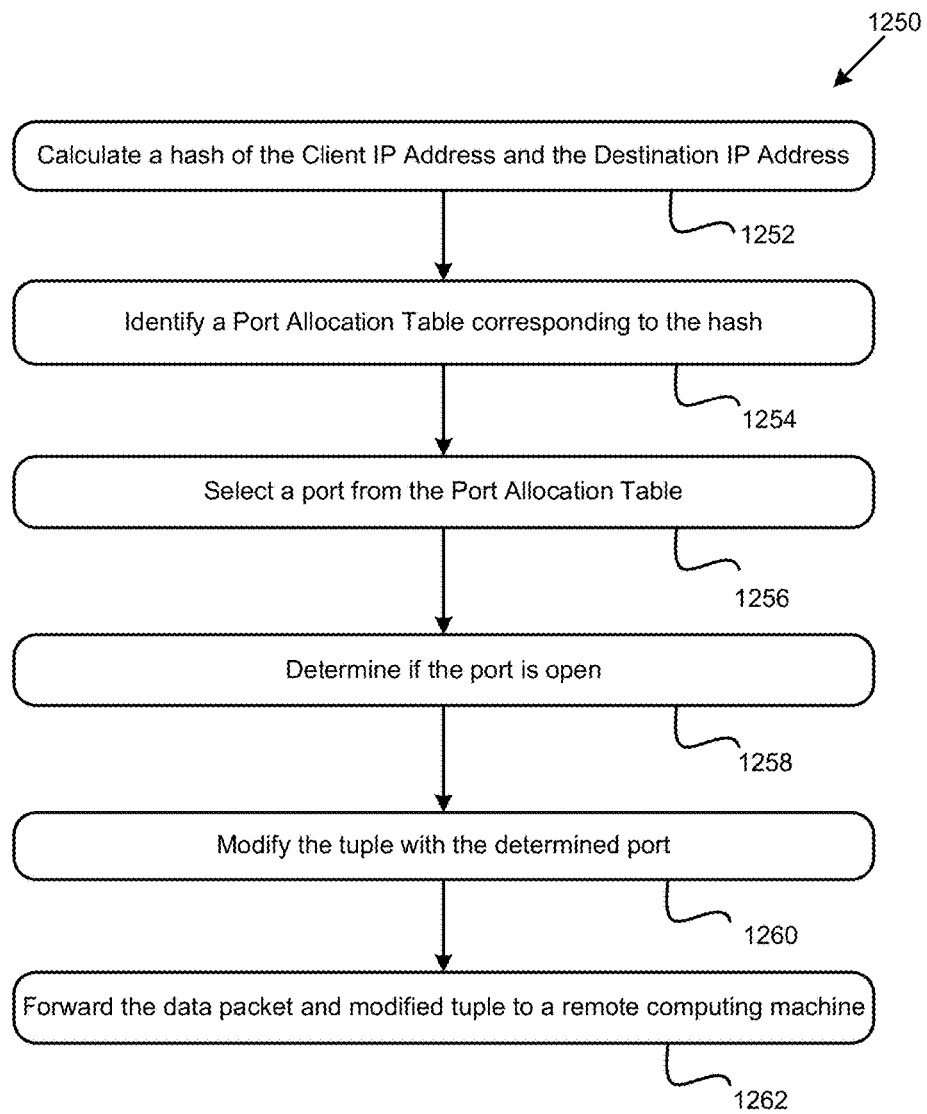
FIG. 12B is a flow diagram of an embodiment of a method for selecting a port allocation table.

Illustrated in FIG. 12B is one embodiment of a method 1250 for selecting a port from a port allocation table of the selected core 505. A packet engine 548 on the selected core 505 calculates a hash of the client IP address and the destination IP address (Step 1252), the hash identifying a port allocation table on the selected core 505 (Step 1254). Once a port allocation table is selected, a port in the port allocation table is selected (Step 1256) and a determination is made as to whether the port is open (Step 1258). A tuple of the data packet is then modified with the determined port (Step 1260) and the modified data packet and tuple are forwarded to a remote computing machine (Step 1262).

Further referring to FIG. 12B, and in more detail, in one embodiment a packet engine 548 executing on the selected core 505 calculates a hash value of the client IP address and the destination IP address (Step 1252). Calculating the hash value can comprise concatenating the client IP address and the destination IP address to create a string or two item tuple. The packet engine 548 then applies the above-described hash function to the two tuple to generate a resultant value or hash value. This hash value, in many embodiments, identifies a port allocation table on the selected core 505 (Step 1254). There may, in some embodiments, be multiple port allocation tables associated with a particular core 505. Determining which port allocation table from which to select a port can comprise generating the hash value and using the hash value to select a corresponding port allocation table.

In most embodiments, once the packet engine 548 selects a port allocation table, the packet engine 548 can then select a port from the port allocation table (Step 1256). When a port is selected a determination must be made as to whether the port is both the correct port and an open port (Step 1258). This determination can be made via the method 900 illustrated in FIG. 9. When it is determined that the port is the incorrect port and/or closed and unavailable, the packet engine 548 can select a different port in the selected port allocation table. Once the new port is selected, a determination must be made as to whether the port is both the correct port and open. In some embodiments, there are no ports in the port allocation table that are both the correct port and an available port. In these embodiments, a different port allocation table can be chosen. A port is then selected from the newly chosen port allocation table and a new determination is made as to whether the selected port is both the correct port and an available port.

Once a port is selected that is both the correct port and an open port, the tuple of the data packet can be modified with the selected port (Step 1260). Upon modifying the tuple with the selected port, the modified data packet can be transmitted to a remote computing machine (Step 1262).

Transmitting the modified data packet to a remote computing machine can comprise transmitting the modified data packet to a client, server, appliance, or computing machine identified by the destination IP address and/or the destination port. In some embodiments, the modified data packet is transmitted to a proxy server or appliance before the data packet is transmitted to its destination computing machine or appliance. In other embodiments, the modified data packet is stored in a memory element within the multi-core system 545 before the data packet is transmitted to its destination computing machine or appliance. The memory element, in some embodiments, can be a global cache or other memory element shared by all cores and devices in the multi-core system 545. In other embodiments, the memory element can be a cache or other storage repository accessible by the current core 505.

Figure 7C:
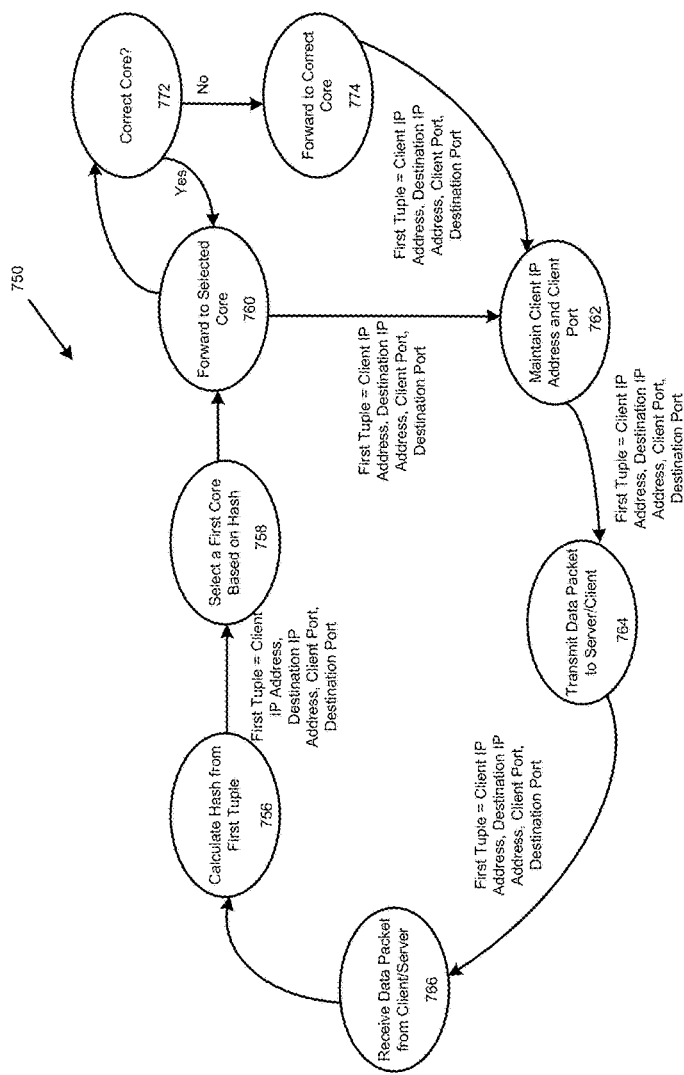
Figure 10A:
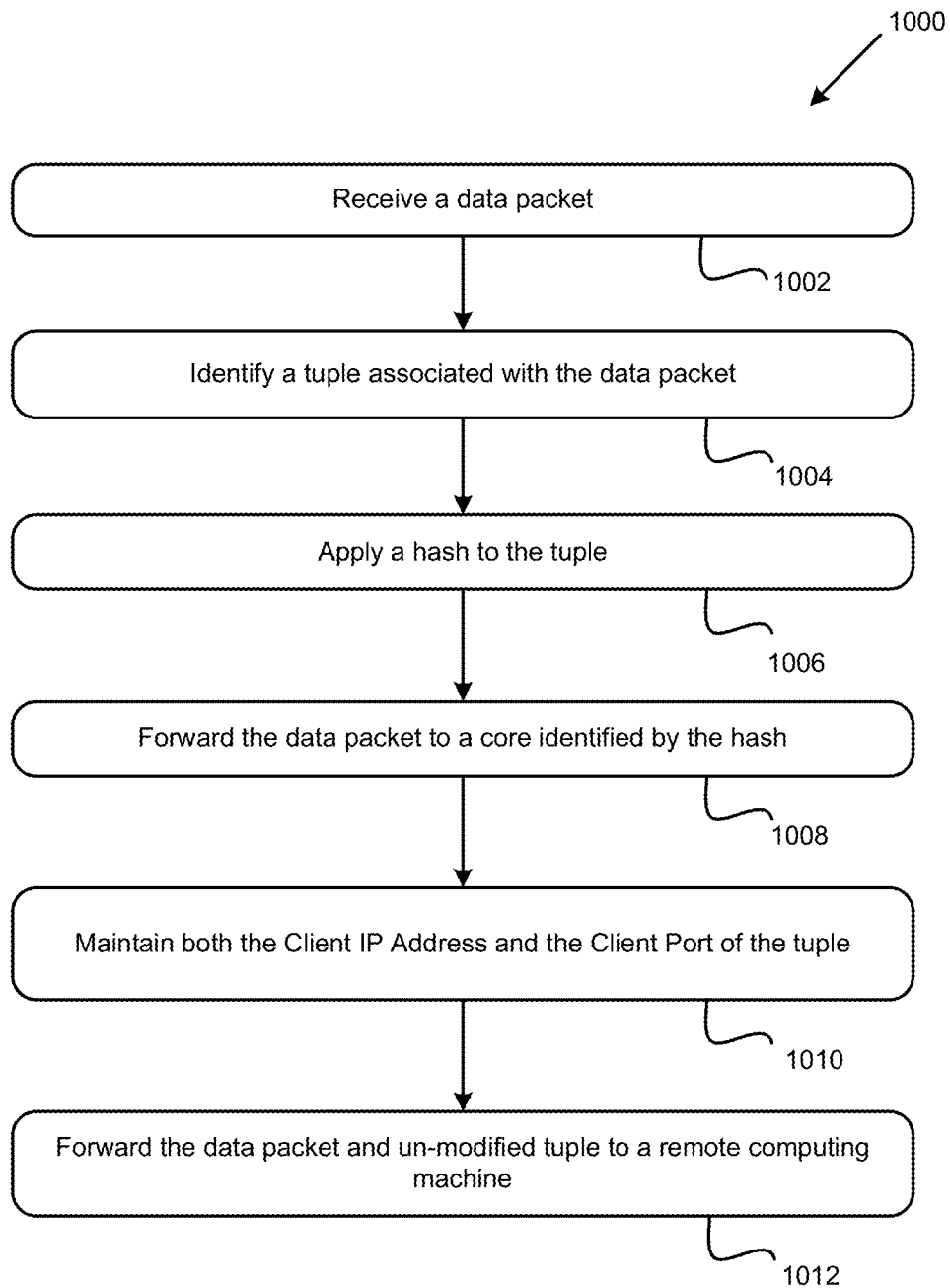
FIGS. 10A-10B are flow diagrams of embodiments of a method for distributing data packets across a multi-core system while maintaining a client IP address and client port.
Figure 10B:
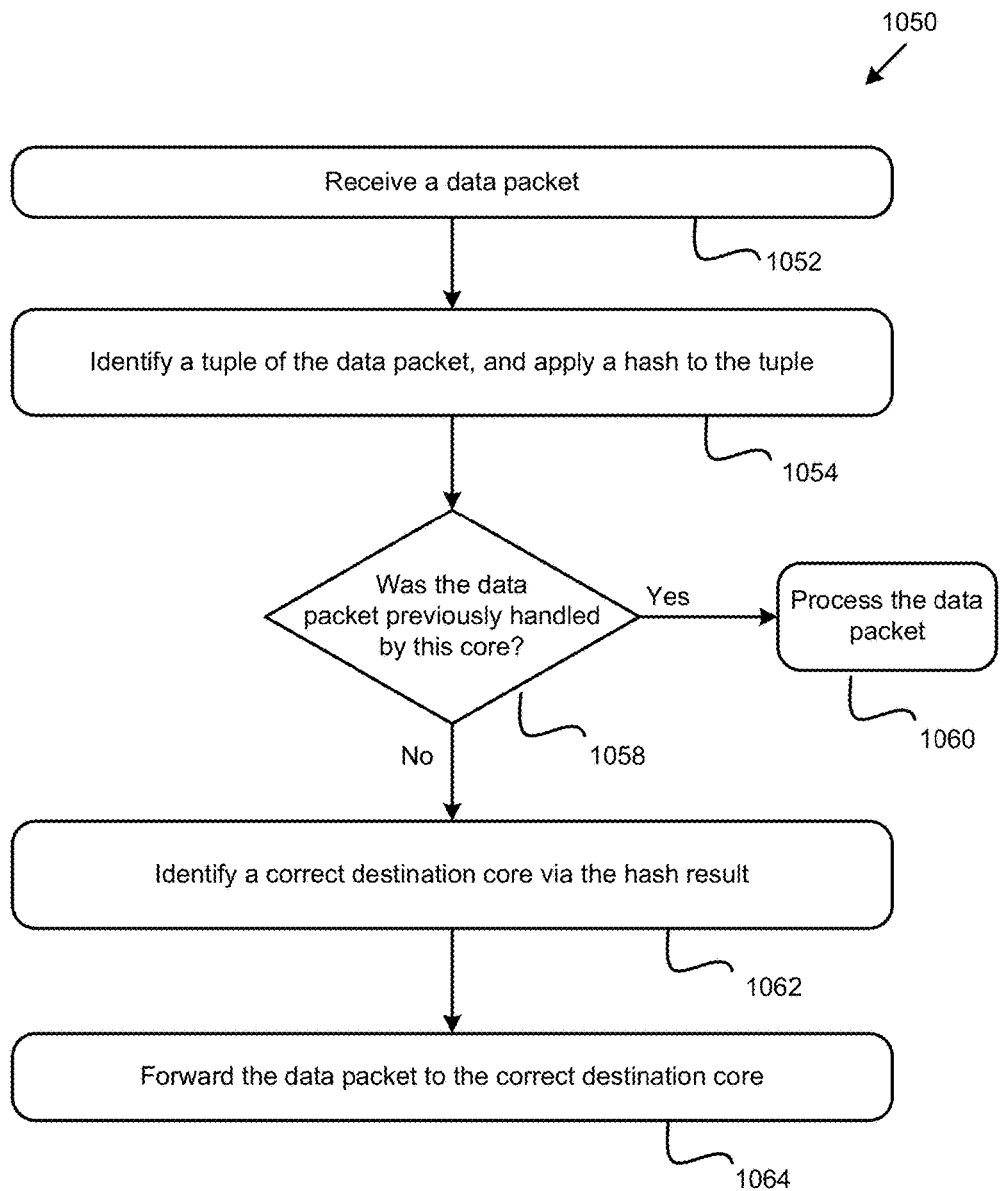

4. System and Method for Retaining Source IP and Source Port in a Load Balancing Multi-Core Environment While FIGS. 7A, 8 and 9 describe methods where the client IP address and the client port are modified or replaced by an IP address and port selected by a packet engine 548 on a particular core 505, and FIGS. 7B, 12A and 12B describe a system where the client IP address is maintained; FIGS. 7C, 10A and 10B describe a system where the client IP address and the client port are maintained. In some systems, the owner of a server farm or the administrator of a network within which the multi-core system 545 executes can desire that each data packet retain its original source IP address and source port. An administrator may want to do this for any number of reasons, some of those reasons can include for security purposes, for marketing purposes, to track network access, to restrict network access, or for any other reason. By permitting each data packet to retain its source IP address or source port, each data packet can be tracked and controlled. For example, knowing the source of a data packet can permit the system to prevent particular IP addresses or domains from accessing a network. Similarly, knowing the source of a data packet can permit the system to track the geographic location of users accessing the network or domain. In most cases, knowing the source IP address and source port allows a system to identify the location of where a packet originates and to further control whether or not a particular data packet is processed by a system.

Illustrated in FIG. 7C is a flow diagram depicting one embodiment of a method 750 for using the above-discussed hash to distribute network traffic amongst one or more cores 505 in a multi-core system 545. This method 750 is similar to the method 700 illustrated in FIG. 7A. However in the method 750 illustrated in FIG. 7C, the packet engine 548 maintains both the client IP address and the client port. Like the method 700 illustrated in FIG. 7A, a flow distributor 550 or RSS module 560 receives data packets from a client, server or other computing machine (Step 766), and calculates a hash value by applying the hash to a first tuple of the received data packet (Step 756). The first tuple can comprise a client IP address, a destination IP address, a client port, and a destination port. Applying the hash to the first tuple can, in some embodiments, result in a value sometimes referred to as the hash. A first core 505A in the multi-core system 545 is selected based on the hash result value (Step 758) and the received data packet is forwarded to the selected first core 505A (Step 760). At this point the first tuple still comprises the following values: client IP address; destination IP address; client port; and destination port. Once the selected core receives the forwarded data packet, the selected first core 505A determines whether that core is the correct core (Step 772). When a determination is made that the selected core 505A is the correct core, then the method continues to Step 762. However, when a determination is made that the selected core 505A is not the correct core, the data packet is forwarded to the correct core (Step 774) before proceeding to Step 762. The packet engine 548 on either the first core 505A, or on a correct core different from the first core 505A, maintains the client IP address and the client port (Step 762) after which the data packet is transmitted to the server, client or other computing machine (Step 764). Any responses to this data packet generated by the server, client or other computing machine are forwarded to the multi-core system 545 and received by the multi-core system 545 (Step 766). At this point, the method 750 repeats itself.

Further referring to FIG. 7C, and in more detail, in one embodiment the method 750 illustrated in FIG. 7C differs from the method 700 illustrated in FIG. 7A in that the method 750 illustrated in FIG. 7C maintains the client IP address and the client port. Thus, the additional steps are substantially the same as the steps described in the method 700 illustrated in FIG. 7A. For example, like the previously described method 700, the multi-core system 545 can receive data packets from a client, server or other computing machine (Step 766). Step 766 can, in some embodiments, be any of the embodiments of Step 704 described in FIG. 7A. Like the above-described method 700, a hash is applied to a first tuple of the data packet (Step 756), and a core is selected based on the result of the hash (Step 758). Step 756 can be any of the embodiments of Step 706 described in FIG. 7A, while Step 758 can be any of the embodiments of Step 708 described in FIG. A. Once a core 505 is selected, the data packet can be forwarded to the selected core 505 (Step 760). Step 760 can be any of the embodiments of Step 710. After the tuple associated with the data packet is modified, the modified data packet is then transmitted to a server, client or other computing machine (Step 764). Step 764 can be any of the embodiments of Step 716.

In one embodiment, when the packet engine 548 on the selected core 505 receives the forwarded data packet (Step 760), the packet engine 548 determines whether the packet was previously handled by the current core. If the current core is not the correct core (Step 772), then the data packet is forwarded to the correct core (Step 774). The correct core can be determined by applying the above-described hash to a tuple of the data packet. Forwarding or otherwise transmitting the data packet to the correct core can be done via a core-to-core messaging system and/or by copying the data packet into a global cache accessible by both the current core and the correct core.

When the data packet is forwarded to the correct core, the first tuple comprises the following values: a client IP address; a destination IP address; a client port; and a destination port. In embodiments where the current core is the correct core, the current core maintains the client IP address and the client port (Step 762). Similarly, when the correct core receives the data packet, the correct core maintains the client IP address and the client port (Step 762). By maintaining the client IP address and the client port, the tuple continues to comprise the following values: a client IP address; a destination IP address; a client port; and a destination port. Once the client IP address and the client port are maintained, the data packet is transmitted to the server, client or other computing device or appliance.

Illustrated in FIG. 10A is a method 1000 for allocating a data packet to a particular core 505 in a multi-core system 545. The method 1000 includes receiving a data packet (Step 1002), identifying a tuple of the data packet (Step 1004) and applying a hash to the tuple (Step 1006). The data packet is then forwarded to a core 505 in the multi-core system 545 (Step 1008), where the core 505 is identified by a value resulting from the application of any of the above-mentioned hashes to a tuple of the data packet. A packet engine 548 executing on the selected core 505 maintains both the client IP address and the client port of the tuple (Step 1010), and forwards the data packet and un-modified tuple to a remote computing machine (Step 1012).

Further referring to FIG. 10A, and in more detail, in one embodiment the method 1000 is substantially the same as the method illustrated in FIG. 8. Therefore Step 1002 can be any embodiment of Step 802 illustrated in FIG. 8, similarly Step 1004 can be any embodiment of Step 804 illustrated in FIG. 8. Step 1006 can be any embodiment of Step 806 illustrated in FIG. 8, Step 1008 can be any embodiment of Step 808 illustrated in FIG. 8, and Step 1012 can be any embodiment of Step 816 illustrated in FIG. 8. In some embodiments, the method 1000 illustrated in FIG. 10A differs from the method 800 illustrated in FIG. 8 in that the method 1000 illustrated in FIG. 10A maintains the client IP address and the client port.

The packet engine 548 carrying out the steps of the method 1000 described in FIG. 10A can execute on a particular core 505. The core 505, in most embodiments, is selected ahead of time by the method 1000 illustrated in FIG. 10A. Therefore in most instances, the data packet received by the packet engine 548 has been allocated to the core 505 based on the application of an above-described hash to a tuple of the data packet. This tuple, in most cases, comprises at least a client IP address, a destination IP address, a client port and a destination port. In some embodiments, the tuple can be any of the above described tuples and can comprise any number of source or destination identifying values. In still other embodiments, the client IP address can be a source IP address identifying the machine from which the data packet originated. Similarly, the client port can be a source port.

In one embodiment, a packet engine 548 executing on a particular core 505 in the multi-core system 545, receives data packet allocated to that particular core 505 (Step 1008). The packet engine 548 can directly receive data packets, or in some embodiments, a communication module executing on the core 505 can receive and transmit data packets. In other embodiments, a virtual NIC (Not Shown) executing on the core 505 can receive and transmit data packets. Receiving data packets, in some embodiments, can further comprise draining data packets from a logical receive queue on the core 505. A logical receive queue can store data packets transmitted to a core 505. The packet engine 548 can access data packets in the logical receive queue by draining or otherwise obtaining the data packets from the receive queue according to a first-in-first-out method of access. Another possible method of access can be first-in-last-out. In some embodiments, the packet engine 548 executes on a first core 505 and receives the data packets from a flow distributor based on a hash of a first tuple of the data packets, the first tuple comprising a client IP address, a destination IP address, a client port and a destination port. The data packets, in some embodiments, can be a client request or a server response.

When a packet engine 548 obtains a data packet, the packet engine 548 can in some embodiments determine whether the data packet can be modified. The packet engine 548, after determining what portions of the data packet can be modified, can modify the data packet. In some embodiments, the multi-core system 545 can be configured to instruct packet engines 548 executing within the multi-core system 545 to modify only certain portions of the data packet.

In some embodiments, the packet engine 548 can determine that the data packet cannot be modified. In other embodiments, the multi-core system 545 can be configured such that the data packet is not modified, but rather each element of the tuple of the data packet is maintained. In still other embodiments, the packet engine 548 is configured responsive to a security policy of either the first core 505 or the multi-core system 545, where the security policy dictates that the client port and the client IP address are to be maintained. Thus, when the packet engine 548 receives the data packet, the packet engine 548 maintains both the client IP address and the client port, i.e. the source IP address and the source port (Step 1010). Therefore the packet engine 548 forwards or otherwise transmits the data packet to a remote computing machine or appliance (Step 1012). The data packet, when transmitted, retains a tuple comprising the following elements: client IP address; destination IP address; client port; and destination port.

Transmitting the modified data packet to a remote computing machine can comprise transmitting the modified data packet to a client, server, appliance, or computing machine identified by the destination IP address and/or the destination port. In some embodiments, the modified data packet is transmitted to a proxy server or appliance before the data packet is transmitted to its destination computing machine or appliance. In other embodiments, the modified data packet is stored in a memory element within the multi-core system 545 before the data packet is transmitted to its destination computing machine or appliance. The memory element, in some embodiments, can be a global cache or other memory element shared by all cores and devices in the multi-core system 545. In other embodiments, the memory element can be a cache or other storage repository accessible by the current core 505.

Illustrated in FIG. 10B is a more detailed embodiment of at least one portion of the method 1000 illustrated in FIG. 10A. The method 1050 illustrated in FIG. 10B illustrates an embodiment of the process carried out once a packet engine 548 on a selected core 505 receives a forwarded data packet. Upon receiving the data packet (Step 1052), the packet engine 548 can identify a tuple of the data packet and apply the above-described hash to the identified tuple (Step 1054). After applying the hash, the packet engine determines whether the data packet was previously handled by the core (Step 1058). When a determination is made that the data packet was previously handled by the core 505, the packet engine 548 proceeds to process the data packet (Step 1060). When a determination is made that the data packet was previously handled by another core 505, the correct destination core 505 is identified via the hash result (Step 1062) and the data packet is forwarded to the correct destination core (Step 1064).

Further referring to FIG. 10B, and in more detail, in one embodiment the method 1050 can be carried out by a packet engine 548 on a selected core 505. In other embodiments, the method 1050 can be carried out by an instance of a flow distributor 550, or by any other flow distribution module executing on the selected core 505. In some embodiments, the selected core 505 is a core selected by a flow distributor 550 or RSS module 560 executing in the multi-core system 545, based on a hash of a tuple of the data packet. Therefore, when the multi-core system 545 first receives a data packet, the flow distributor 550 or RSS module 560 applies any of the above-mentioned hashes to a tuple of the data packet. A result of the hash identifies a core 505 in the multi-core system 545, and the flow distributor 550 or the RSS module 560 forwards the data packet to the selected core 505. Any reference to a selected core 505 or a present core 505 is in most embodiments a reference to the core 505 selected by the flow distributor 550 or RSS module 560 based on a tuple associated with the data packet.

In one embodiment, a packet engine 548 receives a data packet (Step 1052) forwarded to the selected core 505 by a flow distributor 550, RSS module 560 or any other flow distribution module. The packet engine 548 can directly receive data packets, or in some embodiments, a communication module executing on the core 505 can receive and transmit data packets. In other embodiments, a virtual NIC (Not Shown) executing on the core 505 can receive and transmit data packets. Receiving data packets, in some embodiments, can further comprise draining data packets from a logical receive queue on the core 505. A logical receive queue can store data packets transmitted to a core 505. The packet engine 548 can access data packets in the logical receive queue by draining or otherwise obtaining the data packets from the receive queue according to a first-in-first-out method of access. Another possible method of access can be first-in-last-out. In some embodiments, the packet engine 548, executing on a second core 505, can receive the data packets from a flow distributor 550 based on a hash of a second tuple of the data packets, the second tuple comprising the client IP address, the client port, the destination IP address and the destination port. The data packets, in some embodiments, can be a server response to a client request previously handled by a first core 505 in the multi-core system 545. In some embodiments, FIG. 10A illustrates the handling of the client request by the first core 505.

In some embodiments the packet engine 548 applies a hash, such as any of the above-described hashes, to a tuple associated with the received data packet (Step 1054). Applying the hash can further comprise first identifying a tuple of the data packet. Determining a tuple of the data packet can include identifying and concatenating the following values: a client IP address; a destination IP address; a client port; and a destination port. In one embodiment, the tuple comprises the concatenation of these values. In some embodiments, the packet engine 548 carries out this concatenation, while in other embodiments the tuple is included within the received data packet.

The result of the hash, in some embodiments, identifies a destination core 505. This core 505, in some embodiments, identifies the current or selected core 505, while in other embodiments this result identifies a core 505 different from the current or selected core 505. While FIG. 10B illustrates a method 1050 that includes Step 1054, in some embodiments the method 1050 does not include Step 1054. In these embodiments, a determination as to whether the data packet was previously handled by the current core 505 can be made by comparing attributes of the data packet with a table or list accessible by the packet engine 548 on the current core, with attributes of the data packet. These attributes can be any one of a client IP address, a client port, a destination IP address, a destination port, a flag stored in metadata, a marking indicating the previous core 505 that handled the data packet or any other attribute that can be stored in a table or list and used to identify whether a particular core 505 handled the data packet. This table or list can be updated by a packet engine 548 each time the core 505 handles a data packet. The update can comprise an entry indicating that a data packet having certain characteristics was handled by the core 505.

The packet engine 548 can review either the resultant hash value or a table tracking packet attributes, to determine whether the current core 505 previously handled the current data packet. When the packet engine 548 determines that the packet was previously handled by the current core 505, the packet engine 548 continues to process the data packet (Step 1060). When the packet engine 548 determines that the packet was not previously handled by the current core 505, the packet engine 548 identifies the correct core 505 (Step 1062) and forwards the data packet to the correct core (Step 1064).

Determining the correct core 505 (Step 1062), in some embodiments, comprises either reviewing the result of a hash applied to a tuple of the data packet (Step 1054). This hash result can be stored in cache or another memory element or location accessible by a first, second or third core 505, so that a later determination can be made as to where to transmit a misdirected data packet. In some embodiments, the data packets can be stored in the cache or other memory element, memory location or shared buffer, where this shared buffer is accessible by each of the cores in the multi-core system 545 including the first core and the second core. In embodiments where a hash was not previously applied, the packet engine 548 can apply the above-described hash to a tuple of the data packet to obtain a resultant hash value. This resultant hash value identifies a core 505 in the multi-core system 545 that is different from the current or selected core 505. The hash applied to the second tuple can be the same hash function as the hash function applied to the client request, supra.

Determining that the different core, or first core 505, is the correct core can include determining that the received response corresponds to a client request not processed by the second packet engine 548 on the second core 505. The packet engine 548 can obtain information about the identified core 505 and forward the data packet to the correct destination core 505 identified by the hash result (Step 1064). Looking up information about the correct core 505, or the first core 505 can include searching for a port in a port allocation table to identify the first core 505. In some embodiments, the packet engine 548 executing on the second core 505 can send a message to the first core 505 or identified core 505, indicating that the data packets (i.e. the server response) is to be processed by a packet engine 548 on the first core 505.

Forwarding the data packet to the correct destination core 505 (Step 1064) can occur one of two ways: either the data packet can be copied into a common cache or memory element accessible by both the current core 505 and the correct core 505, and the data packet can be downloaded by the correct core 505; or the data packet can be transmitted to the correct core 505 via an internal network over which the cores 505 communicate with one another. In embodiments where the data packet is stored to a common memory element, the packet engine 548 copies the data packet into the common cache or common memory element, and sends a message to a packet engine on the correct core to download the copied data packet. A core-to-core messaging system or intra-system communication network can be used by the packet engine 548 of the current core 505 to send a message to the packet engine 548 of the correct core 505 that instructs the packet engine 548 of the other core 505 to download the copied data packet from the shared cache or memory element. In embodiments where the data packets are transmitted to the correct core 505 via an internal network, the packet engine 548 of the present core 505 obtains an address of the packet engine 548 of the correct core and forwards the data packet to that address over an internal network in the multi-core system 545. In some embodiments, the packet engine of the present core forwards the data packet to a control core in the multi-core system 545 which then forwards the data packet to the correct core. In other embodiments, the packet engine of the present core forwards the data packet to a neighboring core which determines that it is not the correct core and forwards the data packet to a neighboring core. This process continues until the correct core receives the data packet.

5. System and Method for Packet Fragment Steering and Re-Assembly in a Multi-Core Environment In some embodiments, either a client request, a server response or another type of data packet can be fragmented. In a multi-core system 545 there is an added layer of complexity to reassembling a fragmented data packet because the fragmented data packet, in some embodiments, is received by a packet engine 548 or flow distributor 550 executing on a core 505 that is not the ultimate destination core 505 for that request, response or data packet. Therefore, the packet engine 548 or flow distributor 550 must forward either a reassembled data packet or the data packet fragments to the destination core 505. This destination core 505 cannot be determined until at least a port of the data packet header is reassembled so that the following values can be obtained: a source IP address; a destination IP address; a source port; and a destination port. Once these values are obtained, the packet engine 548 or flow distributor 550 can forward either a reassembled data packet or the data packet fragments to a core 505 identified by a hash of the above-mentioned values.

Figure 11A:
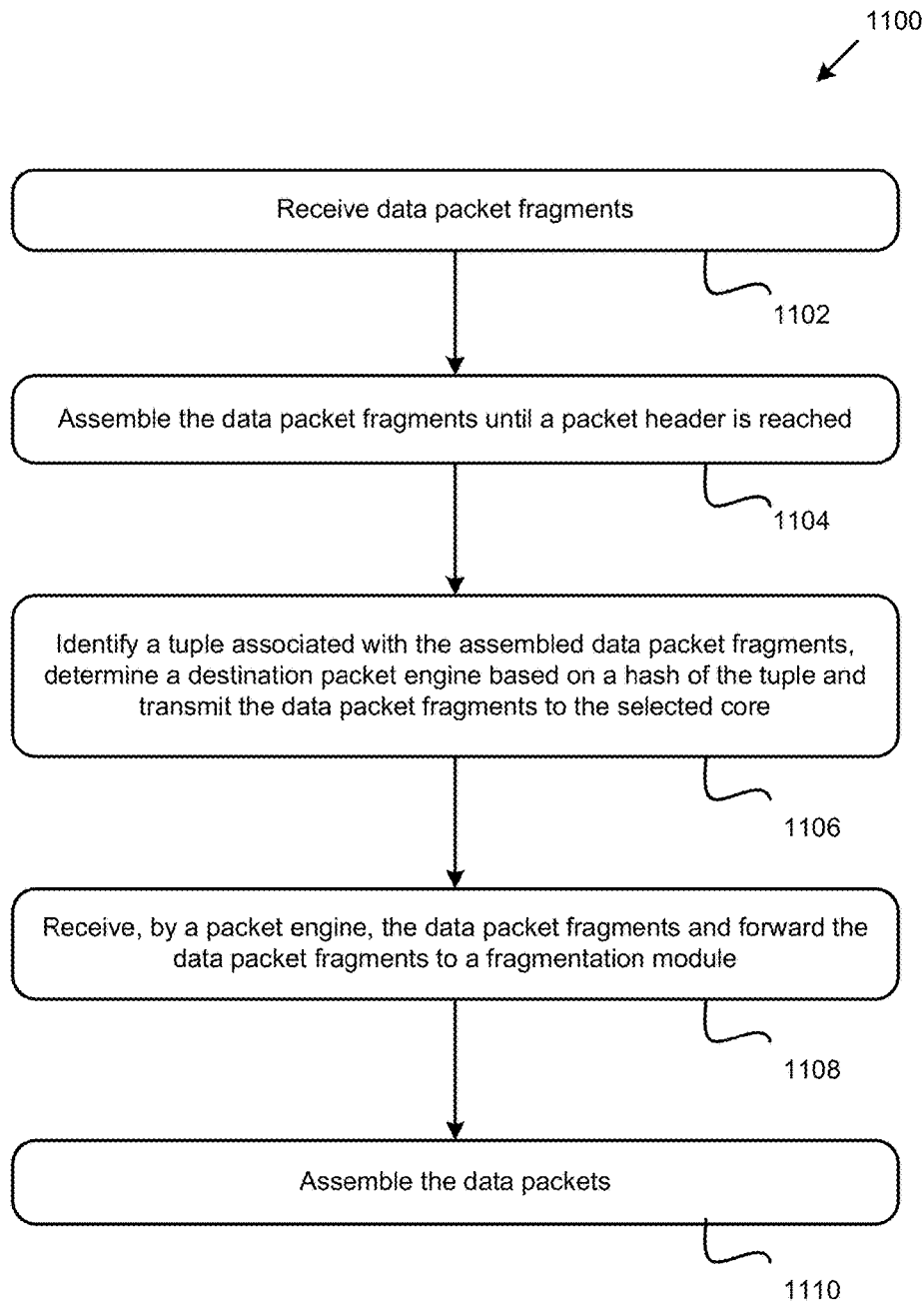
FIGS. 11A-11B are flow diagrams of embodiments of a method for distributing data packet fragments across a multi-core system.

Illustrated in FIG. 11A is an embodiment of a method 1100 for distributing fragmented network traffic over one or more cores 505 in a multi-core system 545. The multi-core system 545 receives data packet fragments (Step 1102) and a flow distributor 550 or RSS module 560 executing within the multi-core system 545 assembles data packet fragments into the whole data packet until a packet header is reached (Step 1104). Once the header is reached, a tuple comprising a source IP address, a destination IP address, a source port and a destination port is identified within the header. The flow distributor 550 or RSS module 560 applies a hash to the tuple and the resultant value identifies at least one core 505 in the multi-core system 545. After identifying the core 505, the data packet fragments are transmitted to the selected core 505 (Step 1106). A packet engine 548 on the selected core 505 receives the data packet fragments and forwards them to a fragmentation module 650 executing on the selected core 505 (Step 1108). Once the fragmentation module 650 receives the data packet fragments, the fragmentation module 650 reassembles the data packet from the data packet fragments (Step 1110).

Further referring to FIG. 11A, and in more detail, in one embodiment the method 1100 can be carried out by a packet engine 548 executing on a core 505. In another embodiment, the method 1100 can be carried out by a flow distributor 550 or an instance of a flow distributor executing on the core 505. In still other embodiments, the method 1100 can be carried out by any flow distribution module or agent that may execute on the core 505. While FIG. 11A contemplates reassembling a data packet from data packet fragments, reassembly of the data packet can, in some embodiments, be handled by a control core in the multi-core system 545.

The packet engine 548 carrying out at least a portion of the steps of the method 1100 described in FIG. 11A can execute on a particular core 505. The core 505, in most embodiments, is selected ahead of time by applying a hash to a tuple of the data packet fragments. This tuple, in most cases, comprises at least a client IP address, a destination IP address, a client port and a destination port. In some embodiments, the tuple can be any of the above described tuples and can comprise any number of source or destination identifying values. In still other embodiments, the client IP address can be a source IP address identifying the machine from which the data packet originated. Similarly, the client port can be a source port.

In one embodiment, a flow distributor 550 executing within the multi-core system 545, receives data packet fragments from a computing machine or appliance remotely located outside of the multi-core system 545 (Step 1102). The flow distributor 550 can directly receive data packet fragments, or in some embodiments, a communication module can receive and transmit data packets or data packet fragments. In other embodiments, the NIC 552 can receive and transmit data packets and data packet fragments. Receiving data packets and data packet fragments, in some embodiments, can further comprise draining data packets or data packet fragments from a receive queue on the NIC 552. A receive queue can store data packets and data packet fragments transmitted to the multi-core system 545. The flow distributor 550 can access data packets and data packet fragments in the receive queue by draining or otherwise obtaining the data packets and data packet fragments from the receive queue according to a first-in-first-out method of access. Another possible method of access can be first-in-last-out.

In some embodiments, a packet engine 548 can receive a client request that identifies a first tuple comprising a client internet protocol address, a client port, a server internet protocol address and a server port. In these embodiments, the packet engine 548 can execute on a core 505 selected by the flow distributor 550 based on a hash of the first tuple. The flow distributor 550 can then receive a plurality of fragments of a response (Step 1102) to the client request received by the packet engine 548, the fragments of a response sent by a server responsive to receiving the client request that was forwarded by the packet engine 548 executing on the core 505.

Once the flow distributor 550 receives one or more data packet fragments (Step 1102), the flow distributor 550 can begin to reassemble the data packet from the data packet fragments until a packet header is reached (Step 1104). In some embodiments, the entire data packet is reassembled by the flow distributor 550 from the received data packet fragments. In other embodiments, only those portions of the data packet that make up the header are assembled by the flow distributor 550. In still other embodiments, the flow distributor 550 can begin to reassemble the data packet from the data packet fragments until the flow distributor 550 is able to extract from the partially assembled data packet the following information: a source IP address; a destination IP address; a source port; and a destination port. This information, in many embodiments, is stored in the packet header. Thus, the flow distributor 550 ceases reassembling the data packet from the data packet fragments when the flow distributor 550 determines that at least a portion of the partially reassembled data packet comprises a data packet header. Determining that at least a portion of the partially reassembled data packet comprises a data packet header can comprise assembling a portion of the plurality of fragments, and/or assembling the portion of the plurality of fragments until a header of the response is assembled.

Once a header has been identified, the flow distributor 550 can identify a tuple (i.e. a second tuple, third tuple, or first tuple) of the data packet, where the tuple can be any tuple described herein. The tuple, in some embodiments, comprises a concatenation or string of the following values extracted from the data packet header: a source IP address; a destination IP address; a source port; and a destination port. In other embodiments, the tuple can comprise at least a source IP address and a destination IP address identified by the plurality of fragments. Identifying the tuple can further include extracting from the data packet header or the response header any of the tuple contents (i.e. the source IP address, and the destination IP address.) Once the tuple is identified, the flow distributor 550 applies the above-described hash to the identified tuple to generate a second, third or first hash. The result of the hash identifies a core 505 (i.e. a second core) in the multi-core system 545. This identified core 505 can be referred to as the destination core 505 or the second core 505. The flow distributor 550, or any other communication module within the multi-core system 545, transmits the data packet fragments to the destination core 505 (Step 1106).

A packet engine 548 executing on the destination core 505 can receive the data packet fragments and can forward the data packet fragments to a fragmentation module 650 executing on the destination core 505 (Step 1108). In some embodiments, the packet engine 548 can store the plurality of fragments upon receiving them. The packet engine can store the plurality of fragments in a memory location or cache accessible by the core 505 that originally received the fragments and the destination core 505. Upon receiving the data packet fragments, the fragmentation module 650 reassembles the data packet from the received data packet fragments (Step 1110). In some embodiments, rather than permitting a fragmentation module 650 to reassemble the data packet, the packet engine 548 performs on the plurality of fragments a fragmentation action, and determines by a rule of the flow distributor executing on the destination core 505, to direct the plurality of fragments received by the destination core 505 to the first core 505 or the core that initially received the request. In these embodiments, the fragmentation action can be an assemble action directing the packet engine 548 or a fragmentation module 650 to reassemble the data packets, or can be a bridging action directing the packet engine 548 or a fragmentation module 650 to transmit or steer the data packets to a first core 505 or another core 505 (i.e. a second core 505, a third core 505.) Determining that the plurality of fragments should be transmitted from the destination core 505 to the first core 505 can, in some embodiments, include first determining that the first core 505 handled the client request or otherwise established a connection between the client and the server. Directing the plurality of fragments from the destination core 505 to the first core 505 can further include sending, by a packet engine 548 on the destination core 505, a packet engine 548 on the first core 50 a message directing the packet engine 548 on the first core 505 to process the assembled plurality of fragments.

While the above-mentioned method 1100 is partially carried out by a flow distributor 550, those steps carried out by the flow distributor 550 can be carried out by a packet engine 548 executing on a first core 505A. In some embodiments, data packet fragments can be forwarded to a default core dedicated to handling data packet fragments. Rather than process the data packet fragments using the flow distributor 550 or RSS module 560, the system can be configured to forward all data packet fragments to a first core 505A having a fragmentation module 650 or an instance of a fragmentation module 650 executing thereon. This fragmentation module 650 can reassemble a data packet until the relevant portions of the data packet are available for extraction by a flow distributor instance 550 executing on the default core.

When a packet engine 548 executing on a default core or first core 505A receives the fragmented data packet, the packet engine 548 can transmit the data packet fragments to a destination core via a core-to-core messaging system, or via an intra-multi-core system communication network. In some embodiments, transmitting the data packet fragments (Step 1106) can comprise copying the data packet fragments into a global cache or memory element, and sending a message to a destination core or packet engine executing on the destination core instructing the packet engine to download the data packet fragments from global cache. In other embodiments, the data packet fragments can be encapsulated within another packet header indicating that the data packet fragments should be transmitted to the packet engine 548 of the destination core 505. These data packet fragments can be sent to the destination packet engine over an internal network in the multi-core system 545.

In other embodiments, the above-mentioned method 1100 can be carried out by a flow distributor 550 or RSS module 560 further executing or having a fragmentation module. The fragmentation module can handle all data packet fragments intercepted or received by the flow distributor 550 or RSS module 560.

Figure 11B:
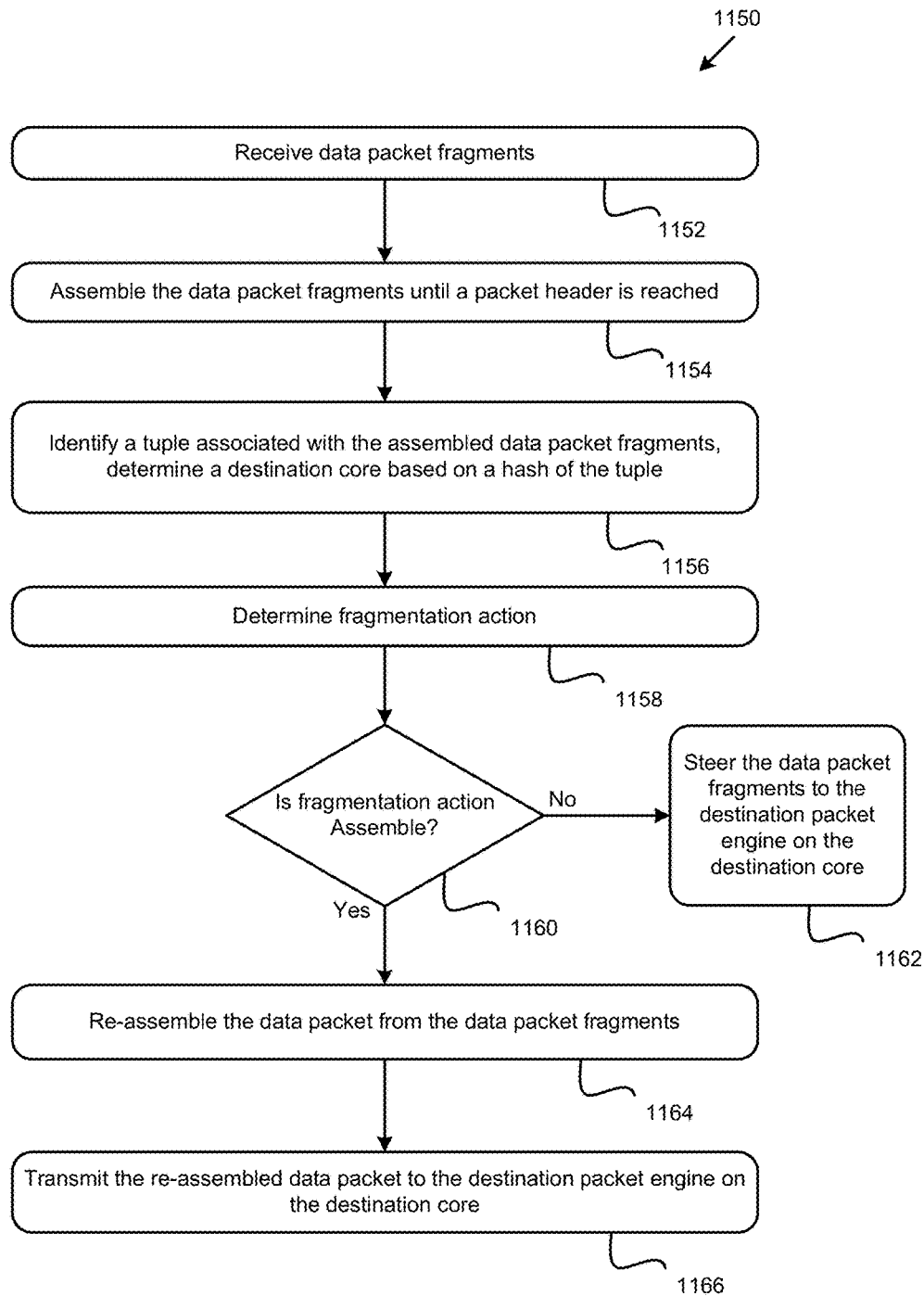

Illustrated in FIG. 11B is another embodiment of a method 1150 for allocating or distributing data packet fragments to cores 505 in a multi-core system 545. A flow distributor 550 or RSS module 560 receives data packet fragments (Step 1152), and assembles a data packet from the data packet fragments until a packet header is reached (Step 1154). Once the header is reassembled, the flow distributor 550 or RSS module 560 can extract the following values to create a tuple or string of those values, the values are: a source IP address; a destination IP address; a source port; and a destination port. After creating or identifying a tuple of the reassembled header, a hash is applied to the tuple. In most embodiments, the hash result identifies a core in the multi-core system 545 (Step 1156), this core can be referred to as a destination core. Once a destination core 505 is identified, a fragmentation action can be determined (Step 1158). If the fragmentation action is "Assemble," (Step 1160) then a data packet is reassembled from the data packet fragments (Step 1164) and the reassembled data packet can be transmitted to a packet engine on the destination core (Step 1166). When the fragmentation action is not "Assemble," then the data packet fragments can be steered to a destination packet engine executing on the destination core 505 (Step 1162).

Further referring to FIG. 11B, and in more detail, in one embodiment the method 1150 can be carried out by a packet engine 548 executing on a core 505. In another embodiment, the method 1150 can be carried out by a flow distributor 550 or an instance of a flow distributor executing on the core 505. In still other embodiments, the method 1100 can be carried out by any flow distribution module or agent that may execute on the core 505. While FIG. 11B contemplates reassembling a data packet from data packet fragments, reassembly of the data packet can, in some embodiments, be handled by a control core in the multi-core system 545.

The packet engine 548 carrying out at least a portion of the steps of the method 1150 described in FIG. 11B can execute on a particular core 505. The core 505, in most embodiments, is selected ahead of time by applying a hash to a tuple of the data packet fragments. This tuple, in most cases, comprises at least a client IP address, a destination IP address, a client port and a destination port. In some embodiments, the tuple can be any of the above described tuples and can comprise any number of source or destination identifying values. In still other embodiments, the client IP address can be a source IP address identifying the machine from which the data packet originated. Similarly, the client port can be a source port.

In one embodiment, a flow distributor 550 executing within the multi-core system 545, receives data packet fragments from a computing machine or appliance remotely located outside of the multi-core system 545 (Step 1152). The flow distributor 550 can directly receive data packet fragments, or in some embodiments, a communication module can receive and transmit data packets or data packet fragments. In other embodiments, the NIC 552 can receive and transmit data packets and data packet fragments. Receiving data packets and data packet fragments, in some embodiments, can further comprise draining data packets or data packet fragments from a receive queue on the NIC 552. A receive queue can store data packets and data packet fragments transmitted to the multi-core system 545. The flow distributor 550 can access data packets and data packet fragments in the receive queue by draining or otherwise obtaining the data packets and data packet fragments from the receive queue according to a first-in-first-out method of access. Another possible method of access can be first-in-last-out.

In some embodiments, a packet engine 548 can receive a client request that identifies a first tuple comprising a client internet protocol address, a client port, a server internet protocol address and a server port. In these embodiments, the packet engine 548 can execute on a core 505 selected by the flow distributor 550 based on a hash of the first tuple. The flow distributor 550 can then receive a plurality of fragments of a response (Step 1102) to the client request received by the packet engine 548, the fragments of a response sent by a server responsive to receiving the client request that was forwarded by the packet engine 548 executing on the core 505.

Once the flow distributor 550 receives one or more data packet fragments (Step 1152), the flow distributor 550 can begin to reassemble the data packet from the data packet fragments until a packet header is reached (Step 1154). In some embodiments, the entire data packet is reassembled by the flow distributor 550 from the received data packet fragments. In other embodiments, only those portions of the data packet that make up the header are assembled by the flow distributor 550. In still other embodiments, the flow distributor 550 can begin to reassemble the data packet from the data packet fragments until the flow distributor 550 is able to extract from the partially assembled data packet the following information: a source IP address; a destination IP address; a source port; and a destination port. This information, in many embodiments, is stored in the packet header. Thus, the flow distributor 550 ceases reassembling the data packet from the data packet fragments when the flow distributor 550 determines that at least a portion of the partially reassembled data packet comprises a data packet header. Determining that at least a portion of the partially reassembled data packet comprises a data packet header can comprise assembling a portion of the plurality of fragments, and/or assembling the portion of the plurality of fragments until a header of the response is assembled.

Once a header has been identified, the flow distributor 550 can identify a tuple (i.e. a first tuple, a second tuple, a third tuple) of the data packet, where the tuple can be any tuple described herein. The tuple, in some embodiments, comprises a concatenation or string of the following values extracted from the data packet header: a source IP address; a destination IP address; a source port; and a destination port. Once the tuple is identified, the flow distributor 550 applies the above-described hash to the identified tuple to generate a second, third or first hash. The result of the hash identifies a core 505 (i.e. a second core) in the multi-core system 545. This identified core 505 can be referred to as the destination core 505 or the second core 505. The flow distributor 550, or any other communication module within the multi-core system 545, transmits the data packet fragments to the destination core 505 (Step 1156).

The flow distributor 550 can then determine a fragmentation action associated with the data packet fragments (Step 1158). In some embodiments, the fragmentation action is dictated by the multi-core system 545. An administrator can configure the multi-core system 545 to either "Bridge" the data packet fragments to a destination core by transmitting each data packet fragment to the destination core where the fragments are reassembled. In other embodiments, the administrator can configure the multi-core system 545 to "Assemble" the data packet fragments into the data packet prior to transmitting the data packet to the destination core. In other embodiments, the fragmentation action can be identified in the data packet header or in metadata associated with each data packet. In still other embodiments, the decision whether to "Assemble" or "Bridge" can be made based on any combination of the following criteria: the number of data packet fragments; the type of data within the data packet load; the size of each data packet fragment; the size of the data packet; the source IP address; the destination IP address; the amount of available processing resources in the multi-core system 545; or any other factor. In embodiments where the flow distributor 550 takes into account data packet size, the flow distributor 550 may "Assemble" data packets when it is determined that the data packet size is too great to transmit piecemeal according to the "Bridge" fragmentation action. When the flow distributor 550 takes into account the amount of available processing resources, the flow distributor 550 may analyze the amount of load on the destination core and determine whether the destination core has enough available resources to assemble the data packet. In some embodiments, the decision whether to "Assemble" or "Bridge" the data packet fragments can be based on a determination as to whether the destination core has a fragmentation module 650. In embodiments where the destination core has a fragmentation module 650, the data packet fragments are "Bridged." In embodiments where the destination core does not have a fragmentation module 650, the data packet fragments are "Assembled."

When, in some embodiments, the fragmentation action is "Assemble" (Step 1160), the data packets are reassembled by the flow distributor 550 or by a fragmentation module executing within the flow distributor, into the data packet (Step 1164). Once the data packet is reassembled from the data packet fragments, the data packet is transmitted to the destination core where it is received by a packet engine executing on the destination core (Step 1166). In some embodiments, the data packet fragments are stored in a fragmentation table 655 prior to transmitting the reassembled data packet to the destination core.

When, in some embodiments, the fragmentation action is "Bridge" (Step 1160), the data packets are steered to the destination core where they are reassembled (Step 1162). In some embodiments, a packet engine executing on the destination core receives the data packet fragments and either assembles them, or transmits them to a fragmentation module 650 where they are reassembled. In some embodiments, the data packet fragments are stored in a fragmentation table 655 prior to transmitting each data packet fragment to the destination core. In other embodiments, the packet engine 548 can store the plurality of fragments upon receiving them. The packet engine can store the plurality of fragments in a memory location or cache accessible by the core 505 that originally received the fragments and the destination core 505. The data packet fragments, in some embodiments are transmitted or steered to the destination core in the order in which they were received by the client, server or other computing machine or appliance.

In embodiments where a data packet has a TCP header and any of the following happens, the fragmentation action is "Assemble": the traffic hits a PCB; the traffic hits NAT-PCB and an "Assemble Packet" flag is set; the traffic hits a configured service or packet engine whose type is not UDP; and any RNAT traffic. If any of this does not occur, then the fragmentation action is "Bridge." In embodiments where a data packet has a UDP header any of the following happens, the fragmentation action is "Assemble": the traffic hits NATPCB and the "Assemble Packet" flag is set; the traffic hit a configured service or packet engine whose type is not UDP. If any of this does not occur, then the fragmentation action is "Bridge."

The fragmentation action, in some embodiments, can be determined by doing service, RNAT, PCB and NATPCB lookups. Service and RNAT lookups can, in some embodiments, be done on any packet engine. However, the PCB/NATPCB that manages the connection may not reside in the same packet engine as a packet engine that receives the fragments.

While the above-mentioned method 1150 is partially carried out by a flow distributor 550, those steps carried out by the flow distributor 550 can be carried out by a packet engine 548 executing on a first core 505A. In some embodiments, data packet fragments can be forwarded to a default core dedicated to handling data packet fragments. Rather than process the data packet fragments using the flow distributor 550 or RSS module 560, the system can be configured to forward all data packet fragments to a first core 505A having a fragmentation module 650 or an instance of a fragmentation module 650 executing thereon. The packet engine 548, in conjunction with the fragmentation module 650, can either reassemble data packets from data packet fragments or steer the data packet fragments to a destination core.

When a packet engine 548 executing on a default core or first core 505A receives the fragmented data packet, the packet engine 548 can transmit either the data packet fragments or the reassembled data packet to a destination core via a core-to-core messaging system, or via an intra-multi-core system communication network. In some embodiments, transmitting the data packet fragments or data packet can comprise copying the data packet fragments or data packet into a global cache or memory element, and sending a message to a destination core or packet engine executing on the destination core instructing the packet engine to download the data packet or data packet fragments from global cache. In other embodiments, the data packet or data packet fragments can be encapsulated within another packet header indicating that the data packet fragments should be transmitted to the packet engine 548 of the destination core 505. These data packet fragments can be sent to the destination packet engine over an internal network in the multi-core system 545.

In other embodiments, the above-mentioned method 1150 can be carried out by a flow distributor 550 or a RSS module 560 further executing or having a fragmentation module. The fragmentation module can handle all data packet fragments intercepted or received by the flow distributor 550 or RSS module 560.

What is claimed is:

1. A method comprising:
(a) receiving, by a core of a device comprising a plurality of cores, a packet of a request of a client to access a server, the packet comprising an internet protocol (IP) address of the client assigned to a source IP address of the packet, a client port of the client assigned to a source port of the packet, an IP address of the server assigned to a destination IP address of the packet, and a server port of the server assigned to a destination port of the packet, the core selected to receive the packet responsive to calculating a first hash of the source IP address of the packet, the source port of the packet, the destination IP address of the packet and the destination port of the packet and evaluating the first hash to identify the core selected to receive the packet;
(b) determining, by the core, that the IP address of the client is to be maintained in the source IP address of the packet when forwarding the packet to the server;
(c) selecting, by the core responsive to the determination, a port number from a plurality of port numbers in a port allocation table of the core to replace the client port assigned to the source port of the packet with the selected port number by iterating through one or more of the plurality of port numbers until an evaluation of a second hash of the IP address of the client, the selected port number, the IP address of the server and the server port of the server identifies the core selected to receive the packet of the request for receiving a response to the request from the server;
(d) modifying, by the core, the source port of the packet by replacing the client port in the source port of the packet with the selected port number; and
(e) forwarding, by the device, the modified packet to the server.

2. The method of claim 1, further comprising maintaining, by the device, a plurality of port allocation tables for each core.

3. The method of claim 2, wherein (c) further comprises selecting, by the core, the port allocation table from the plurality of port allocation tables.

4. The method of claim 1, wherein (c) further comprises selecting a first port number from the plurality of port numbers available in the port allocation table and determining that a third hash of the IP address of the client, the first port number, the IP address of the server and the server port of the server does not identify the core.

5. The method of claim 4, further comprising selecting the port number as a second port number from the plurality of port numbers available in the port allocation table and determining that the second hash of the IP address of the client, the second port number, the IP address of the server and the server port of the server.

6. The method of claim 4, further comprising determining that the port number is one of available or not in use by the core.

7. The method of claim 1, wherein (c) further comprises iterating through the plurality of port numbers in order of numbering.

8. The method of claim 1, wherein (c) further comprises iterating through the plurality of port numbers in order of listing in the port allocation table.

9. The method of claim 1, further comprising receiving, by the core, the response from the server and modifying the destination port of the response that identifies the selected port number of the device with the client port and forwarding the modified response to the client.

10. A system comprising:

a device comprising a plurality of cores;

a core of the plurality of cores configured to receive a packet of a request of a client to access a server, wherein the packet comprises an internet protocol (IP) address of the client assigned to a source IP address of the packet, a client port of the client assigned to a source port of the packet, an IP address of the server assigned to a destination IP address of the packet, and a server port of the server assigned to a destination port of the packet, wherein the core was selected to receive the packet responsive to calculating a first hash of the source IP address of the packet, the source port of the packet, the destination IP address of the packet and the destination port of the packet and evaluating the first hash to identify the core selected to receive the packet;

wherein the core is configured to IP address of the client is to be maintained in the source IP address of the packet when forwarding the packet to the server;

wherein the core is configured to select, responsive to the determination, a port number from a plurality of port numbers in a port allocation table of the core to replace the client port assigned to the source port of the packet with the selected port number by iterating through one or more of the plurality of port numbers until an evaluation of a second hash of the IP address of the client, the selected port number, the IP address of the server and the server port of the server identifies the core selected to receive the packet of the request for receiving a response to the request from the server;

wherein the core is configured to modify the source port of the packet by replacing the client port in the source port of the packet with the selected port number; and wherein the device is configured to forward the modified packet to the server.

11. The system of claim 10, wherein the device is configured to maintain a plurality of port allocation tables for each core.

12. The system of claim 11, wherein the core is configured to select the port allocation table from the plurality of port allocation tables.

13. The system of claim 10, wherein the core is configured to select a first port number from the plurality of port numbers available in the port allocation table and determines that a third hash of the IP address of the client, the first port number, the IP address of the server and the server port of the server does not identify the core.

14. The system of claim 13, wherein the core is configured to select the port number as a second port number from the plurality of port numbers available in the port allocation table and determines that the second hash of the IP address of the client, the second port number, the IP address of the server and the server port of the server.

15. The system of claim 13, wherein the core is configured to determine that the port number is one of available or not in use by the core.

16. The system of claim 10, wherein the core is configured to iterate through the plurality of port numbers in order of numbering.

17. The system of claim 10, wherein the core is configured to iterate through the plurality of port numbers in order of listing in the port allocation table.

18. The system of claim 1, wherein the core is configured to receive the response from the server and modify the destination port of the response that identifies the selected port number of the device with the client port and forward the modified response to the client.

* * * * *